United States Patent [19]

Ikeo et al.

[11] Patent Number: 5,701,500
[45] Date of Patent: Dec. 23, 1997

[54] DOCUMENT PROCESSOR

[75] Inventors: Joji Ikeo; Masaharu Ozaki; Tsuyoshi Tanaka; Katsuhiko Itonori; Yuusuke Ishida, all of Kanagawa, Japan

[73] Assignee: Fuji Xerox Co., Ltd., Tokyo, Japan

[21] Appl. No.: 71,006

[22] Filed: Jun. 1, 1993

[30] Foreign Application Priority Data

| Jun. 2, 1992 | [JP] | Japan | 4-165525 |
| Jun. 9, 1992 | [JP] | Japan | 4-173707 |
| Jul. 3, 1992 | [JP] | Japan | 4-198971 |

[51] Int. Cl.$^6$ ............................. G06T 1/00
[52] U.S. Cl. .............. 395/779; 395/788; 395/774; 382/182; 382/306; 382/180
[58] Field of Search ............. 395/145–149, 395/151, 155–161, 10, 54, 761, 766, 769, 770, 774, 776–777, 779–788; 358/403; 382/309, 306, 176–177, 180, 182, 195, 209, 217, 307; 364/419.1, 419.17

[56] References Cited

U.S. PATENT DOCUMENTS

| 4,949,287 | 8/1990 | Yamaguchi et al. | 395/147 |
| 5,031,121 | 7/1991 | Iwai et al. | 395/147 |
| 5,159,667 | 10/1992 | Borrey et al. | 395/761 |
| 5,185,821 | 2/1993 | Yoda | 382/306 |
| 5,208,905 | 5/1993 | Takakura et al. | 395/148 |
| 5,214,755 | 5/1993 | Mason | 395/147 |
| 5,302,969 | 4/1994 | Kuroda et al. | 345/168 |
| 5,379,373 | 1/1995 | Hayashi et al. | 395/148 |
| 5,434,962 | 7/1995 | Kyojima et al. | 395/145 |
| 5,491,760 | 2/1996 | Withgott et al. | 382/203 |
| 5,555,362 | 9/1996 | Yamashita et al. | 395/145 |

FOREIGN PATENT DOCUMENTS

| 61-32712 | 7/1986 | Japan . |
| 62-208761 | 9/1987 | Japan . |
| 63-288562 | 11/1988 | Japan . |
| 64-15889 | 1/1989 | Japan . |
| 2-223275 | 9/1990 | Japan . |
| 3-109874 | 5/1991 | Japan . |
| 3-122773 | 5/1991 | Japan . |
| 5-101052 | 4/1993 | Japan . |
| 5-108641 | 4/1993 | Japan . |

*Primary Examiner*—Joseph H. Feild
*Attorney, Agent, or Firm*—Finnegan, Henderson, Farabow, Garrett & Dunner, L.L.P.

[57] ABSTRACT

A user enters a document processor simple instructions of the use of an output document and the image finish of the document, for example, by a design instruction input unit. In response to the simple instructions, a design parameter determining unit determines design parameters. An area dividing unit divides the input image into partial image areas of document elements. A logic identifier applying unit applies logic identifiers to the document elements. An output image generator unit processes the document image according to the design parameters provided respectively for the logic identifiers, whereby forming an output image as instructed.

31 Claims, 56 Drawing Sheets

FIG. 3

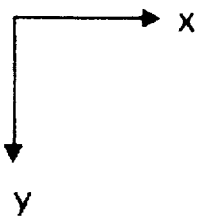

FUJI XEROX Co., Ltd.

REPORT OF INVESTIGATION OF SATISFACTION
DEGREE OF CUSTOMER

SEARCH DEPARTMENT TSUYOSHI TANAKA*

1. INTRODUCTION

THIS REPORT RELATES TO INVESTIGATION OF
SATISFACTION DEGREE OF CUSTOMER.
OOOOOOOOOOOOOOOOOOOOO
OOOOOOOOOOOOOOOOOOOOO
OOOOOOOOOOOOOOOOOOOOO

2. METHOD OF INVESTIGATION

THIS INVESTIGATION WAS CARRIED OUT BY
THE FOLLOWING METHOD.
OOOOOOOOOOOOOOOOOOOOO
OOOOOOOOOOOOOOOOOOOOO
OOOOOOOOOOOOOOOOOOOOO
OOOOOOOOOOOOOOOOOOOOO
OOOOOOOOOOOOOOOOOOOOO

*AT PRESENT, WORKING AT ACCOUNTING
 DEPARTMENT

| NUMBER | KIND | LEFT UPPER POINT X-COORDINATE | LEFT UPPER POINT Y-COORDINATE | WIDTH | HEIGHT | NUMBER OF LOWER LEVEL ELEMENT | START NUMBER OF LOWER LEVEL ELEMENT |
|---|---|---|---|---|---|---|---|
| 1 | CHARACTER BLOCK | 20 | 20 | 50 | 5 | 1 | 11 |
| 2 | CHARACTER BLOCK | 20 | 35 | 120 | 5 | 1 | 12 |

| NUMBER | KIND | LEFT UPPER POINT X-COORDINATE | LEFT UPPER POINT Y-COORDINATE | WIDTH | HEIGHT | NUMBER OF LOWER LEVEL ELEMENT | START NUMBER OF LOWER LEVEL ELEMENT |
|---|---|---|---|---|---|---|---|
| 11 | CHARACTER LINE | 20 | 20 | 50 | 5 | 10 | 50 |
| 12 | CHARACTER LINE | 20 | 35 | 120 | 5 | 20 | 60 |

| NUMBER | KIND | LEFT UPPER POINT X-COORDINATE | LEFT UPPER POINT Y-COORDINATE | WIDTH | HEIGHT | NUMBER OF LOWER LEVEL ELEMENT | START NUMBER OF LOWER LEVEL ELEMENT |
|---|---|---|---|---|---|---|---|
| 50 | CHARACTER | 20 | 20 | 4 | 5 | 0 | 0 |
| 51 | CHARACTER | 25 | 20 | 4 | 5 | 0 | 0 |

| LOGICAL NAME | ELEMENT NUMBER |
|---|---|
| HEADER | 1 |
| TITLE | 2 |
| AUTHOR | 3 |
| SUBTITLE 1 | 5 |
| TEXT 1 | 4 |
| SUBTITLE 2 | 8 |
| TEXT 2 | 7 |
| FOOTNOTE RULED | 6 |
| FOOTNOTE | 10 |
| PAGE NUMBER | 9 |

FIG. 11

| ELEMENT LOGICAL NAME | X-DIRECTION REFERENCE ELEMENT | X-DIRECTION REFERENCE SIDE | X-DIRECTION OFFSET | Y-DIRECTION REFERENCE ELEMENT | Y-DIRECTION REFERENCE SIDE | Y-DIRECTION OFFSET | ELEMENT REFERENCE POSITION | MAXIMUM WIDTH | KIND | CHARACTER SIZE | CHARACTER MODIFICATION INDICATION | COLOR |
|---|---|---|---|---|---|---|---|---|---|---|---|---|
| HEADER | PAGE | RIGHT | -50 | PAGE | TOP | 10 | TOP-RIGHT | 100 | CHAR-ACTER | 8 | BOLD | 0 |
| PAGE NUMBER | PAGE | RIGHT | -50 | PAGE | BOTTOM | -20 | TOP-RIGHT | 100 | CHAR-ACTER | 10 | NORMAL | 0 |
| FOOTNOTE | PAGE | LEFT | 55 | PAGE | BOTTOM | 8 | BOTTOM-LEFT | 100 | CHAR-ACTER | 8 | NORMAL | 0 |
| FOOTNOTE RULED | PAGE | LEFT | 55 | FOOTNOTE | TOP | -3 | BOTTOM-LEFT | 100 | RULED LINE | - | - | 0 |
| TITLE | PAGE | LEFT | 100 | PAGE | TOP | 35 | TOP-CENTER | 100 | CHAR-ACTER | 14 | BOLD | 1 |
| AUTHOR | PAGE | LEFT | 100 | TITLE | BOTTOM | 8 | TOP-CENTER | 100 | CHAR-ACTER | 10 | NORMAL | 0 |
| SUBTITLE 1 | PAGE | LEFT | 55 | AUTHOR | BOTTOM | 18 | TOP-LEFT | 100 | CHAR-ACTER | 12 | BOLD | 1 |
| MAIN TEXT 1 | PAGE | LEFT | 55 | SUBTITLE 1 | BOTTOM | 2 | TOP-LEFT | 100 | CHAR-ACTER | 10 | NORMAL | 0 |
| SUBTITLE 2 | PAGE | LEFT | 55 | TEXT 1 | BOTTOM | 12 | TOP-LEFT | 100 | CHAR-ACTER | 12 | BOLD | 1 |
| MAIN TEXT 2 | PAGE | LEFT | 55 | SUBTITLE 2 | BOTTOM | 2 | TOP-LEFT | 100 | CHAR-ACTER | 10 | NORMAL | 0 |

FIG. 15

BLACK IMAGE MEMORY

FUJI XEROX Co., Ltd.

SEARCH DEPARTMENT TSUYOSHI TANAKA*

THIS REPORT RELATES TO
INVESTIGATION OF SATISFACTION
DEGREE OF CUSTOMER. OOOOO OOOOO OOO
OOOOO OOOOO OOOOO OOO
OOOOO OOO

THIS INVESTIGATION WAS CARRIED
OUT BY THE FOLLOWING METHOD. OOOOO OOOOO OOO
OOOOO OOOOO OOOOO OOOOO OOOOO
OOOOO OOOOO OOOOO OOOOO OOOOO
OOO

\* AT PRESENT, WORKING AT
ACCOUNTING DEPARTMENT

1

+

PLUS 1 COLOR IMAGE MEMORY

REPORT OF INVESTIGATION OF
SATISFACTION DEGREE OF CUSTOMER

1. INTRODUCTION

2. METHOD OF INVESTIGATION

FIG. 20

```
(RULE00100
   (IF
      (== ($GET "FINISH IMAGE") "FRESH")
      (== ($GET "DOCUMENT, PAPER, SIZE") "A4 VERTICAL")
      (== ($GET "DOCUMENT, SETUP") "LATERAL")
      (== ($GET "DOCUMENT, TITLE, CHARACTER, SIZE") 14)
      (<  ($GET "DOCUMENT, TITLE, RECTANGLE WIDTH") 100)

THEN
        ($PUT "TITLE, CHARACTER, SIZE" 24)
   )
)
```

⌈WHEN A DOCUMENT HAS A4 LATERAL SETUP AND FRESH FINISH IMAGE, IF TITLE CHARACTER IS 14 POINT AND ITS LATERAL WIDTH IS LESS THAN 100mm, THEN CHARACTERS OF TITLE ARE ENLARGED TO 24 POINT⌋

FIG. 21

```
(RULE00200
    (IF
        (== ($GET "FINISH IMAGE") "FRESH")
        (== ($GET "DOCUMENT, PAPER, SIZE") "A4 VERTICAL")
        (== ($GET "DOCUMENT, SETUP") "LATERAL")
        (== ($GET "DOCUMENT, TITLE, CHARACTER, SIZE") 14)
        (>= ($GET "DOCUMENT, TITLE, RECTANGLE WIDTH") 100)

THEN
            ($PUT "TITLE, CHARACTER, SIZE" 18)
            ($PUT "TITLE, CHARACTER, HIGHLIGHTED" "BLEACHED-OUT ITALICS")
    )
)
```

⌈WHEN A DOCUMENT HAS A4 VERTICAL SIZE, LATERAL SETUP AND
FRESH FINISH IMAGE, IF TITLE CHARACTER IS 14 POINT AND
IT LATERAL WIDTH IS 100mm OR MORE, TITLE CHARACTER
ENLARGEMENT IS REPRESSED TO 18 POINT BUT TITLE CHARACTER
IS HIGHLIGHTED USING BLEACHED-OUT ITALICS⌋

FIG. 22

```
(RULE00300
   (IF
      (== ($GET "DOCUMENT, LOGIC ELEMENT") "MAIN TEXT")
      (== ($GET "DOCUMENT, PAPER, SIZE") "A4 VERTICAL")
      (== ($GET "DOCUMENT, SETUP") "LATERAL")
      (=< ($GET "MAIN TEXT, MAXIMUM WIDTH") 150)
      (== ($GET "COLOR MODE") "+1 COLOR")

THEN
         ($PUT "MAIN TEXT, CHARACTER SIZE" 10)
         ($PUT "MAIN TEXT, CHARACTER DECORATION" "NORMAL")
         ($PUT "MAIN TEXT, COLOR" "BLACK")
   )
)
```

⌈IF THE DOCUMENT HAS A4 VERTICAL SIZE, LATERAL SETUP AND TEXT MAXIMUM WIDTH OF 150mm OR LESS, THEN TEXT CHARACTER SIZE IS 10P, CHARACTER DECORATION IS NORMAL, AND COLOR IS BLACK⌋

FIG. 24a

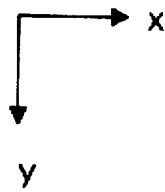

---- THESIS ----

IMPROVEMENT OF XXX METHOD

TARO YAMADA

SUMMARY

THIS REPORT DESCRIBES THE IMPROVEMENT OF XXX METHOD. □□□□□□□□□□□□□□□□□□□□□□□□□□□□□□□□□□□□□□

1. INTRODUCTION

○○○○○○○○○○○○○○○○○○○○○○○○○○○○○○○○○○○○○○○○○○○○○○○○○○○○○○○○

2. WHAT IS XXX METHOD

XXX METHOD WAS DEVELOPED BY XXX ON 1970. △△△△△△△△△△△△△△△△△△△△△△△△△△△△△△△△△△△△△△△△△△△△△△△△△△△△△△△△△△△△△△△△△△△△△△△△△△△△△△△△

1          AAA SOCIETY PAPERS

FIG. 24b

DEVELOPMENT OF YYY METHOD

JIRO NAKAMURA

SUMMARY
THIS REPORT DESCRIBES THE DEVELOPMENT OF
YYY METHOD. □□□□□□□□□□□□
□□□□□□□□□□□□□□□□□□
□□□□□□□□□□□□□

1. INTRODUCTION

OOOOOOOOOOOOOOOOOOOOOOOO
OOOOOOOOOOOOOOOOOOOOOOOO
OOOOOOOOOOOOOOOOOOOOOOOO
OOOOOOOOOOOO

2. YYY METHOD

△△△△△△△△△△△△△△△△△△△△△△
△△△△△△△△△△△△△△△△△△△△△△
△△△△△△△△△△△△△△△△△△△△△△
△△△△△△△△△△△△△△△△△△△△△△
△△△△△△△△△△△△△△△

1      BBB SOCIETY PAPERS

FIG. 24c

CCC TRANSACTION ON SOFTWARE

PROBLEMS IN ZZZ METHOD

PAUL SMITH

ABSTRUCT
THIS PAPER DESCRIBES PROBLEMS IN ZZZ METHOD. □□□□□□ □□□□□□□□□ □□□□□□□

OOOOOOOOOO
OOOOOOOOOO
OOOOOOOOOO
OOOOOOOOOO
OOOOOOOOOO
OOOOOOOOOO
OOOOOOOOOO
OOOOOOOOOO
OOOO

1. INTRODUCTION
OOOOOOOOOO
OOOOOOOOOO
OOOOOOOOOO
OOOOOOOOOO
OOOOOOOOOO
OOOOOOOOOO
OOOOOOOOOO
OOOOOOOOOO
OOOOOOOOOO
OOOOOOOOOO
OOO

2. ZZZ METHOD
△△△△△△△△△△
△△△△△△△△△△
△△△△△△△△△△
△△△△△△△△△△
△△△△△△△△△△
△△△△△△△△△△
△△△△△△△△△△
△△△△△△△△△

| ELEMENT LOGICAL NAME | X-DIRECTION REFERENCE ELEMENT | X-DIRECTION REFERENCE SIDE | X-DIRECTION OFFSET | Y-DIRECTION REFERENCE ELEMENT | Y-DIRECTION REFERENCE SIDE | Y-DIRECTION OFFSET | ELEMENT REFERENCE POSITION | STEP NUMBER | BALANCE | MAXIMUM WIDTH | KIND | CHARACTER SIZE | CHARACTER DECORATION INSTRUCTION | COLOR |
|---|---|---|---|---|---|---|---|---|---|---|---|---|---|---|
| MAGAZINE NAME | PAGE | RIGHT | -20 | PAGE | TOP | 10 | TOP-RIGHT | 1 | - | 100 | CHARACTER | 8 | BOLD | 0 |
| PAGE NUMBER | PAGE | RIGHT | -20 | PAGE | BOTTOM | -20 | TOP-RIGHT | 1 | - | 100 | CHARACTER | 10 | NORMAL | 0 |
| TITLE | PAGE | LEFT | 100 | PAGE | TOP | 36 | TOP-CENTER | 1 | - | 100 | CHARACTER | 14 | BOLD | 1 |
| AUTHOR | PAGE | LEFT | 100 | TITLE | BOTTOM | 8 | TOP-CENTER | 1 | - | 100 | CHARACTER | 10 | NORMAL | 0 |
| SUMMARY TITLE | PAGE | LEFT | 40 | AUTHOR | BOTTOM | 18 | TOP-LEFT | 1 | - | 120 | CHARACTER | 10 | BOLD | 1 |
| SUMMARY | PAGE | LEFT | 40 | SUMMARY TITLE | BOTTOM | 2 | TOP-LEFT | 1 | - | 120 | CHARACTER | 10 | NORMAL | 0 |
| SUBTITLE 1 | PAGE | LEFT | 20 | SUMMARY | BOTTOM | 18 | TOP-LEFT | 2 | 0 | 160 | CHARACTER | 12 | BOLD | 1 |
| MAIN TEXT 1 | PAGE | LEFT | 20 | SUBTITLE 1 | BOTTOM | 2 | TOP-LEFT | 2 | 0 | 160 | CHARACTER | 10 | NORMAL | 0 |
| SUBTITLE 2 | PAGE | LEFT | 20 | MAIN TEXT 1 | BOTTOM | 12 | TOP-LEFT | 2 | 0 | 160 | CHARACTER | 12 | BOLD | 1 |
| MAIN TEXT 2 | PAGE | LEFT | 20 | SUBTITLE 2 | BOTTOM | 2 | TOP-LEFT | 2 | 0 | 160 | CHARACTER | 10 | NORMAL | 0 |

FIG. 29

BLACK COLOR IMAGE MEMORY

AAA SOCIETY PAPERS

TARO YAMADA

THIS REPORT DESCRIBES THE
IMPROVEMENT OF XXX METHOD. □□
□□□□□□□□□□□□□
□□□□□□□□□
□□□□□□

○○○○○○
○○○○○○
○○○○○○
○○○○○○
○○○○○○
○○○○○○
○○○○

△△△△△△△
△△△△△△△
△△△△△△△
△△△△△△△
△△△△△△△
△△△△△△△
△

XXX METHOD WAS
DEVELOPED BY
XXX ON 1970. △

1

+

PLUS 1 COLOR IMAGE MEMORY

IMPROVEMENT OF XXX METHOD

SUMMARY

1. INTRODUCTION

2. XXX METHOD

FIG. 30a

OUTPUT BY
PLUS 1 COLOR

AAA SICIETY PAPERS

IMPROVEMENT OF XXX METHOD

TARO YAMADA

SUMMARY
THIS REPORT DESCRIBES THE IMPROVEMENT
OF XXX METHOD. ☐☐☐☐☐☐☐☐☐
☐☐☐☐☐☐☐☐☐☐☐☐☐☐
☐☐☐☐☐☐☐☐☐☐☐☐

1. INTRODUCTION   △△△△△△△△△
   ○○○○○○○○  △△△△△△△△△
   ○○○○○○○○  △△△△△△△△△
   ○○○○○○○○  △△△△△△△△△
   ○○○○○○○○  △△△△△△△△△
   ○○○○○○○○  △△△△△△△△△
   ○○○○○      △△△△△△△

2. XXX METHOD
   XXX METHOD WAS DEVELOPED BY XXX
   ON 1970. △△△△△△△△△△△

BBB SICIETY PAPERS

DEVELOPMENT OF YYY METHOD

JIRO NAKAMURA

OUTPUT BY PLUS 1 COLOR

SUMMARY

THIS REPORT DESCRIBES THE DEVELOPMENT OF YYY METHOD. ☐☐☐☐☐☐☐☐☐☐ ☐☐☐☐☐☐☐☐☐☐☐☐☐☐☐☐ ☐☐☐☐☐☐☐☐☐☐☐☐☐☐

1. INTRODUCTION  △△△△△△△△△
   ○○○○○○○○○  △△△△△△△△△
   ○○○○○○○○○  △△△△△△△△△
   ○○○○○○○○○  △△△△△△△△△
   ○○○○○○○○○  △△△△△△△△△
   ○○○○○○○○○  △△△△△△△△△
   ○○○○○○○○○  △△△△△△△△△
   ○○○○○      △△△△△△△

2. YYY METHOD
   △△△△△△△△△△

| ELEMENT LOGICAL NAME | X-DIRECTION REFERENCE ELEMENT | X-DIRECTION REFERENCE SIDE | X-DIRECTION OFFSET | Y-DIRECTION REFERENCE ELEMENT | Y-DIRECTION REFERENCE SIDE | Y-DIRECTION OFFSET | ELEMENT REFERENCE POSITION | STEP NUMBER | BALANCE | MAXIMUM WIDTH | KIND | CHARACTER SIZE | CHARACTER DECORATION INSTRUCTION | COLOR |
|---|---|---|---|---|---|---|---|---|---|---|---|---|---|---|
| MAGAZINE NAME | PAGE | RIGHT | -20 | PAGE | TOP | 10 | TOP-RIGHT | 1 | - | 100 | CHAR-ACTER | 8 | BOLD | 0 |
| PAGE NUMBER | PAGE | RIGHT | -20 | PAGE | BOTTOM | -20 | TOP-RIGHT | 1 | - | 100 | CHAR-ACTER | 10 | NORMAL | 0 |
| TITLE | PAGE | LEFT | 100 | PAGE | TOP | 35 | TOP-CENTER | 1 | - | 100 | CHAR-ACTER | 14 | BOLD | 1 |
| AUTHOR | PAGE | LEFT | 100 | TITLE | BOTTOM | 8 | TOP-CENTER | 1 | - | 100 | CHAR-ACTER | 10 | NORMAL | 0 |
| SUMMARY TITLE | PAGE | LEFT | 40 | AUTHOR | BOTTOM | 18 | TOP-LEFT | 1 | - | 120 | CHAR-ACTER | 10 | BOLD | 1 |
| SUMMARY | PAGE | LEFT | 40 | SUMMARY TITLE | BOTTOM | 2 | TOP-LEFT | 1 | - | 120 | CHAR-ACTER | 10 | NORMAL | 0 |
| SUBTITLE 1 | PAGE | LEFT | 20 | SUMMARY | BOTTOM | 18 | TOP-LEFT | 1 | - | 180 | CHAR-ACTER | 12 | BOLD | 1 |
| MAIN TEXT 1 | PAGE | LEFT | 20 | SUBTITLE 1 | BOTTOM | 2 | TOP-LEFT | 2 | 1 | 160 | CHAR-ACTER | 10 | NORMAL | 0 |
| SUBTITLE 2 | PAGE | LEFT | 20 | MAIN TEXT 1 | BOTTOM | 12 | TOP-LEFT | 1 | - | 160 | CHAR-ACTER | 12 | BOLD | 1 |
| MAIN TEXT 2 | PAGE | LEFT | 20 | SUBTITLE 2 | BOTTOM | 2 | TOP-LEFT | 2 | 1 | 160 | CHAR-ACTER | 10 | NORMAL | 0 |

FIG. 34

| ELEMENT LOGICAL NAME | X-DIRECTION REFERENCE ELEMENT | X-DIRECTION REFERENCE SIDE | X-DIRECTION OFFSET | Y-DIRECTION REFERENCE ELEMENT | Y-DIRECTION REFERENCE SIDE | Y-DIRECTION OFFSET | ELEMENT REFERENCE POSITION | STEP NUMBER | BALANCE | MAXIMUM WIDTH | KIND | CHARACTER SIZE | CHARACTER DECORATION INSTRUCTION | COLOR |
|---|---|---|---|---|---|---|---|---|---|---|---|---|---|---|
| MAGAZINE NAME | PAGE | RIGHT | -20 | PAGE | TOP | 10 | TOP-RIGHT | 1 | - | 100 | CHARACTER | 8 | BOLD | 0 |
| PAGE NUMBER | PAGE | RIGHT | -20 | PAGE | BOTTOM | -20 | TOP-RIGHT | 1 | - | 100 | CHARACTER | 10 | NORMAL | 0 |
| TITLE | PAGE | LEFT | 100 | PAGE | TOP | 35 | TOP-CENTER | 1 | - | 100 | CHARACTER | 14 | BOLD | 1 |
| AUTHOR | PAGE | LEFT | 100 | TITLE | BOTTOM | 8 | TOP-CENTER | 1 | - | 100 | CHARACTER | 10 | NORMAL | 0 |
| SUMMARY TITLE | PAGE | LEFT | 40 | AUTHOR | BOTTOM | 18 | TOP-LEFT | 1 | - | 100 | CHARACTER | 10 | BOLD | 1 |
| SUMMARY | PAGE | LEFT | 40 | SUMMARY TITLE | BOTTOM | 2 | TOP-LEFT | 1 | - | 120 | CHARACTER | 10 | NORMAL | 0 |
| SUBTITLE 1 | PAGE | LEFT | 40 | SUMMARY | BOTTOM | 18 | TOP-LEFT | 1 | - | 120 | CHARACTER | 12 | BOLD | 1 |
| MAIN TEXT 1 | PAGE | LEFT | 40 | SUBTITLE 1 | BOTTOM | 2 | TOP-LEFT | 1 | - | 120 | CHARACTER | 10 | NORMAL | 0 |
| SUBTITLE 2 | PAGE | LEFT | 40 | MAIN TEXT 1 | BOTTOM | 12 | TOP-LEFT | 1 | - | 120 | CHARACTER | 12 | BOLD | 1 |
| MAIN TEXT 2 | PAGE | LEFT | 40 | SUBTITLE 2 | BOTTOM | 2 | TOP-LEFT | 1 | - | 120 | CHARACTER | 10 | NORMAL | 0 |

OUTPUT BY PLUS 1 COLOR

CHARACTER ELEMENT

GRAPHIC ELEMENT

FIG. 45

| AREA NAME | X COORDINATE | Y COORDINATE | WIDTH | HEIGHT |
|---|---|---|---|---|
| GRAPHIC ELEMENT 1 | 75 | 60 | 350 | 250 |
| CHARACTER ELEMENT 1 | 50 | 320 | 400 | 950 |
| CHARACTER ELEMENT 2 | 50 | 1280 | 400 | 670 |
| GRAPHIC ELEMENT 2 | 575 | 50 | 350 | 300 |
| CHARACTER ELEMENT 3 | 550 | 320 | 400 | 300 |
| CHARACTER ELEMENT 4 | 550 | 630 | 400 | 1320 |

451

DOCUMENT PROCESSOR

BACKGROUND OF THE INVENTION

The present invention relates to a document processor which automatically alters a document design and produces an output image of the altered design, in response to simple instructions by a user.

With recent prevalence of word processors and DTP (desk top printing) machines, various types of documents of neat and good design can be printed in general offices. In recent machines, various parameters, such as page layout in the document, and the size and type of characters, can be selectively used. Therefore, an expertised user having related knowledge and experience can produce documents of excellent design if he carefully and steadily operates the machine.

Actually, a general user who has a little knowledge and experience cannot handle such a high performance machine as intended. For example, the general user cannot understand which of those parameters and how many parameters are to be used for gaining well designed documents. Accordingly, the documents prepared by such general users are unsatisfactory or poor in document design.

Some solutions for the problem have been proposed as disclosed in Japanese Patent Application No. Hei. 03-258013, entitled "Document-Forming Support Apparatus", and Japanese Patent Application No. Hei. 03-269601, entitled "Document-Style Design Support Apparatus". Those apparatuses propose techniques to support the document forming work by the machine so as to provide documents of neat design as the users desire.

However, the support techniques are directed to electronic documents, and are inoperative for documents printed on print sheets, hand-written documents and the like.

Various publishing operations produce a tremendous amount of hard copies, e.g., magazines and other hard copies produced by office document processors including DTP, word processors, copying machines, etc. A need for managing or filing such hard copies is created to provide easy access to desired hard copies.

Documents having the same logic structures and categorized as the same type of documents frequently have different layout designs. For example, different characters and different columns may be used. It is desirable that the documents be rearranged to have the same design before filed. The DTP is capable of converting documents of different designs into those of the same design. However, the documents that are output in the form of hard copies from the DTP cannot be so rearranged.

A copying machine is a machine having the function of reading an image on a paper document, properly processing the document image and outputting the processed image. The basic function of the copying machine is to faithfully reproduce the image of an original document. Some digital copying machines have document processing functions, as disclosed in Published Unexamined Japanese Patent Application No. Hei. 2-223275. Copying machines also require many instructions, for example, the locations to be processed and the modes of process. To handle such machines, the user must be skilled in performing complicated operations. In this respect, such machines have little utility in facilitating user operation.

Particularly in using color copying machines, the operations of color changes and of painting the black/white document with specific colors are frequently performed. The operations are complicated and time-consuming. Further, knowledge on the color arrangement is essential to the user. Accordingly, documents formed by general users using the machines have poor quality. A column change process is impossible if any high performance machine is used.

Techniques for automatically improving the document design for gaining legible and good design documents in the digital copying machines are disclosed in Published Unexamined Japanese Patent Application No. Sho. 62-208761 and Published Unexamined Japanese Patent Application No. Hei. 3-122773. The former application, for improving the legibility, picks up character blocks in a hand-written document that is facsimile transmitted from the document image, and arranges them in the flush left fashion before output. The latter application proposes a technique, or fair-copy technique, of classifying the image of the handwritten document into character and graphic portions, and arranging the character portions in order and linearizing the lines in the graphic portion. These applications lack disclosure of a technique to provide high quality images as the user intends, and a technique to change the character size and the color for making the documents uniform in format.

SUMMARY OF THE INVENTION

For the above background reasons, the present invention has an object to provide a document processor which automatically changes the design of an input document and produces an output document designed as a user desires, in response to simple instructions by the user.

The present invention has another object to provide a document processor which automatically changes the design of an input document and produces an output document designed as a user desires, in response to simple instructions by the user, such as the use of output documents and image finish.

The present invention has yet another object to provide a document processor which automatically changes the size of characters and the column in an input document and produces an output document designed as a user desires, in response to simple instructions on document design by the user.

The present invention has yet another object to provide a document processor which automatically generates output documents, such as a summary document and the content, by picking up only necessary document elements from the document image of the input document.

A document processor comprises: document image storing means for storing a document image; area dividing means for dividing the document image received from the document image storing means into a plural number of image areas; logic identifier applying means for applying logic identifiers having logical meanings of the document to the image areas of the document image received from the area dividing means; design instruction input means for inputting design instructions; design parameter determining means for determining, for each logic identifier, the values of parameters on a document design of an output document according to the instructions entered from the design instruction input means; and output image generator means for processing the images in the image areas having the logic identifiers applied thereto by the logic identifier applying means according to the parameter values determined by the design parameter determining means, which respectively correspond to the logic identifiers.

The document image to be processed is divided into a plural number of areas by the area dividing means. Logic identifiers are applied to those areas by the logic identifier applying means. More specifically, the area dividing means produces a layout structure including area data containing layout identifiers, type of image area, area size, area positions, and data representing the relationships among the image areas.

The logic identifier applying means applies logic identifiers having logical meanings of the areas, such as tile, author and main body, to the areas, through the process of comparing the layout structure with structure models. More specifically, the logic identifier applying means includes structure model storing means for storing a plural number of structure models describing the relationships between the layout structure and the logic structure, matching processor means for comparing the layout structure received from the area dividing means with the structure models, and logic structure determining means for applying logic identifiers to the image areas or document elements on the basis of the structure model matching the layout structure.

The design instruction input means includes means for selectively designating the types of documents, such as "Report", "Planning", and "OHP material", and design instruction items, such as "Orthodox", "Fresh", and "Functional". A user instructs his desired document design by the design instruction input means.

The design parameter determining means determines the values of parameters on the design of an output document for each logic identifier in response to the design instruction.

More specifically, the design parameter determining means includes table means for retrieving the parameter values on document design in accordance with the design instructions from the design instruction input means.

The table means includes a first table containing design instructions and a table number (table number of a second table) associated therewith, and a second table containing the position and the maximum width of the document elements with logic identifiers (e.g., "Title"), and the size and character attribution of the character elements. The second table suitable for the design instructions is obtained by the first table, and the parameters for the logic identifiers are obtained by the second table.

The another design parameter determining means determines the parameter values on the design of an output document on the basis of the instructions entered from the design instruction input means and the output from the logic identifier applying means. When the design parameter determining means transfers the design parameter data for each logic identifier to the output image generator means, the design parameter determining means receives information as to what logic identifier the layout structure contained in the input document has, from the logic identifier applying means, and transfers only necessary logic identifiers to the output image generator means.

The still another design parameter determining means includes inference processing means for determining the parameter values on the design of an output document by carrying out the inference process on the basis of the knowledge data base storing knowledge data on the document design, the instruction received from the design instruction input means, and the output of the logic identifier applying means. The knowledge data base consists of document design knowledge data. The design parameters are determined by the inference process. Therefore, the document may variously be designed using the knowledge of experts.

The yet another design parameter determining means further contains parameters to designate the column as the parameters. When design parameters provided respectively for logic identifiers determined by the design parameter determining means contain the parameters designating the column, the output image generator means converts the layout of the image data in the corresponding image areas into the designated column. Accordingly, the user can prepare uniformly designed documents with the designated column from documents of different columns by merely entering simple instructions to the document processor.

The design parameter determining means cuts the areal images for the logic identifiers applied by the design parameters applying means out of the document image stored in the document image storing means, and process the areal images according to the design parameters determined by the design parameter determining means and outputs an output image.

Accordingly, the user can prepare uniformly designed documents with the designated column from documents of different columns by merely entering simple instructions to the document processor.

A document processor according to another aspect of the present invention comprises: document image storing means for storing a document image; area dividing means for dividing a cluster of pixels in the document image received from the document image storing means into a plural number of image areas of document elements, such as character elements and graphic elements, having logic meanings; pour-order determining means for determining the order of arraying sentences in the areas of character elements in the document image that are divided by the area dividing means; position designation means for designating positions of the specific elements in the document image; layout position determining means for locating the positions of the specific elements at the positions designated by the position designation means, and for determining the positions of the remaining elements in the document image; and output image generator means for generating an output image according to the sentence order determined by the pour-order determining means and the position data of the respective elements in the document image determined by the layout position determining means.

In the operation, the area dividing means divides a cluster of pixels in the document image received from the document image storing means into a plural number of image areas of document elements having logic meanings. The pour-order determining means determines the order of arraying sentences in the areas of character elements that are determined to be character elements (character areas). The position designation means determines the positions of the specific elements (e.g., graphic elements) in the document image. The layout position determining means locates the positions of the specific elements at the positions designated by the position designation means, and also determines the positions of the remaining elements in the document image. The output image generator means composes an output image according to the results of the processing by the pour-order determining means and the layout position determining means.

The position designation means includes means for selectively designating a "Flush top" to locate the graphic element at the top of a document and a "Flush bottom" to locate the graphic element at the top.

The output image generator means includes a layout rule storing means for storing the rules on the layout of the subcharacter patterns in the lowest layer of the layer structure of character areas; layout determining means for determining whether or not the beginning and end of a line of characters are proper or not according to the subcharacter pattern data of subcharacter pattern data storing means and the rules of said layout rule storing means; and layout processing means for picking up the subcharacter patterns from the document image stored in the input image memory on the basis of the results of the determination by said layout determining means and the subcharacter pattern data, which is stored in said subcharacter pattern data storing means, and for laying out the subcharacter patterns within a desired area.

The document processor further comprises logic identifier applying means for applying logic identifiers to said document elements produced by the area dividing means. The output image generation means carries out a prohibit process on the layout of the document elements on the basis of the logic identifiers applied. The graphic element is prohibited from being located above the character elements having logic identifiers, such as "Title" and "Abstract", and under the character element with the logic identifier, such as "Footnote". Accordingly, the resultant image looks neat.

Further, if the position of the graphic element in the document image is designated, the document processor automatically lays out the remaining elements. This also simplifies the document design operation.

Further, the document processor of the invention comprises area dividing means, logic identifier applying means, document image input means, and means for picking up the elements with desired identifiers from the elements having identifiers, and output image generator means for generating an output image using the partial images corresponding to the picked up elements.

With such an arrangement, the document image is divided into a plural number of document elements by the area dividing means. Identifiers are applied to the elements by the logic identifier applying means. Only the desired elements are picked up by the pickup means. The output image generator means generates an output image using the picked up elements. Thus, the document processor can automatically produce an output image consisting of only the necessary elements.

BRIEF DESCRIPTION OF THE DRAWINGS

FIG. 3 is a diagram showing an example of an actual document to be input;

FIG. 7 is a table showing the layer structure of the data representative of the results of the area division by the area dividing module;

FIG. 11 is a diagram showing an example of a design parameter table;

FIG. 15 is a diagram showing two output images generated by the output image generator module;

FIG. 20 is a diagram showing an example 1 of the knowledge stored in the knowledge data base;

FIG. 21 is a diagram showing an example 2 of the knowledge stored in the knowledge data base;

FIG. 22 is a diagram showing an example 3 of the knowledge stored in the knowledge data base;

FIG. 24a is a diagram showing an example of an input document;

FIG. 24b is a diagram showing another example of an input document;

FIG. 24c is a diagram showing yet another example of an input document;

FIG. 27 is a diagram showing an example 1 of a design parameter table;

FIG. 29 is a diagram showing an example of the electronic image when the image generation process is completed in the output image generator module;

FIG. 30a is a diagram showing an example of the document that is output in the print-out module;

FIG. 30b is a diagram showing another example of the document output in the print-out module;

FIG. 31 is a diagram showing another example 2 of a design parameter table;

FIG. 34 is a diagram showing yet another example 3 of a design parameter table;

FIG. 45 is a table showing the results of the layout position determining process;

DETAILED DESCRIPTION OF THE PREFERRED EMBODIMENTS (First embodiment)

Figure 1:
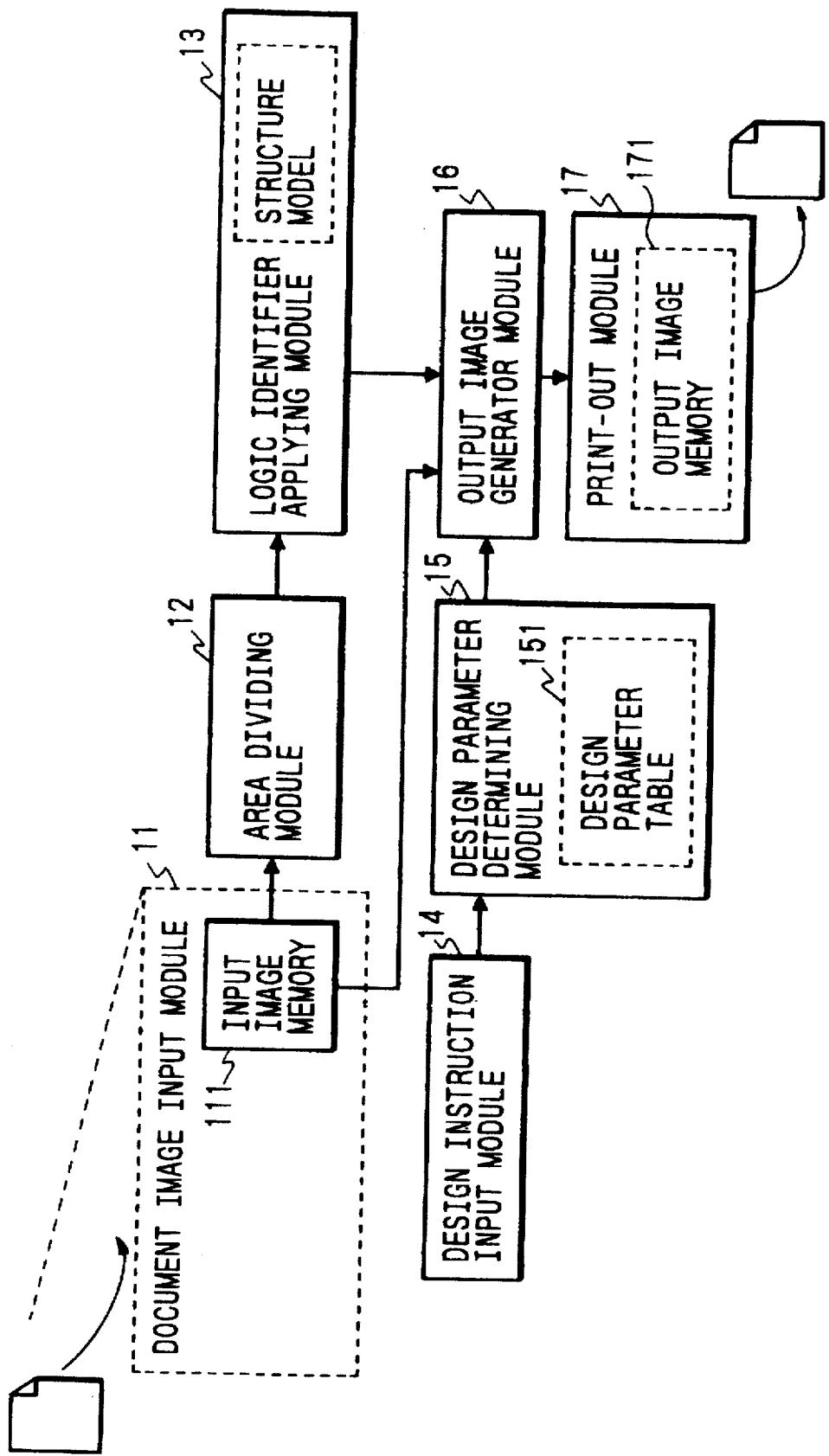
FIG. 1 is a block diagram showing an arrangement of a document processor according to a first embodiment of the present invention.

FIG. 1 is a block diagram showing an arrangement of a document processor incorporated into a copying machine, which is a first embodiment of the present invention.

As shown in FIG. 1, the document processor is comprised of a document image input module 11, an area dividing module 12, a logic identifier (LI) applying module 13, a design instruction (DI) input module 14, a design parameter (DP) determining module 15, an output image generator module 16, and a print-out module 17.

The document image input module 11 is used for inputting document original in the form of a digital image to the document processor, and stores the digital image data in an input image memory 111. The area dividing module 12 divides a cluster of pixels in the document image, which are stored in the document image input module 11, into areal blocks having meanings as document elements. The LI applying module 13 applies identifiers, each having a logic meaning, respectively to the divided areas in the document image. The DI input module 14 is provided when a user instructs the use of the output document, a desired finish of the output document image, and the like. The DP determining module 15 determines, every logic identifier, parameter values on a design of the output document in accordance with the instructions entered from the DI input module 14. The output image generator module 16 picks up partial images respectively for the identifiers (applied by the LI applying module 13) from the document image stored in the input image memory 111, and processes those partial images in accordance with design parameter values for logic identifiers (which were determined by the DP determining module 15), thereby to generate an output image. The print-out module 17 is a visualizing module for visualizing the document image (generated by the output image generator module 16) on a visualizing media.

The document image input module 11 is an image scanner mechanism operating in the following way. A narrow area extending in the main scan direction is illuminated with a light source while an image reader including the light source and an image sensor is slowly moved in the vertical scan direction. Light reflected on the narrow area is collected, and transformed into corresponding electrical signals by a CCD image sensor, for example. The electrical signals are stored in the form of two-level digital image data into the input image memory 111. If required, varied intensities of the reflected light may be converted into multi-level image signals by an AD converter, and then converted into two-level digital signals through a digital image processing.

The document image input module 11 provides a process for dividing a received document image into character areas, graphic areas, and the like, and corresponds to an area division process in the document recognition technique. This can be realized using known techniques as disclosed in Japanese Patent Laid-Open Publication No. Sho. 64-15889 and Japanese Patent Publication No. Sho. 61-32712. The area dividing module 12 divides the respective areas into rectangular areas, and outputs data of the coordinate positions, width, height, and the like of the rectangular areas. Before carrying out this process, processes such as inclination correction and noise removal may be carried out in advance, if required. The areas divided by this process are classified into document elements, such as characters, graphics, ruled lines, and the like. At this time, signs to identify these document elements are attached to the document elements, and output. Strings of elements output from the module after the area division are called layout structures of the document.

The LI applying module 13 receives the layout structures of the document that are obtained by the area dividing module 12, and assigns logic names as identifiers, such as "title", "author", and "main body", to the elements in the layout structures. For the details of the assignment of identifiers, reference is made to Japanese Patent Application No. Hei. 3-313186 entitled "Apparatus and Method for Recognizing Document Logic Structures and the Contents of Documents", filed by the applicant of the present Patent Application. In the technique disclosed, structure models which describes the correspondence of the layout structure of an object to be recognized and the logic structure are previously stored. The names indicating logic meaning are assigned to the elements in the layout structures when the area division results match the structure models.

Figure 2:
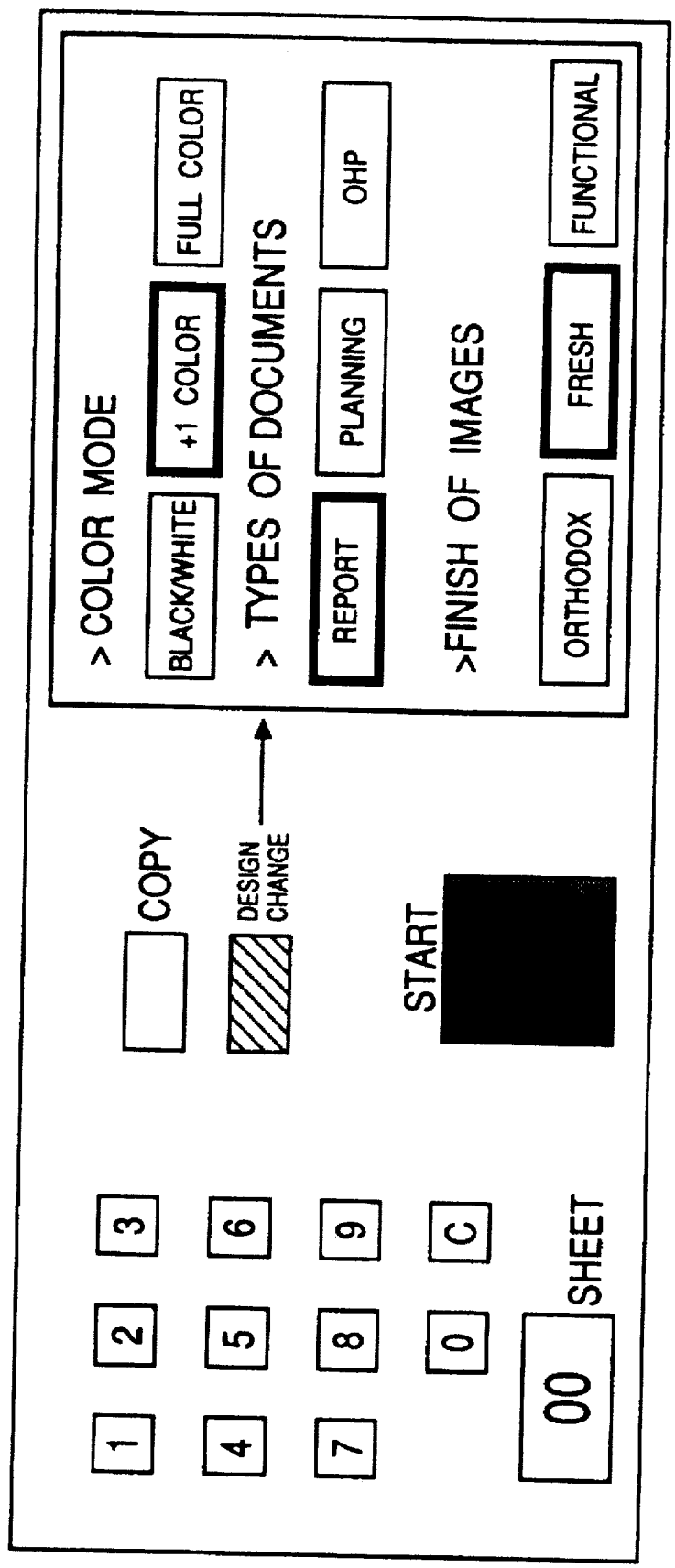
FIG. 2 is a diagram showing an example of a design instruction input module of the document processor.

The DI input module 14 may be realized by buttons, for example, which are arrayed on an operation panel of the machine. When a button is pushed, data representative of an instruction entered by the pushed button is transferred to the DP determining module 15. An example of the DI input module is illustrated in FIG. 2. As illustrated, in design instruction selections, for <Types of documents>, a desired document type is selected from among "report", "planning", and "OHP material", and for <Finish of images>, a desired finish of image is selected from among "Orthodox", "Fresh" and "Functional". Additional selections, such as "For woman" or "For executive" may be used, although these are not shown in FIG. 2. Further, a select button for selecting the size of print papers is provided. When a proper selection is performed, a signal generated when it is pushed is transferred to the DP determining module 15.

When a user enters an instruction by the related selection, the DP determining module 15 picks up the data on design parameters (provided respectively for logic identifiers corresponding to the instruction), from parameter tables in accordance with the entered instruction, and transfers the data to the output image generator module 16. The parameter tables, after classified into output paper sizes and design instruction contents, and the like, are stored in a ROM (read only memory). In handling a great amount of data, magnetic discs may be used for the data storage. The parameter table includes two types of tables; one contains design instructions and table numbers associated therewith, and the other contains the position and the maximum width of a document element with logic identifiers (e.g., "title"), and the size and character attribution of character elements. These tables describe how the final document elements are to be designed.

The data contained in the parameter tables are determined on the basis of various knowledge to determine document design including quantitative data obtained by a subjective evaluation method as described in "Evaluation on Document Presentation Quality", Proceedings 7Q-7 of the 42th National Convention IPS Japan, 1991, qualitative or quantitative data as described in "Presentation & Documentation" by Fuji Xerox corporation, 1989, and "Manner of Business Documents Presentation—2 By Color" edited by Fuji Xerox D-Promotion Group, Core Design Section and published by Nihon Keizai Shinbun, 1992, data representing the instructions set up under Company rules, and so on.

The output image generator module 16 receives the design parameter data from the DP determining module 15, the logic structure data from the LI applying module 13, and the input image from the document image input module 11. The same generates partial images of the input document image, which correspond to logic identifications, according to the parameters received from the DP determining module 15, to progressively generate an output image on an output image memory 171, and finally generates a document image with the instructed design image.

The print-out module 17 reads the output image data from the output image memory 171 and transfers it on a paper by the laser beam print technique, and provides the output in the form of prints. In this instance of the embodiment, a laser printer capable of outputting prints of one color is employed for the print-out module. Instead of the laser beams print technique, the marking technique, such as the thermal transfer technique, is available for the print-out module. Either one color or full color printing technique is allowed.

Figure 4:
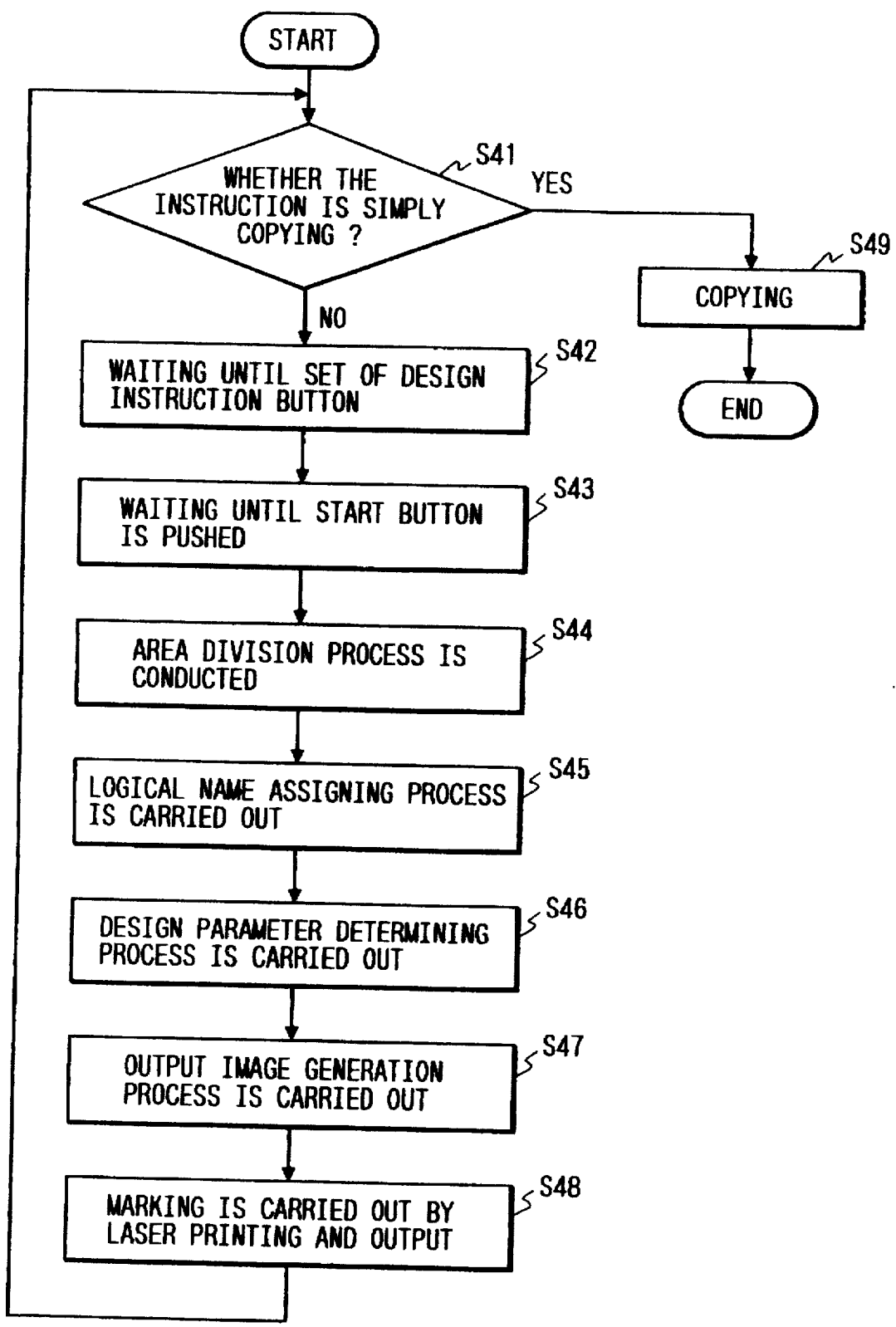
FIG. 4 is a flowchart showing a flow of inputting the document of FIG. 3.

An actual operation of the document processor thus arranged will be described using a solid written document containing characters of 12 points as shown in FIG. 3. The flowchart showing sequential processing steps is as shown in FIG. 4. In a coordinate system applied to the document, the x-coordinate extends to the right in the plane of the document, and the y-coordinate extends downward, as shown in FIG. 3. A user locates the FIG. 3 document on the platen of an image scanner, for example. Then, he selects a copy mode or a design change mode on the operation panel as shown in FIG. 2. A user selects the copy mode or the design change mode. If the design change mode is selected, he selects his desired design by operating the related design instruction button (step S41).

Figure 5:
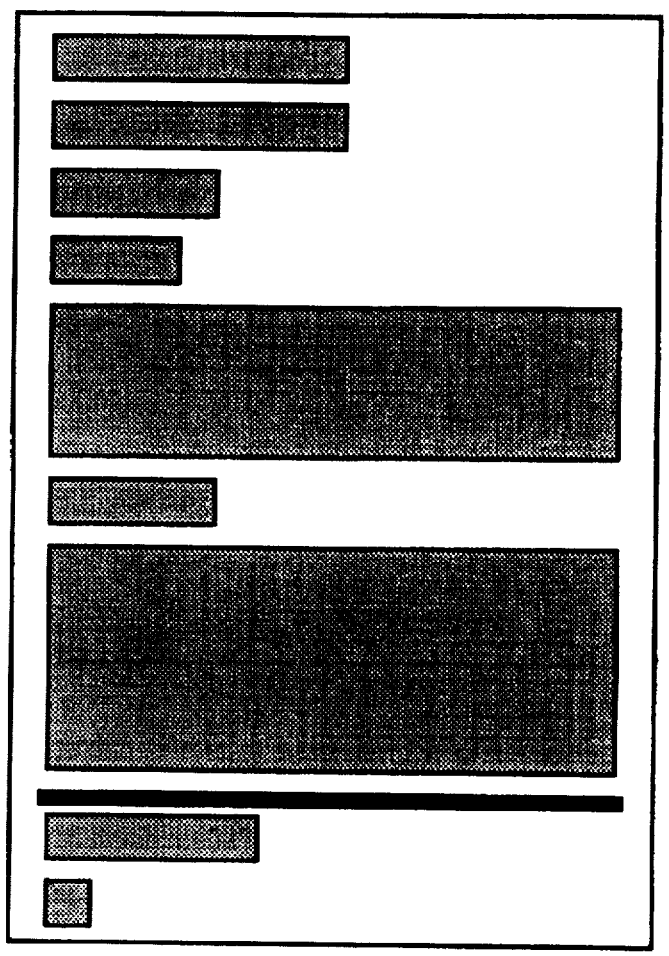
FIG. 5 is a diagram showing the results of the area division process carried out by an area dividing module in the document processor of FIG. 1.
Figure 6:
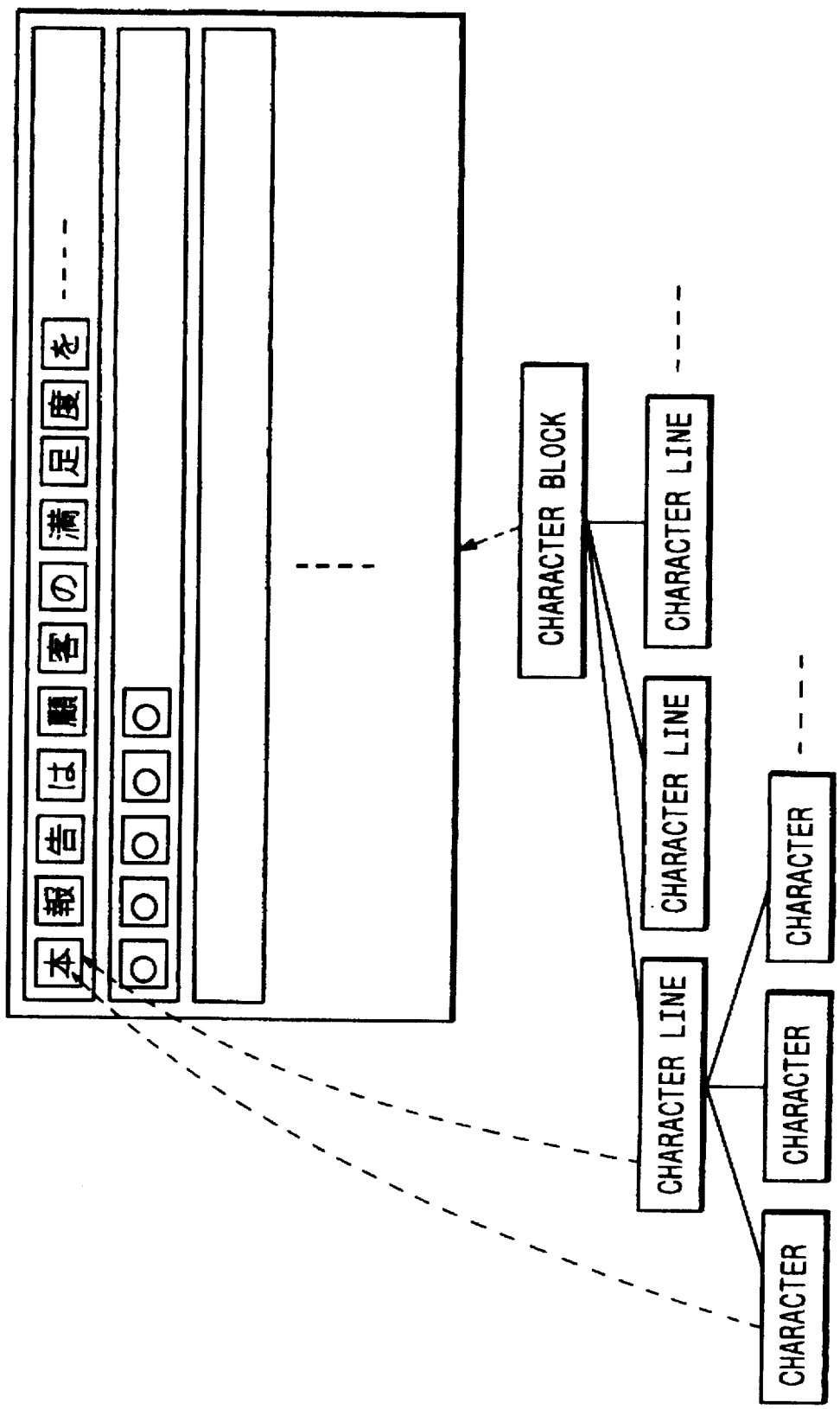
FIG. 6 is a diagram comparatively showing a layer structure of the area division results and the related portion of the input document.

It is assumed that "+1 color", "Report", "Fresh", and "A4 vertical" (paper size) are selected (step S42). Under this condition, the start button is pushed (step S43). Then, the document image input module 11 starts to scan the document, and stores the document image data into the image memory as the input image memory 111. The area dividing module 12 performs the area division process (step S44). As the result of carrying out the process, the image of FIG. 3 is divided into areas where characters are arrayed (block areas), an area containing a ruled line (ruled line area), and another area (blank space), as shown in FIG. 5. Each rectangle representing the partial image area is the smallest possible area enclosing the partial image area having the sides parallel to the x- and y-directions. The data representative of each area is basically defined by a set of "Type of area", "Left upper point of the x-coordinate", "Left upper point of the y-coordinate", "Width", and "Height". The character block area has a layer structure such that the character block area contains the data of a character line area as a low level element in the character block area, and the character line area further contains the data of each character as a low level element in the character line area. In FIG. 6, there is illustrated the storage of the area data of a part of the main body of the document in the form of the layer structure. The data representing the results of the area division process are expressed in the table form as shown in FIG. 7. The data, or a layout structure, is transferred to the LI applying module 13.

Figure 8:
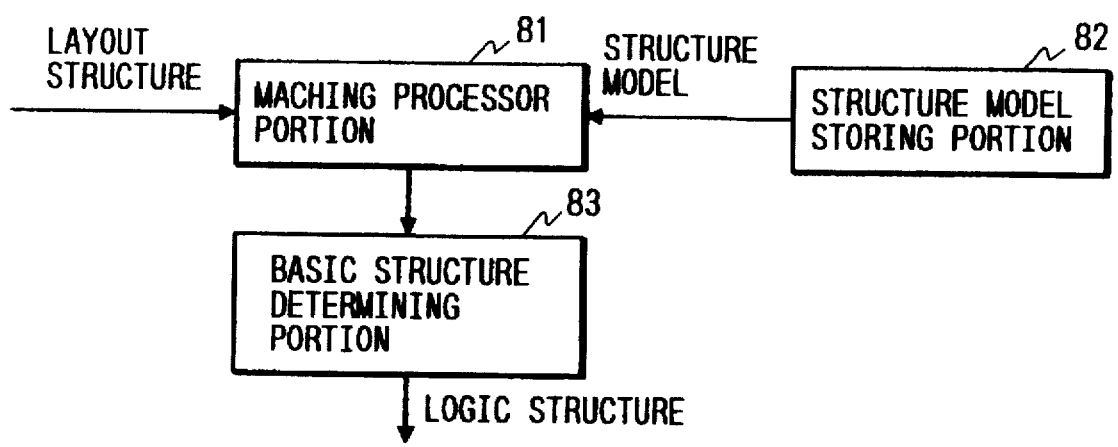
FIG. 8 is a block diagram showing the construction of a logic identifier (LI) applying module.
Figure 9:
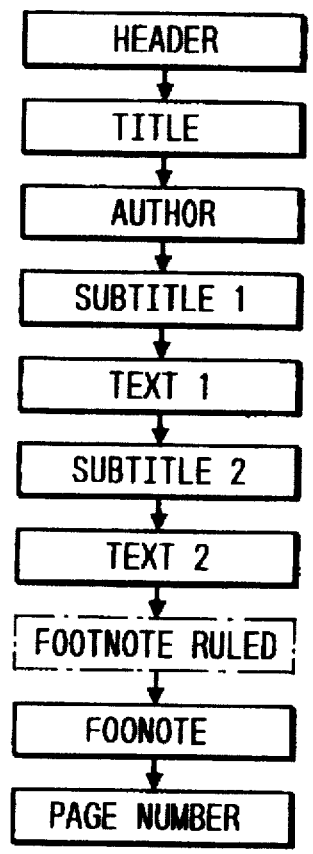
FIG. 9 is a diagram showing an example of a structure model.
Figures 10, 12:
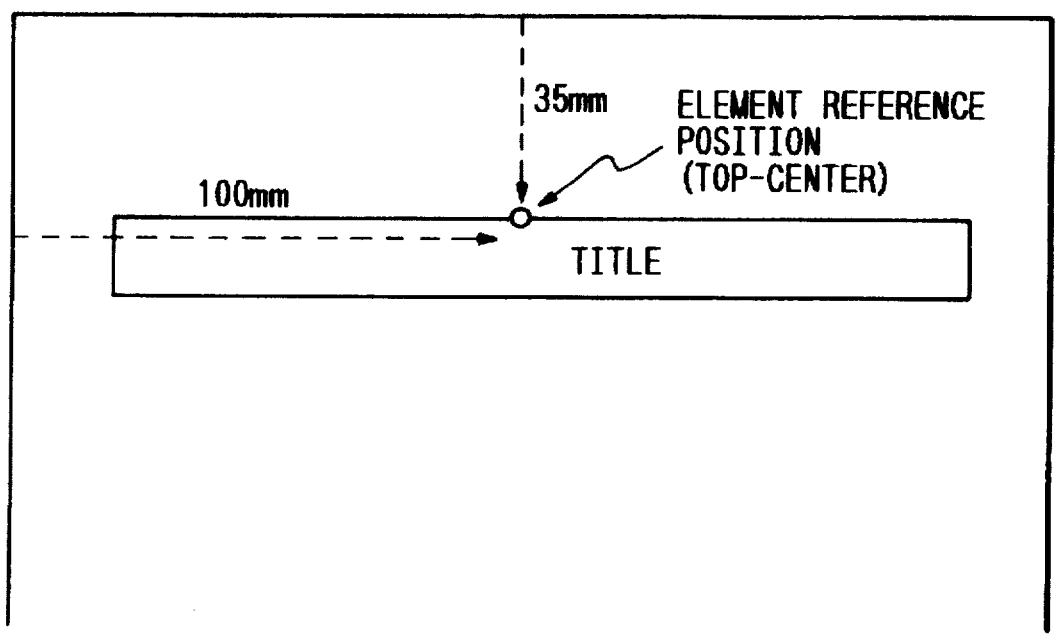
FIG. 10 is a table showing the data of logic structures each consisting of a pair of a logic name and an element.
FIG. 12 is a diagram showing an example of the contents of a parameter contained in a design parameter table.

The LI (logic identifier) applying module 13, as shown in FIG. 8, includes a matching processor portion 81 and a structure model storing portion 82. The matching processor portion 81 compares the layout structure received from the area dividing module 12 with the structure model stored in the structure model storing portion 82. The LI applying module 13 assigns identifiers as the names which indicate the logic meanings of the highest level elements in the layout structure, to the elements in the received layout structure (step 45). The names are, for example, "Title", "Author", "Subtitle", "Main body" "Footnote", and "Footnote line". The highest level element in the layout structure is the element not lower in level than any other elements in the layout structure. One identifier is assigned to the whole character block of the highest level, which constitutes the layer structure. Therefore, no identifier is assigned to the character line areas and the character areas, both being low level elements. In most documents used in specific fields, the document design is relatively fixed. For example, "Title" and "Author" are laid out the former above the latter. The structure model is based on this document nature. The structure model may be considered as a sort of template in the design of a document to be processed. A plural number of the structure models as templates are stored in a ROM. The matching processor portion 81 functions to determine whether or not the received layout structure matches with one stored structure model. The module reads out the structure models one by one, and compares with the layout structure till the matching process succeeds. If the matching process fails, the panel display presents a message to the effect that it is impossible to carry out the process. No further processing operation is continued. If the matching process succeeds, the correspondence of the elements in the layout structure and the nodes in the structure model can be known. On the basis of the known correspondence, the logic names defined for the nodes in the structure model are respectively assigned to the elements in the layout structure, which have undergone the matching process. The data of the type in which the logic names are thus assigned to the elements in the layout structure is called a logic structure. The actual data of the logic structure, as shown in FIG. 10, consists of a series of pairs of the logic names and their numbers. The numbers of the logic structure, respectively, correspond to the numbers (layout identifiers) of the respective elements in the table of FIG. 7.

The DI (design instruction) input module 14 detects the depression of the buttons of "+1 color", "Report", "Fresh", and "A4 vertical" and has already transferred the signals from these buttons to the DP (design parameter) determining module 15.

The DP determining module 15 properly selects the design parameter tables from among those design parameter tables 151 (which were classified and stored into the ROM) by the signals representative of the design instructions, which were selected by the user, and reads design parameters from the selected design parameter tables 151. The read out design parameters are transferred to the output image generator module 16 (step S46). Those design parameter tables each to be transferred to the output image generator module 16 are defined every logic name by the area reference position, maximum width, character size, character attribution, as shown in the table of FIG. 11. The reference position is expressed by the sides of the reference element in the x- and y-directions and the quantities of offset from the reference sides. The unit of the reference position is mm. The reference element is expressed by the absolute position of "Page" or a relative position of it to another element. The element reference position means a vertex position of the rectangle of the element, which is to be coincident with the position calculated using the offsets in the x- and y-directions. For example, the "Title element" instructs that the TOP-CENTER, or the center of the upper side of the "Title", is set at the position distanced 100 mm from the left end of the page and 35 mm from the top of the page (FIG. 12).

The output image generator module 16 receives the layout structure and the design parameters, and progressively converts the partial images of the input document image in accordance with the design parameters, thereby to form an output image (step S47). The instant embodiment includes two output image memories, one for the black image and the other for the +1 color image since the output image has two colors.

Figure 13:
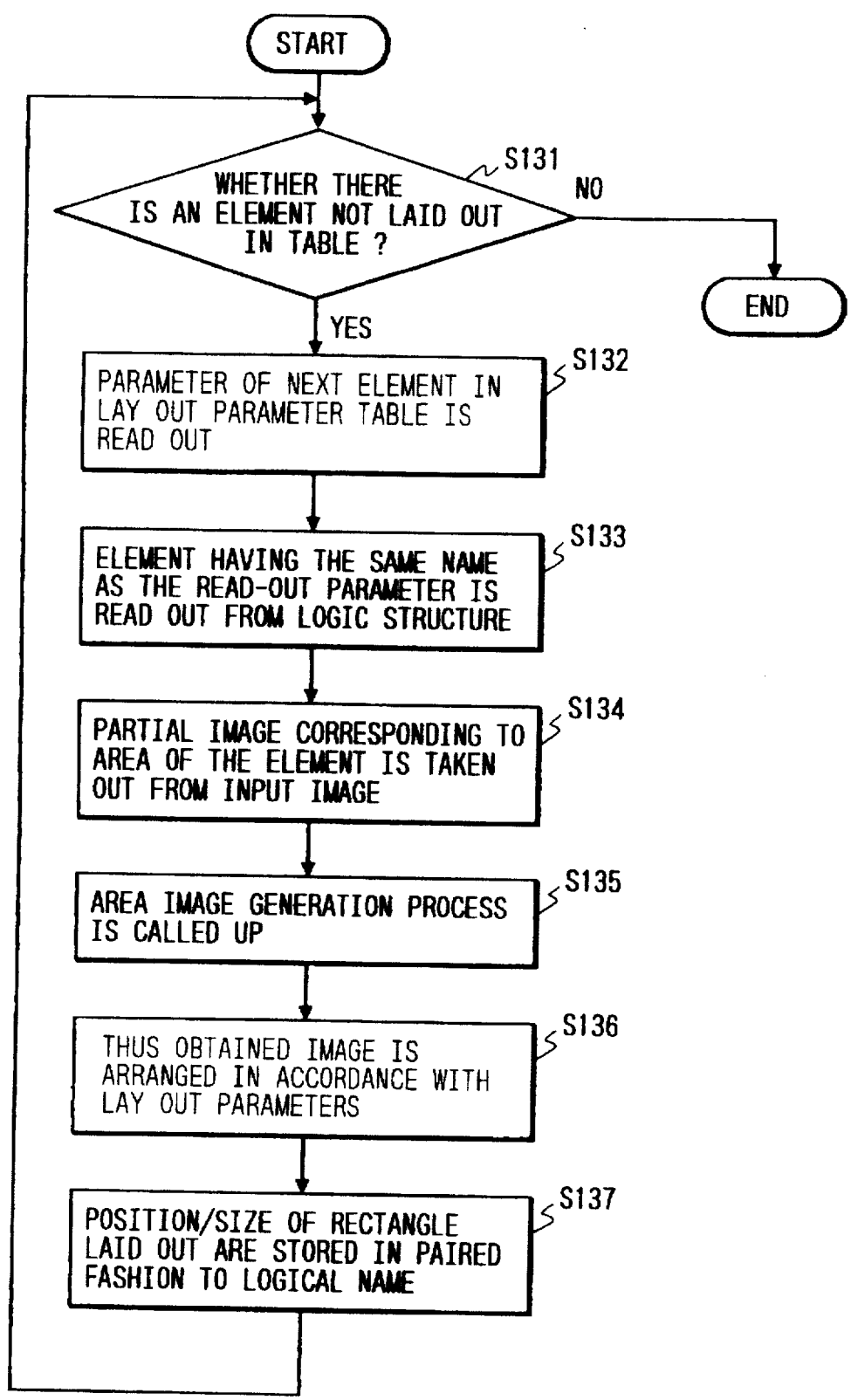
FIG. 13 is a flowchart describing the output image generation process carried out by an output image generator module.

The flowchart describing the process carried out by the output image generator module 16 is as shown in FIG. 13. Firstly, the area division results having the logic names are read out in the order of the elements in the design parameter table (steps S132 and S133). In the design parameter table, the first element is "Header". Accordingly, the element having the name of "Header" is read out of the logic structure. The area image generation process is called up (step S135) using three parameters of the layout structure element corresponding to the "Header", the design parameter of the "Header" in the design parameter table, and the partial image corresponding to the element in the input image. As the result of carrying out the process, the output image of the "Header" is gained which is specified by the design parameter. The thus obtained image is located at the position on the output image specified by the design parameter (the TOP-RIGHT, or the right upper position of the rectangle is set at the position distanced from—50 mm from the right end of the page and 10 mm from the top of the page) (step S136). The element having the color instruction of "1" is stored in the +1 color image memory, and the element having the color instruction of "0" is stored in the black image memory. Finally, the name of "Header" and the position/size of the rectangle laid out are stored in a paired fashion (step S137). Here, the operation of carrying out the process for the "Header" ends. Control checks if the element not yet laid out is present in the table (step S131). If it is present, the parameter for the next element in the layout parameter table is read out (step S132). In this instance of the embodiment, "Page number" as the next element is read out and a similar sequence of steps is repeated. When the layout of all of the elements in the table is completed, the operation of carrying out the output image generation process ends.

For the "Header", the element reference position is designated by the absolute position of the "Page". For the "Author", it is designated by a relative position. Therefore, to determine the reference position of the "Author", the position of the rectangle already laid out is required. It is for this reason that the position of the rectangle is stored when the element layout is completed.

As for the area image generation process called up every element in the design parameter table, the process is changed depending on the type of the area, character or ruled line. When the type of the area is the ruled line, an image of a simple rectilinear line is generated and repeated to form a ruled line. Thus, the input image is not used. When it is the character, the area image generation process is called up.

The character image generation process further calls up other processes of a character-confining, an area enlargement/reduction, and a character attribution.

The character-confining process rearranges the partial images picked up every character so that the images are confined within a specific width. This can be realized using any of known techniques. One of the known techniques is disclosed in Japanese Patent Laid-Open Publication No. Hei. 3-122773. The technique described in Japanese Patent Application No. Hei. 4-090146 entitled "Document Processor", filed by the same assignee of the present Patent Application, (not yet publicly known and not prior art) may also be used.

To carry out the area enlargement/reduction process after the character-confining process is carried out, a rate of enlargement r of the image must be calculated. The enlargement rate is a ratio of the character size in the input document to the character size specified by the design parameter. An average value of the height values of characters in the "Main body 1" area shows that the character size in the input document is 12 point. The character size specified by the design parameter table is 10 point. Hence, the enlargement (reduction) rate is ⅚. The character-confining width is calculated by dividing the maximum width of the design parameter by the enlargement rate. In this instance of the embodiment, the layout width is 100 mm, so that the character-confining width is 120 mm. The character-confining process rearranges the characters in this area so as to confine them within this character-confining width.

Figure 14:
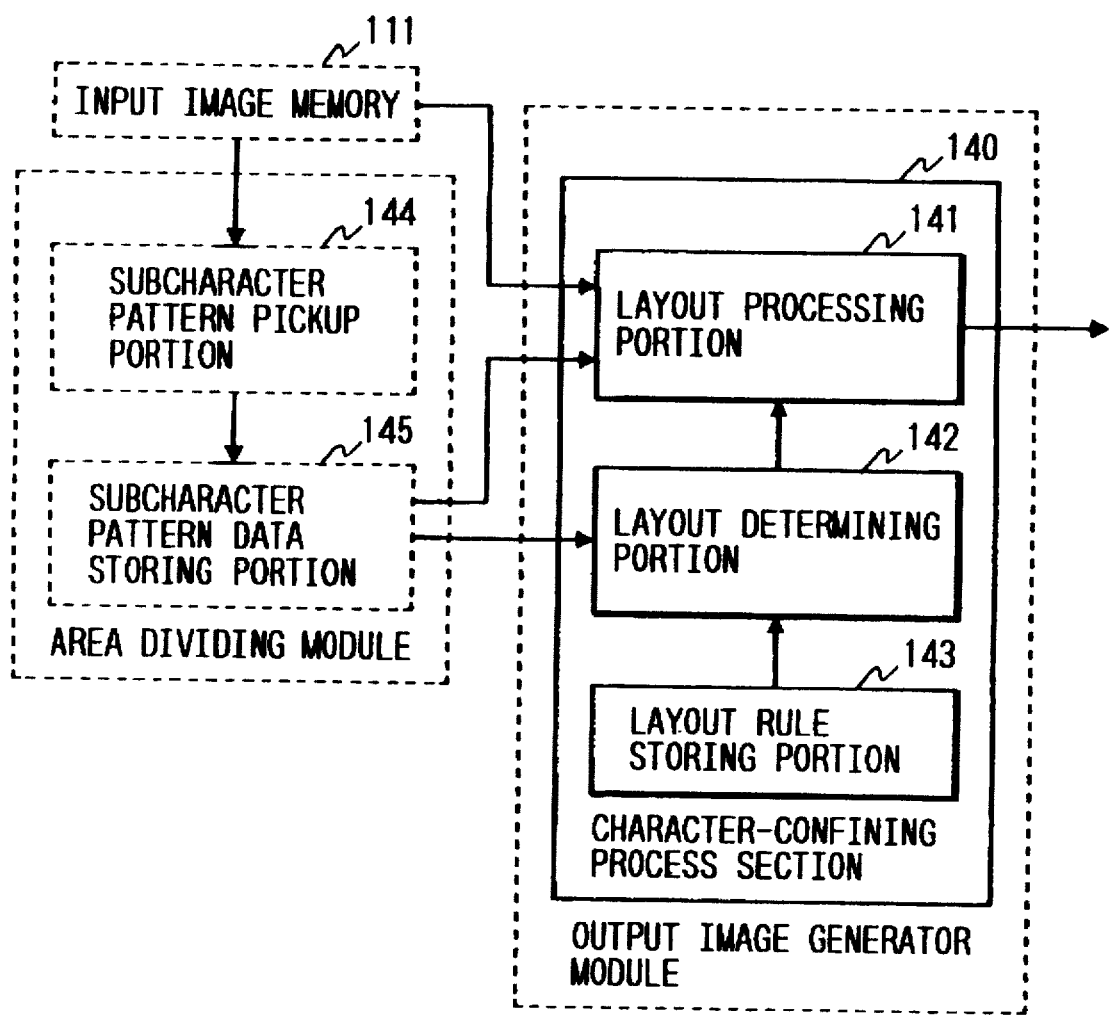
FIG. 14 is a block diagram showing an example of the arrangement for confining the images picked up every character within a specific width.

When the technique disclosed in Japanese Patent Application No. Hei. 4-090146 is used for the character-confining process, a portion of the document processor, which carries out the character-confining process, is arranged as shown in FIG. 14, for example. This will be described with reference to FIG. 14. In the area dividing module, a subcharacter pattern pickup portion 144 and a subcharacter pattern data storing portion 145 are provided. The subcharacter pattern pickup portion 144 picks up subcharacter patterns. The subcharacter pattern data storing portion 145 stores the data on the subcharacter patterns picked up. In the output image generator module, a character-confining process section 140 is provided, which picks up the subcharacter patterns in the image data, which is stored in the input image memory 111, on the basis of the subcharacter pattern data, which is stored in the subcharacter pattern data storing portion 145. The character-confining processing section 140 includes a layout rule storing portion 143, a layout determining portion 142, and a layout processing portion 141. The layout rule storing portion 143 stores the rules on the layout of the subcharacters. The layout determining portion 142 determines whether or not the beginning and end of a line of characters are proper or not according to the subcharacter pattern data of the subcharacter pattern data storing portion 145 and the rules of the layout rule storing portion 143. The layout processing portion 141 picks up the subcharacter patterns from the document image stored in the input image memory 111 on the basis of the results of the determination by the layout determining portion 142 and the subcharacter pattern data, which is stored in the subcharacter pattern data storing portion 145, and lays out the subcharacter patterns within a desired area.

The subcharacter pattern pickup portion 144 picks up the subcharacter patterns, for example, in a manner that rectangular areas circumscribing clusters of black pixels in the image data is obtained and then those satisfying predetermined conditions are selected. The subcharacter pattern data storing portion 145 stores the information on the picked up subcharacter patterns, for example, the positions and ranges of the circumscribing rectangular areas, and their positions relative to the line height. In this embodiment, as recalled, the area dividing module 12 picks up the character areas on the basis of the layer structure (see FIG. 6). In the layer structure, the subcharacter patterns belong to the layer of the lowest level.

The character-confining processing section 140 picks up the subcharacter patterns from the image memory 111 on the basis of the subcharacter pattern data, and lays out the subcharacter patterns within a desired area. The layout rule storing portion 143 stores the layout rules on the conditions for those subcharacter patterns prohibited from being located at the beginning and end of the line when a new line is started. The layout determining portion 142 compares the attributive data of the subcharacter patterns, such as circumscribing rectangles data stored in the subcharacter pattern data storing portion 145, with the layout rules to verify the possibility of starting a new line, whether or not a space is inserted between the subcharacter patterns, and the like. The layout processing portion 141 reads the subcharacter patterns from the input image memory 111 on the basis of the position and range data contained in the subcharacter pattern data, and rearranges the characters on the basis of the determining results from the layout determining portion 142.

Then, the area enlargement/reduction process is called up. In this process, the character-confined image is enlarged or reduced so that the layout width thereof falls within 100 mm, according to the enlargement rate.

Finally, the character attribution process is called up. This is realized by the image process, which is executed according to the designated character attributions in the design parameters. For the "Subtitle", for example, in the design parameter, the "bold" is designated. This can be realized in a manner that the whole image is shifted several dots and the results are logically summed. In addition to the "bold", "Italics", "Inversion", the combination of them, or addition of the "Frame" can be realized by a simple image process.

Figure 16:
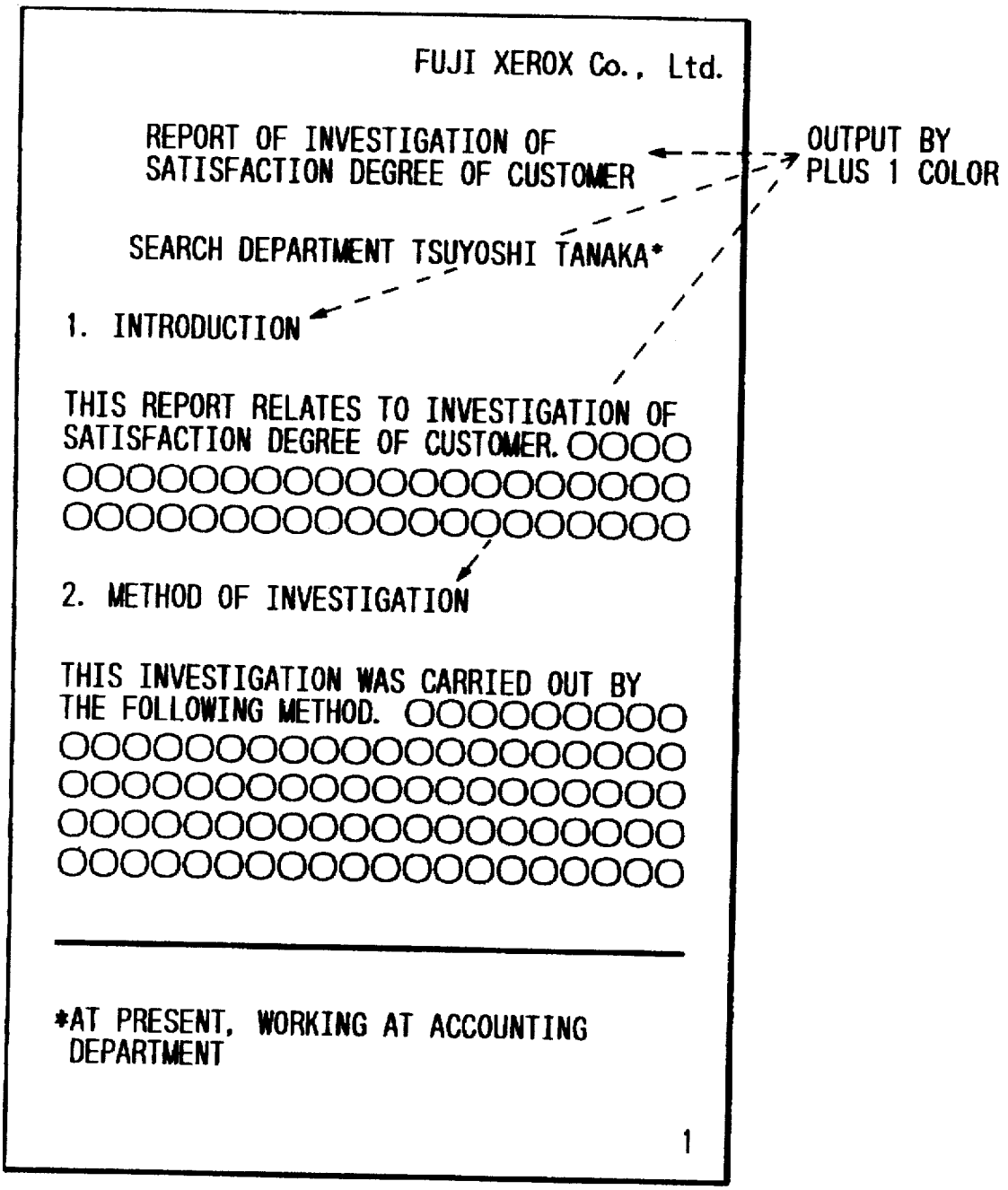
FIG. 16 is a diagram of an image printed out on a paper by the print out module.

Two types of output images formed by carrying out the processes as described above are illustrated in FIG. 15. The title, and the subtitles 1 and 2 are located in the +1 color image. The black image and the +1 color image are read out line by line, and printed out in the related colors on a normal paper by the laser printing technique. The resultant output image is as shown in FIG. 16 (step S148).

As described above, the user, even if he has no document design knowledge, can prepare documents of good design as desired, from solid written documents.

(Second embodiment)

Figure 17:
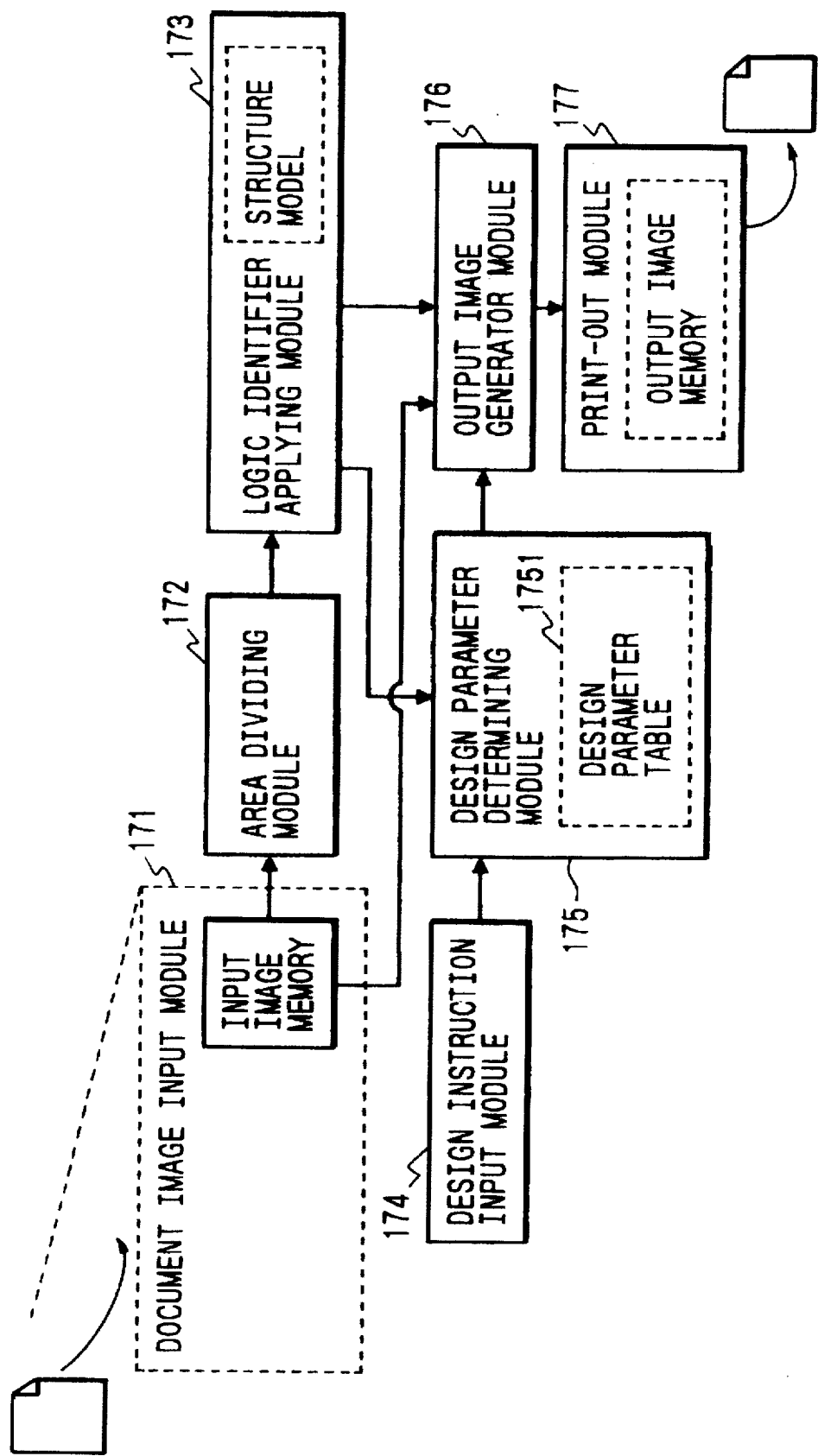
FIG. 17 is a block diagram showing an arrangement of a document processor according to a second embodiment of the present invention.

FIG. 17 is a block diagram showing an arrangement of a document processor according to a second embodiment of the present invention.

In the second embodiment, when a DP (design parameter) determining module 175 transfers the data of design parameters provided for each logic identifier, which is based on the designation by the user to an output image generator module 176, the DP determining module 175 makes use of the output from an LI (logic identifier) applying module 173, thereby performing efficient and effective processings.

More specifically, when according to the instructions entered by the user, the DP determining module 175 transfers the design parameter data for each logic identifier corresponding to the instruction from a design parameter table 1751 to the output image generator module 176, the DP determining module 175 receives information, e.g., information as to what logic identifier the layout structure contained in the input document has, from the LI applying module 173, and transfers only necessary logic identifiers to the output image generator module 176.

The remaining arrangement of the document processor of the second embodiment is substantially the same as that of the first embodiment.

A specific example of this follows. The buttons of "+1 color", "Report", and "Fresh" are pushed. In response to the pushing, a DI (design instruction) input module 174 outputs signals representative of the functions associated with the buttons. Those signals are sent to the DP determining module 175. At this time, the LI applying module 173 has transferred to the DP determining module 175 a list of logic names such as "Header", "Title", and "Author", indicating that the logic structures associated with the logic names are contained in the input document.

The DP determining module 175 reads design parameters from the ROM by the signals representative of design instructions selected by the user, and selects only the design parameters corresponding to the listed logic names received from the LI applying module 173, and sends the parameters to the output image generator module 176. In this way, an efficient data transfer is realized.

In a modification of the second embodiment, the DP determining module 175 includes a plural number of design parameter tables 1751 which operate in connection with the signals from the DI input module 174. The best table or tables are selected from among those tables according to the list of logic names received from the LI applying module 173, e.g., information of presence or absence of the logic name "Author" or "Main body 2". The modification provides the more exact coincidence of the request by the design instruction with the logic element. In this respect, more delicate and effective design instructions are realized.

In another modification of the second embodiment, the DI input module 174 additionally includes a button for instructing the enlargement/reduction rate of the output paper size in connection with the document paper size. Such a button is usually used in the copying machine. When "100% (magnification)" is selected by means of the button, the output of the LI applying module 173 is processed to show that the document size is "A4 vertical". The output paper size is calculated on the basis of the document size. The second modification enables the machine to accept a variety of design instructions.

(Third Embodiment)

Figure 18:
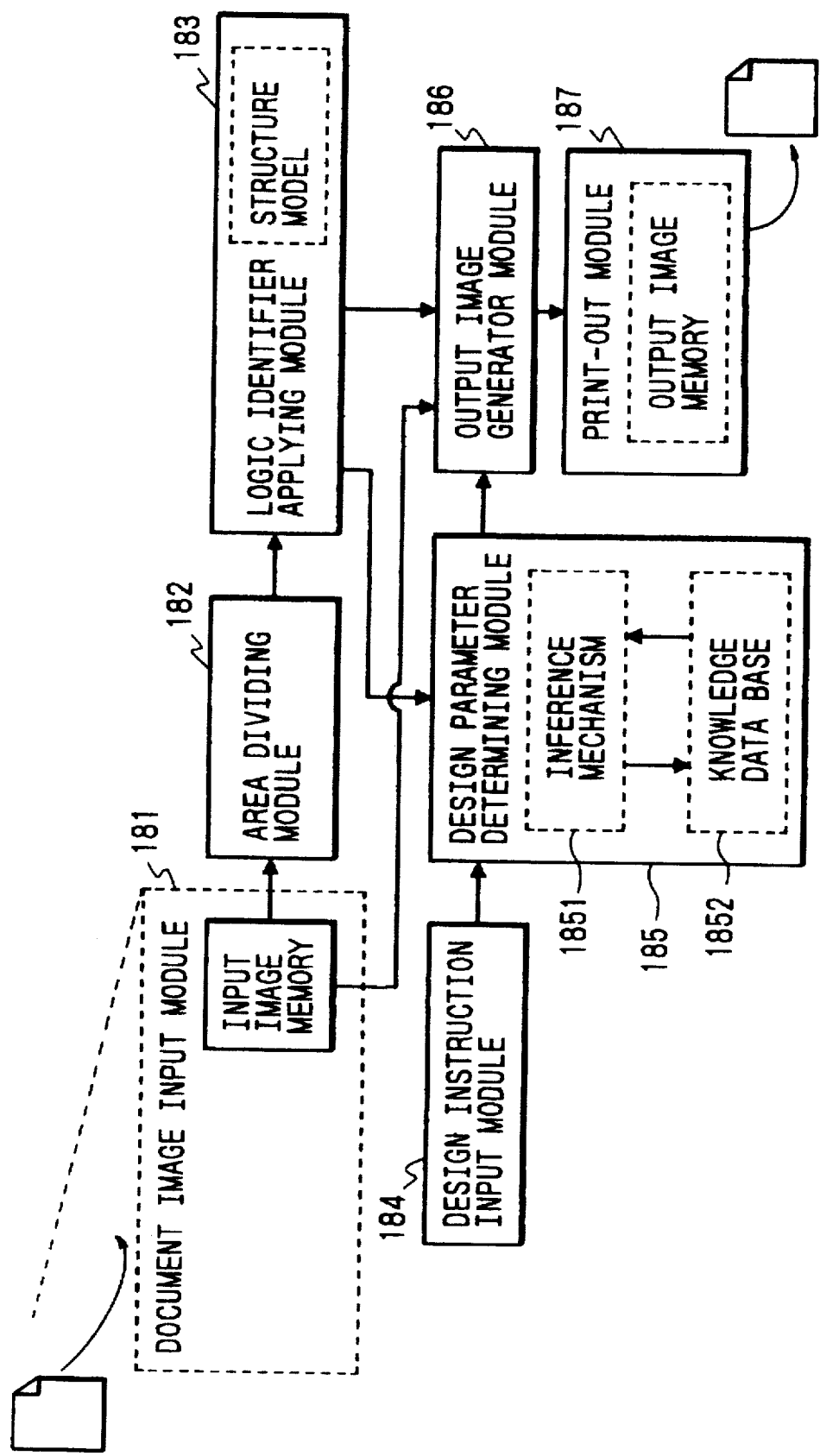
FIG. 18 is a block diagram showing an arrangement of a document processor according to a third embodiment of the present invention.

FIG. 18 is a block diagram showing an arrangement of a document processor according to a third embodiment of the present invention.

As shown, the DP (design parameters) determining module 185 is comprised of an inference mechanism 1851 and a knowledge data base (inference engine) 1852. The knowledge data base 1852 stores the designation items from the DI (design instruction) input module 184, the data from the LI (logic identifier) applying module 183, design parameters, and knowledge describing the relationships among those items and data. The inference mechanism 1851 executes the forward and backward inference processes while referring to the knowledge data base 1852 on the basis of the data from the LI applying module 183, thereby determining necessary design parameters.

The sequence of the inference steps by the inference mechanism 1851 will be described with reference to FIG. 19.

Figure 19:
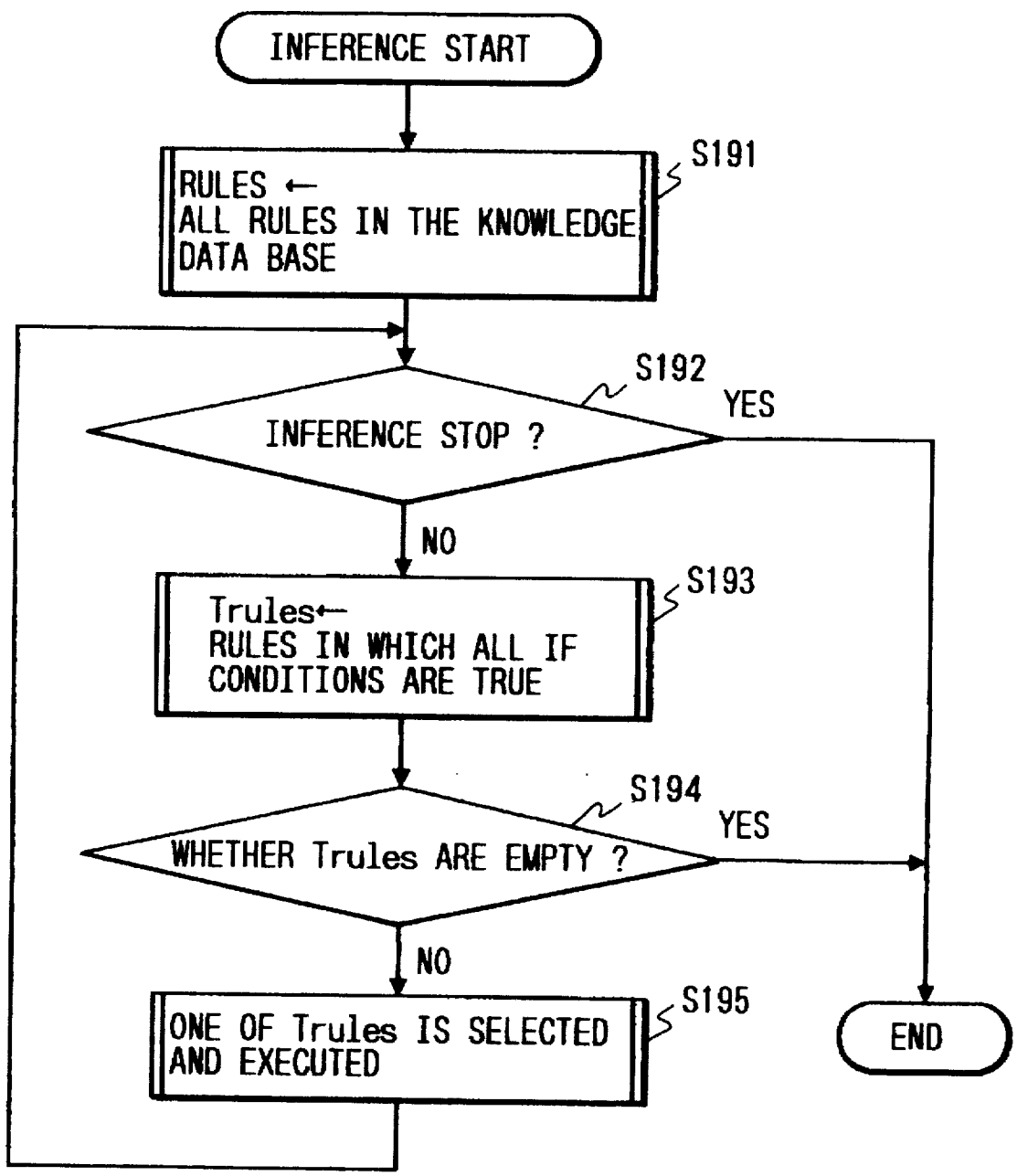
FIG. 19 is a flowchart showing sequential steps of the operation of the inference mechanism.

The DP determining module 185, as shown in FIG. 19, receives an instruction of inference start, and then takes all of the rules described in the IF-THEN form from the knowledge data base 1852 by the action of the inference engine, and treats as "rules" (step S191).

The DP determining module finds all of the "rules" in which the conditions in the IF conditional parts are true on the basis of the data received from the DI input module 184 and the LI applying module 183, and treats them as "Trules" (step S193).

The DP determining module selects one rule from among the "Trules", and executes the instruction described in the THEN execution part of the selected rule (step S193). The select and execution steps are repeated till the "Trules" become empty (step S194) or an instruction to stop the inference by the THEN execution part is issued (step S192). Through the inference procedure, the DP determining module 185 determines the design parameters suitable for the design instructions.

The knowledge data base 1852, which is constructed with a magnetic disk device or an optical disk device, for example, stores the data indicating the relationships of information on the use of documents and image finish and the design parameters, such as positions and character sizes of the respective logic elements. The data is described by any of suitable knowledge expressing methods, such as the IF-THEN form and the frame form. The item of the knowledge stored in the knowledge data base 1852, for example, "If a document to be printed is specified such that the image finish is fresh, the paper size is A4 vertical, and the setup is lateral, and the character size of the title is 14 point and the width is less than 100 mm, then the title character size is expanded up to 24 point." is described in the form as shown in FIG. 20. The knowledge data contains various knowledge to determine document design including quantitative data obtained by a subjective evaluation method as described in "Evaluation on Document Presentation Quality", Proceedings 7Q-7 of the 42th National Convention IPS Japan, 1991, qualitative or quantitative data as described in "Presentation & Documentation" by Fuji Xerox corporation, 1989, and "Manner of Business Documents Presentation—2 By Color" edited by Fuji Xerox D-Promotion Group, Core Design Section and published by Nihon Keizai Shinbun, 1992, data representing the instructions set up under Company rules, and so on.

The method of expressing general knowledge data base and the inference engine construction are discussed in detail in "Expert System" written by F. Heize-Loss et al, translated by AIUEO, published by SANGYOH TOSHO corporation (Japan), 1985, for example.

The remaining arrangement of the document processor of the third embodiment is substantially the same as that of the second embodiment.

The operation of the document processor according to the third embodiment will be described in detail. The document shown in FIG. 3 is used for the operation description.

In this embodiment, the DP determining module 185 infers and determines the optimum value for each design element on the basis of the instruction signals from the DI input module 184 and the information from the LI applying module 183, while referring to the knowledge data base 1852.

It is assumed that the select information "Document type: report", "Color mode: +1 color", and "Image finish: fresh" is transferred from the DI input module 184 to the DP determining module 185. The DP determining module also receives the information on the logic elements "Title", "Main body", and the like from the LI applying module 183, in addition to the select information.

In the DP determining module 185, the rule as shown in FIG. 20 is executed according to the procedure as shown in FIG. 19. The rule is selected as the result of the fact that the IF conditional part is true by the information such as "document.type: A4 vertical" and "document.title.rectangle width: 80). This means that when the paper size is A4 vertical, the setup is lateral, and the title character is 14 point, if the title width is less than 100 mm, the title character size is decisively set to 24 point. In a case that the "document.title.rectangle width: 120 mm, not 80 mm, the rule shown in FIG. 21 is executed instead of the FIG. 20 rule. This means: When the paper size is A4 vertical, the setup is lateral, and the title character is 14 point, and the title width is 100 mm or more, if the title character size is set to 24 point, two lines must be required to print the title or the title is too large. Accordingly, the title character is set to 18 point, smaller than 24 point, but is highlighted using bleached-out Italics.

Additionally, the rule as shown in FIG. 22 and others are progressively executed. The values of other design elements are determined. In this way, the necessary design parameters are all determined. And the inference process ends.

The design parameters thus determined are sent to the output image generator module 186, and the process is carried out as in the first embodiment.

(Fourth embodiment)

As described above, any of the conventional document processor is incapable of changing, as intended, the character size, column conversion, and the like in accordance with a common format of the document.

The document processor according to this embodiment of the present invention is provided for solving the problem of the prior art. In response to simple instructions in the document design, the instant document processor is capable of automatically changing, as intended, the character size, column conversion, and the like in an input document, and outputting a document formatted according to the instructed document design.

The document processor, like that shown in FIG. 1, is comprised of an document image input module 11, an area dividing module 12, a logic identifier (LI) applying module 13, a design instruction (DI) input module 14, a design parameter (DP) determining module 15, an output image generator module 16, and a print-out module 17.

The document image input module 11 is used for inputting a document original in the form of a digital image to the document processor, and stores the digital image data in an input image memory 111. The area dividing module 12 divides a cluster of pixels in the document image, which are stored in the document image input module 11, into areal blocks having meanings as document elements. The LI applying module 13 applies identifiers each having a logic meaning respectively to the divided areas in the document image. The DI input module 14 is provided when a user instructs the use of the output document, a desired finish of the output document image, and the like. The DP determining module 15 determines, every logic identifier, parameter values on a design of the output document in accordance with the instructions entered from the DI input module 14. The output image generator module 16 picks up partial images respectively for the identifiers (applied by the LI applying module 13) from the document image (stored in the input image memory 111), and processes those partial images in accordance with design parameter values for logic identifiers (which were determined by the DP determining module 15), thereby to generate an output image. The print-out module 17 visualizes the document image (generated by the output image generator module 16) on a visualizing media.

In the arrangement of the fourth embodiment, the document image input module 11, the area dividing module 12, the LI (logic identifier) applying module 13, and the print-out module 17 have exactly the same functions as those in the first embodiment. The DI (design instruction) input module 14, the DP (design parameter) determining module 15, and the output image generator module 16, unlike those in the first embodiment, have the functions to change the format of columns.

The fourth embodiment of the present invention will be described in detail placing emphasis on the different points of the fourth embodiment from the first embodiment.

Figure 23:
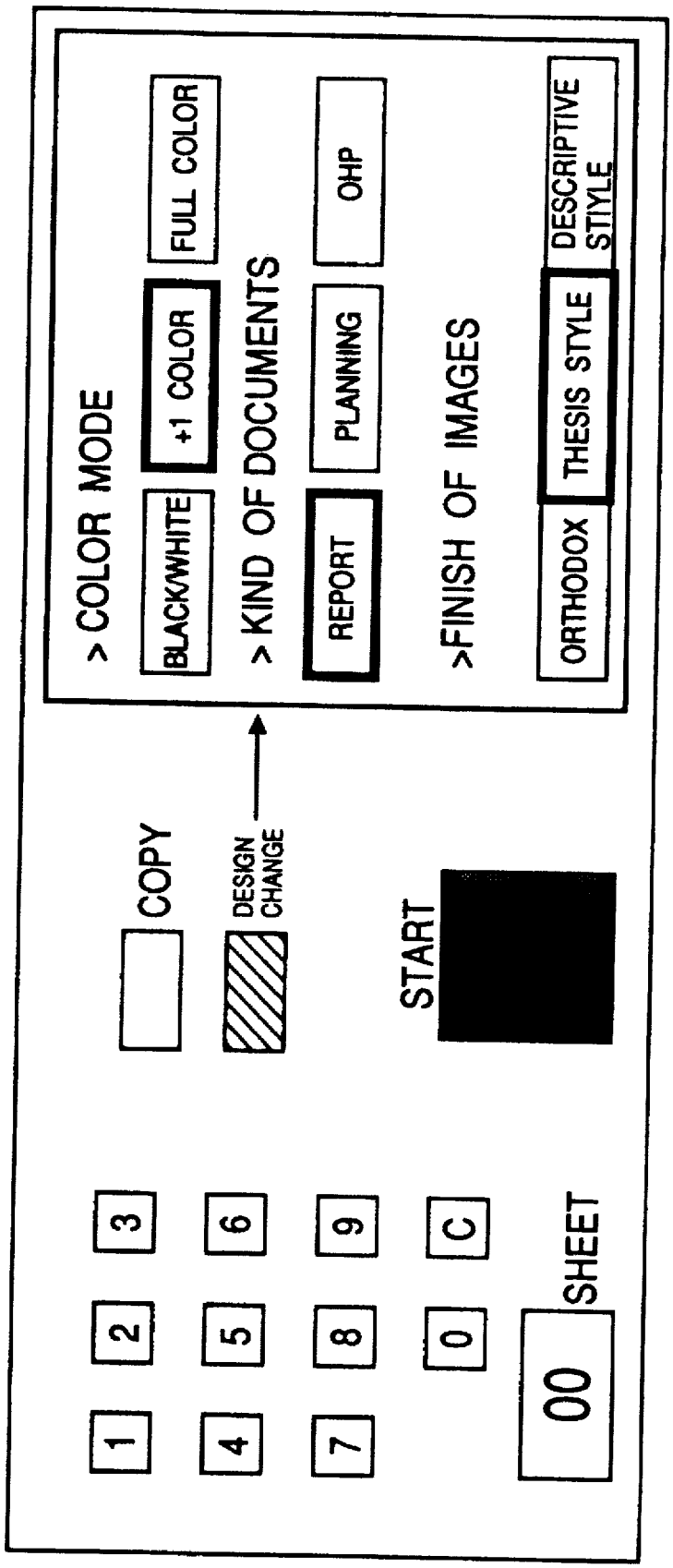
FIG. 23 is a diagram showing an example of a design instruction input module of the document processor.

The DI input module 14 may be realized by buttons, for example, which are arrayed on an operation panel of the machine. When a button is pushed, data representative of an instruction entered by the pushed button is transferred to the DP determining module 15. An example of the DI input module is illustrated in FIG. 23. As illustrated, in design instruction selections, for <Finish of images>, a desired finish of image is selected from among "Orthodox", "Thesis style", and "Descriptive style". Additional, a select button for selecting the size of print papers is provided. When a proper selection is performed, a signal generated when it is pushed is transferred to the DP determining module 15.

When a user enters an instruction by the related selection, the DP determining module 15 picks up the data on design parameters every logic identifier corresponding to the instruction, from a parameter table 151 in accordance with the entered instruction, and transfers the data to the output image generator module 16. The parameter table 151, after the contents thereof are classified into output paper sizes and design instruction contents, and the like, are stored in a ROM (read only memory). When a great amount data is handled, magnetic discs may be used for the data storage. The parameter table consists of two types of tables; one contains design instructions and table numbers associated therewith, and the other contains the position and the maximum width of a document element having a logic identifier (e.g., "title"), and the size and character attribution when the document element is the character. These tables describe how the final document elements are to be designed. The "Thesis style" as one of the selections in <Finish of Images> designates a document design indicating that in laying out a part of the main body on one page, the largest possible amount of the main body is set in two columns. The "Descriptive style" designates another document design indicating that the description is set in two columns every chapter. The "Orthodox" designates still another document design indicating that the description is set in one column, but the title and the author are centered. The data contained in the parameter tables, as in the first embodiment, are determined on the basis of various knowledge to determine document design including quantitative data obtained by a subjective evaluation method as described in "Evaluation on Document Presentation Quality", Proceedings 7Q-7 of the 42th National Convention IPS Japan, 1991, qualitative or quantitative data as described in "Presentation & Documentation" by Fuji Xerox corporation, 1989, and "Manner of Business Documents Presentation—2 By Color"edited by Fuji Xerox D-Promotion Group, Core Design Section and published by Nihon Keizai Shinbun, 1992, data representing the instructions set up under Company rules, and so on.

The output image generator module 16 receives the design parameter data from the DP determining module 15, the logic structure data from the LI applying module 13, and the input image from the document image input module 11. The same generates partial images of the input document image, which correspond to logic identifications, according to the parameters (including column instructions) received from the DP determining module 15, to progressively generate an output image on an output image memory 171, and finally generates a document image with the instructed design image.

The operation of the document processor thus arranged will be described using three types of documents as shown FIGS. 24a to 24c. These documents are all monochromatic documents. The type of the document is a cover page of thesis. The common elements in the documents are laid out in different document designs. A flow of the operation is substantially the same as that shown in FIG. 4 showing the first embodiment. In a coordinate system applied to the document, the x-coordinate extends to the right in the plane of the document, and the y-coordinate extends downward, as shown in FIG. 24a. A user locates one of the documents (FIGS. 24a to 24c) on the platen of an image scanner, for example. Then, he selects a copy mode or a design change mode on the operation panel as shown in FIG. 23. A user selects the copy mode or the design change mode. If the design change mode is selected, he selects his desired design by operating the related design instruction button.

Figure 25:
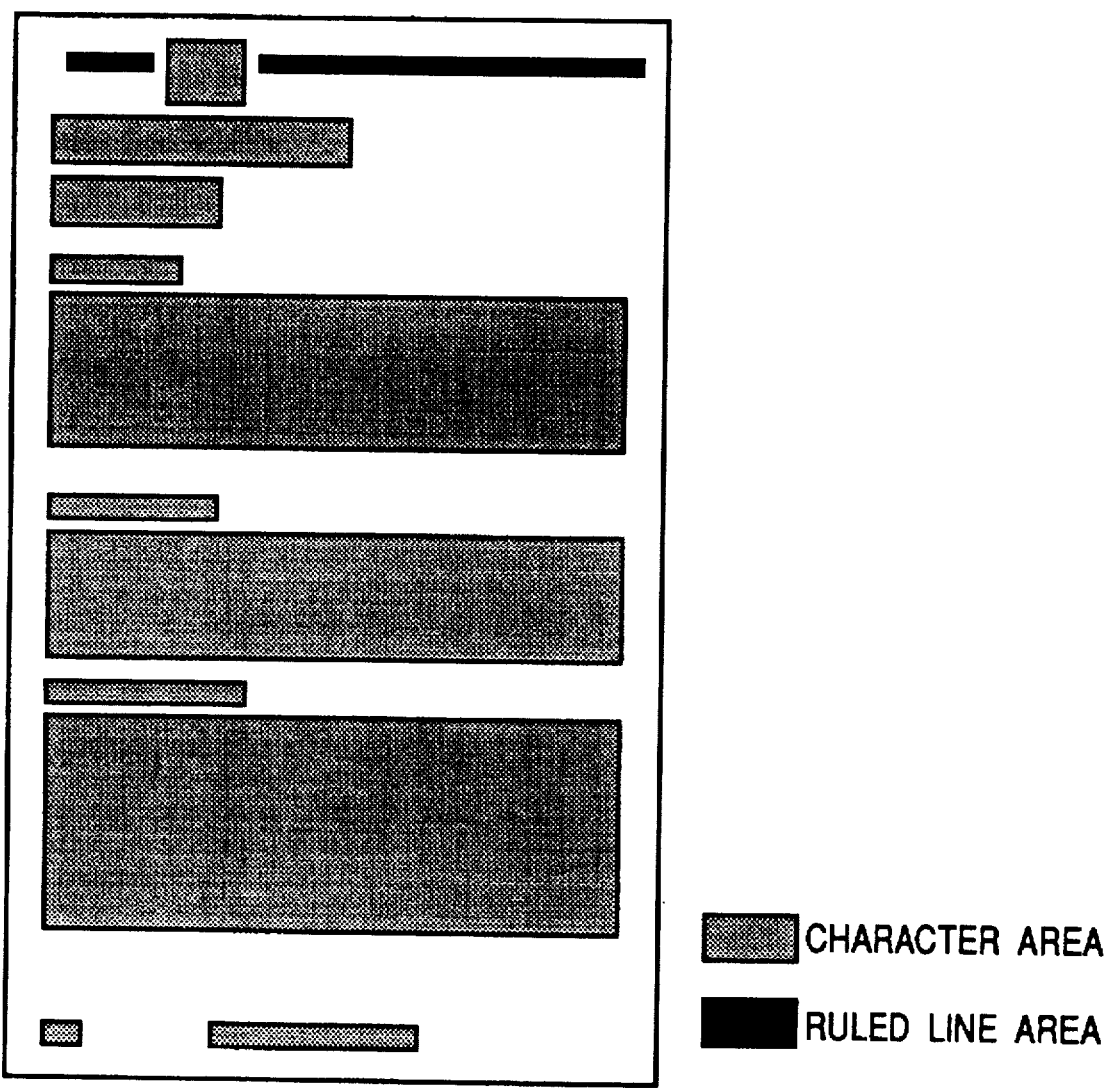
FIG. 25 is a diagram showing the results of the area division process carried out by the area dividing module.

It is assumed that "+1", "Thesis style", and "A4 vertical" (paper size) are selected. Under this condition, the start button is pushed. Then, the document image input module 11 starts to scan the document, and stores the document image data into the image memory as the input image memory 111. The area dividing module 12 carries out the area division process. As the result of carrying out the process, the input image of FIG. 24a is divided into areas where characters are arrayed (block areas), an area containing a ruled line (ruled line area), and another area (blank space), as shown in FIG. 25. Each rectangle representing the partial image area is the smallest possible area enclosing the partial image area having the sides parallel to the x- and y-directions. The data representative of each area is basically defined by a set of "Type of area", "Left upper point of the x-coordinate", "Left upper point of the y-coordinate", "Width", and "Height". The character block area has a layer structure such that the character block area contains the data of a character line area as a low level element in the character block area, and the character line area further contains the data of each character as a low level element in the character line area. The data representing the results of the area division process are expressed in the format as shown in FIG. 7. The data, or a layout structure, is transferred to the LI applying module 13.

Figure 26A:
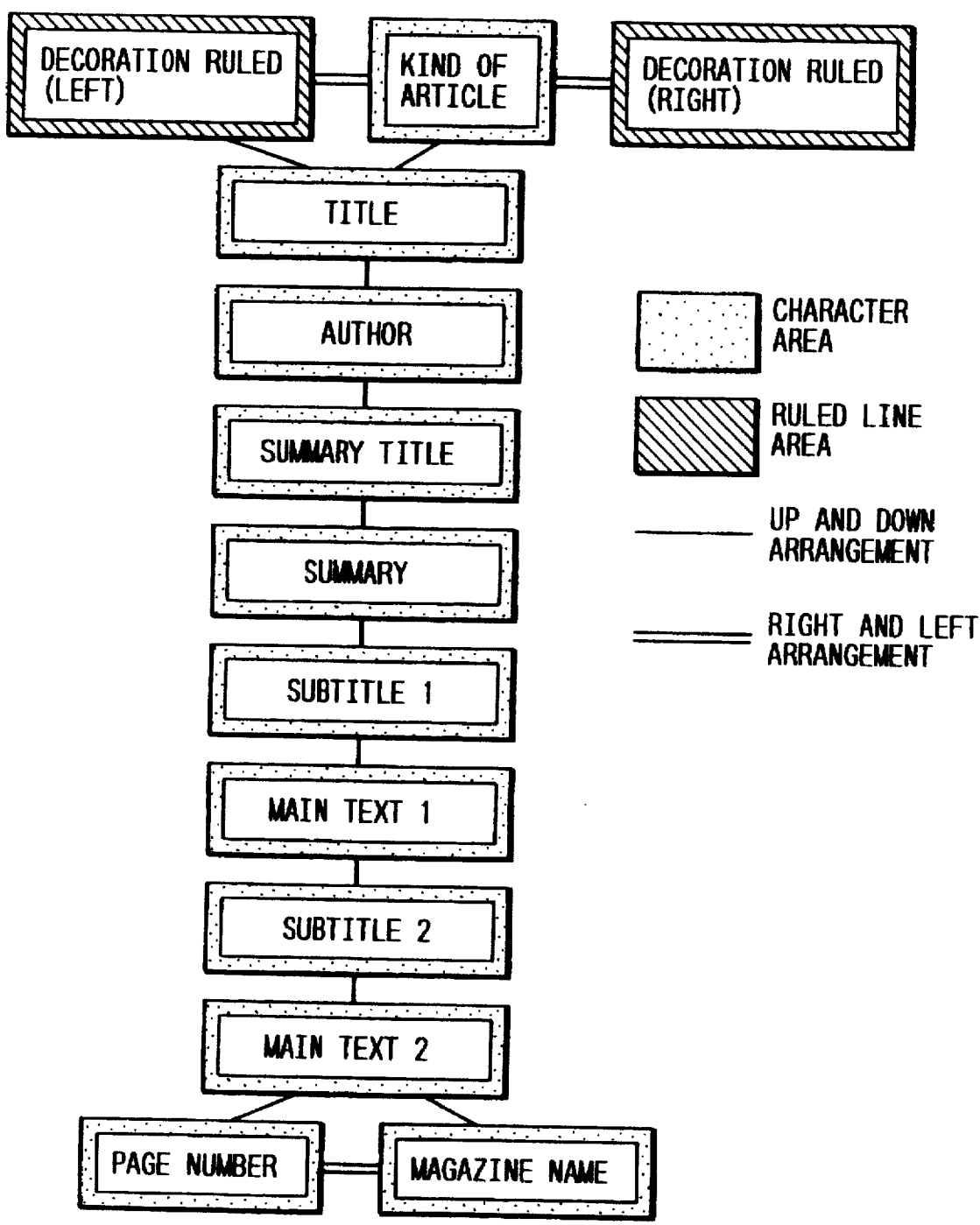
FIG. 26a is a diagram showing an example of the structure model in the form of a graph structure.
Figure 26B:
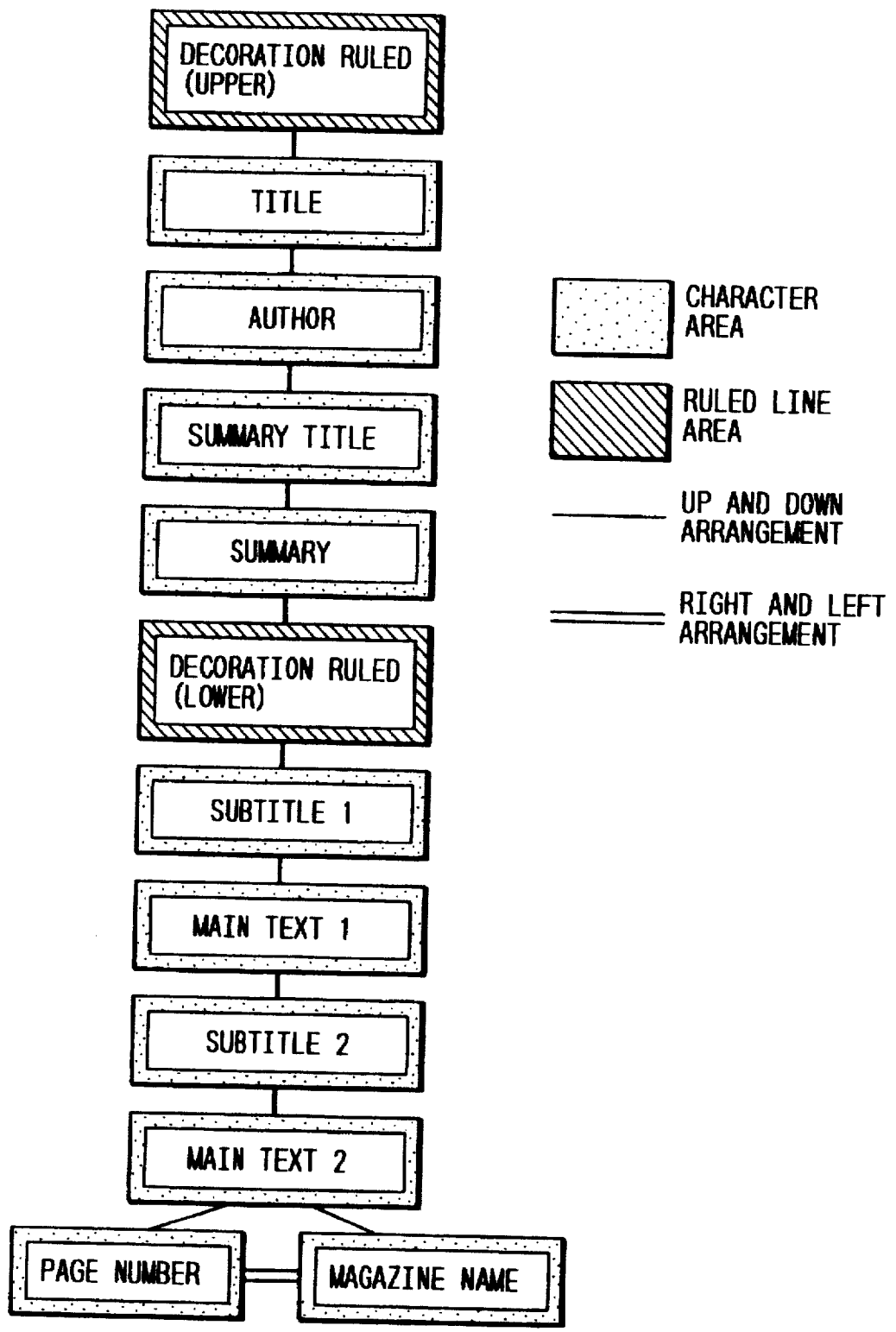
FIG. 26b is a diagram showing another example of the structure model in the form of a graph structure.
Figure 26C:
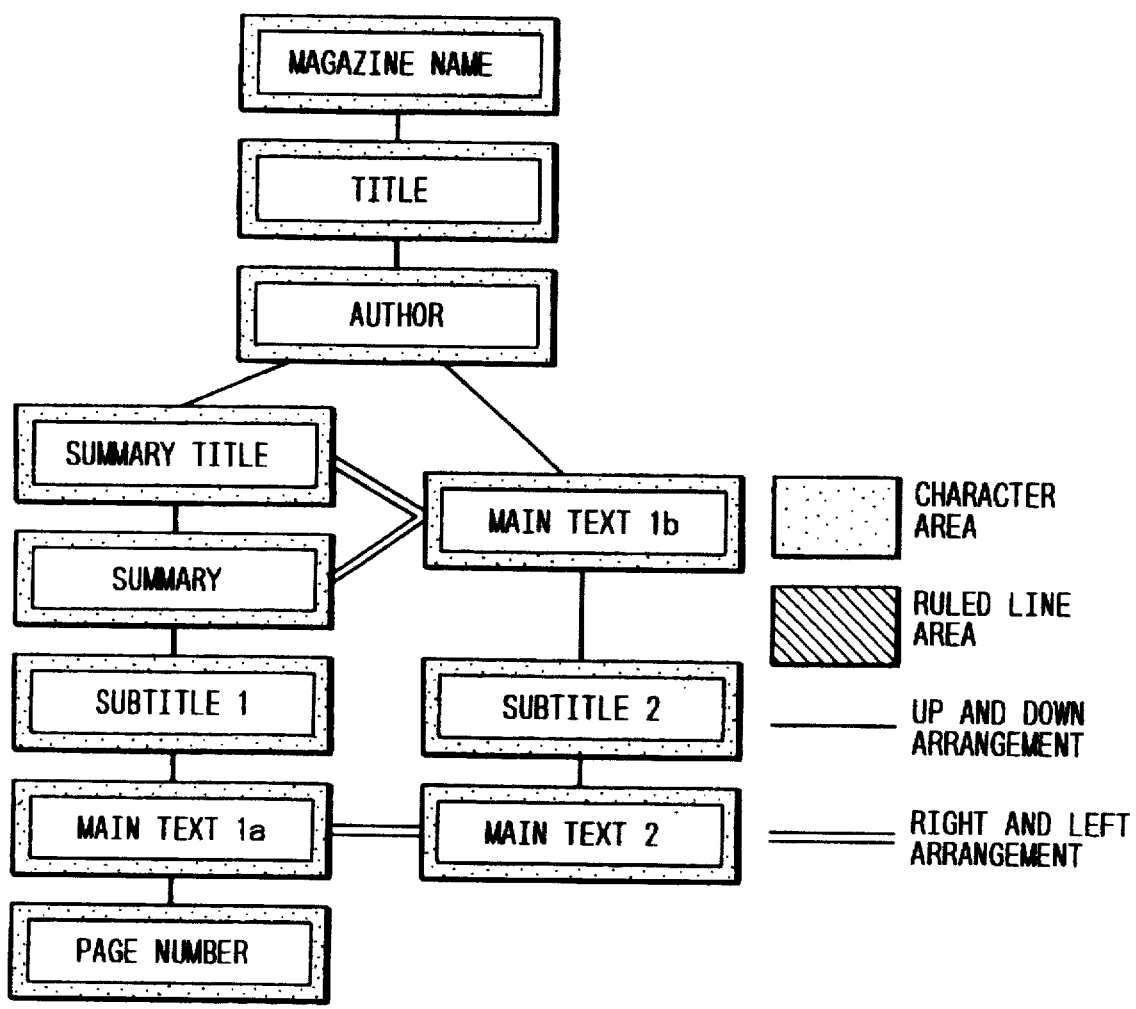
FIG. 26c is a diagram showing another example of the structure model in the form of a graph structure.

The LI (logic identifier) applying module 13 executes a matching process of the received layout structure with the stored structure model. The LI applying module 13 assigns the names (as identifiers), such as "Title", "Author", "Subtitle", "Main body", which have the logic meanings of the highest level element in the layout structure, to the elements in the received layout structure. In most documents used in specific fields, the document design is relatively fixed. For example, "Title" and "Author" are laid out the former above the latter. The structure model is based on this document nature. The structure model may be considered as a sort of template in the design of a document to be processed. A plural number of the structure models as templates are stored in a ROM. The structure models of the three types of documents shown in FIG. 24 are expressed by graph structures as shown in FIGS. 26a to 26c. As shown, the graph structure contains nodes having logic names corresponding to the types of elements (character blocks, character lines, ruled lines, and the like), and links representative of relative positions of those elements. The matching process in this module is to determine whether or not the received layout structure matches with one stored structure model. The module reads out the structure models one by one, and compares with the layout structure till the matching process succeeds. If the matching process fails, the panel display presents a message to the effect that it is impossible to carry out the process. No further processing operation is continued. If the matching process succeeds, the correspondence of the elements in the layout structure and the nodes in the structure model can be known. On the basis of the known correspondence, the logic names defined for the nodes in the structure model are respectively assigned to the elements in the layout structure, which have undergone the matching process. The data of the type in which the logic names are thus assigned to the elements in the layout structure is called a logic structure.

The DI (design instruction) input module 14 detects the depression of the buttons of "+1", "Thesis style", and "A4 vertical" and has already transferred the signals from these buttons to the DP (design parameter) determining module 15.

The DP determining module 15 properly selects the design tables from among those design parameter tables 151 (which were classified and stored into the ROM) by the signals representative of the design instructions, which were selected by the user, and reads design parameters from the selected design parameter tables. The read out design parameters are transferred to the output image generator module 16. Those design parameters to be transferred to the output image generator module 16 include print faces and design parameter tables. The print face designates a regional area in the entire page within which document elements are to be located. It is used for determining a regional area within which characters are allowed to be located, which is not definitely indicated by the design parameter. The design parameter table is defined every logic name by the area reference position, maximum width, character size, character attribution, and the number of columns, as shown in the table of FIG. 27. The reference position is expressed by the sides of the reference element in the x- and y-directions and the quantities of offset from the reference sides. The unit of the reference position is mm. The reference element is expressed by the absolute position of "Page" or a relative position of it to another element. The element reference position means a vertex position of the rectangle of the element, which is to be coincident with the position calculated using the offsets in the x- and y-directions.

The output image generator module 16 receives the layout structure and the design parameters, and progressively converts the partial images of the input document image in accordance with the design parameters, thereby to form an output image. The instant embodiment includes two output image memories, one for the black image and the other for the +1 color image since the output image has two colors. The flowchart describing the process carried out by the output image generator module 16 is as shown in FIG. 13, as in the first embodiment. Firstly, the area division results having the logic names are read out in the order of the elements in the design parameter table. In the design parameter table, the first element is "Magazine name". Accordingly, the element having the name of is read out of the logic structure. The area image generation process is called up using three parameters of the layout structure element corresponding to the "Magazine name", the design parameter of the "Magazine name" in the design parameter table, and the partial image corresponding to the element in the input image. As the result of carrying out the process, the output image of the "Magazine name" is gained which is specified by the design parameter. The thus obtained image is located at the position on the output image specified by the design parameter (the TOP-RIGHT, or the right upper position of the rectangle is set at the position distanced from—20 mm from the right end of the page and 10 mm from the top of the page). The element having the color instruction of "1" is located in the +1 color image memory, and the element having the color instruction of "0" is located in the black image memory. Finally, the name of "Magazine name" and the position/size of the rectangle laid out are stored in a paired fashion. Here, the operation of carrying out the process for the "Magazine name" ends. Similar processing operations are carried out for the "Page number" as the next element in the table. In this way, the processes for laying out all of the elements in the table are carried out, and the processing operation ends.

For the "Magazine name", the element reference position is designated by the absolute position of the "Page". For the "Author", it is designated by a relative position. Therefore, to determine the reference position of the "Author", the position of the rectangle already laid out is required. It is for this reason that the position of the rectangle is stored when the element layout is completed.

As for the area image generation process called up every element in the design parameter table, the process is changed depending on the type of the area, character or ruled line. When the type of the area is the ruled line, an image of a simple rectilinear line is generated and repeated to form a ruled line. Thus, the input image is not used. When it is the character, the area image generation process is called up.

The character image generation process further calls up other processes of a character-confining, an area enlargement/reduction, and a character attribution. This process will be described using the "Main body 1" area as an example. The character-confining process, as referred to in the first embodiment, rearranges the partial images picked up every character so that the images are confined within a specific width.

To carry out the area enlargement/reduction process after the character-confining process is carried out, a rate of enlargement of the image must be calculated. The enlargement rate is a ratio of the character size in the input document to the character size specified by the design parameter. An average value of the height values of characters in the "Main body 1" area shows that the character size in the input document is 12 point. The character size specified by the design parameter table is 10 point. Hence, the enlargement (reduction) rate is 5/6. The character-confining width is calculated by dividing the maximum width of the design parameter by the enlargement rate. In this instance of the embodiment, the layout width is 160 mm and the two columns are designated. The column-to-column margin of 10 mm is subtracted from the layout width. The result the subtraction is divided by the number of columns, and the result of the division is divided by the enlargement rate. The resultant value is 90 mm. This value is the character-confining width. The character-confining process rearranges the characters in this area so as to confine them within this character-confining width.

Then, the area enlargement/reduction process is called up. In this process, the character-confined image is reduced so that the layout width thereof falls within 75 mm, according to the enlargement rate. Finally, the character attribution process is called up. This is realized by the image process, which is executed according to the designated character attributions in the design parameters. For the "Main body 1", "Normal" is designated. Accordingly, no processing is carried out. For the "Subtitle", for example, the "bold" is designated. This can be realized in a manner that the whole image is shifted several dots and the results are logically summed. In addition to the "bold", "Italics", "Inversion", the combination of them, or addition of the "Frame" can be realized by a simple image process.

Figure 28:
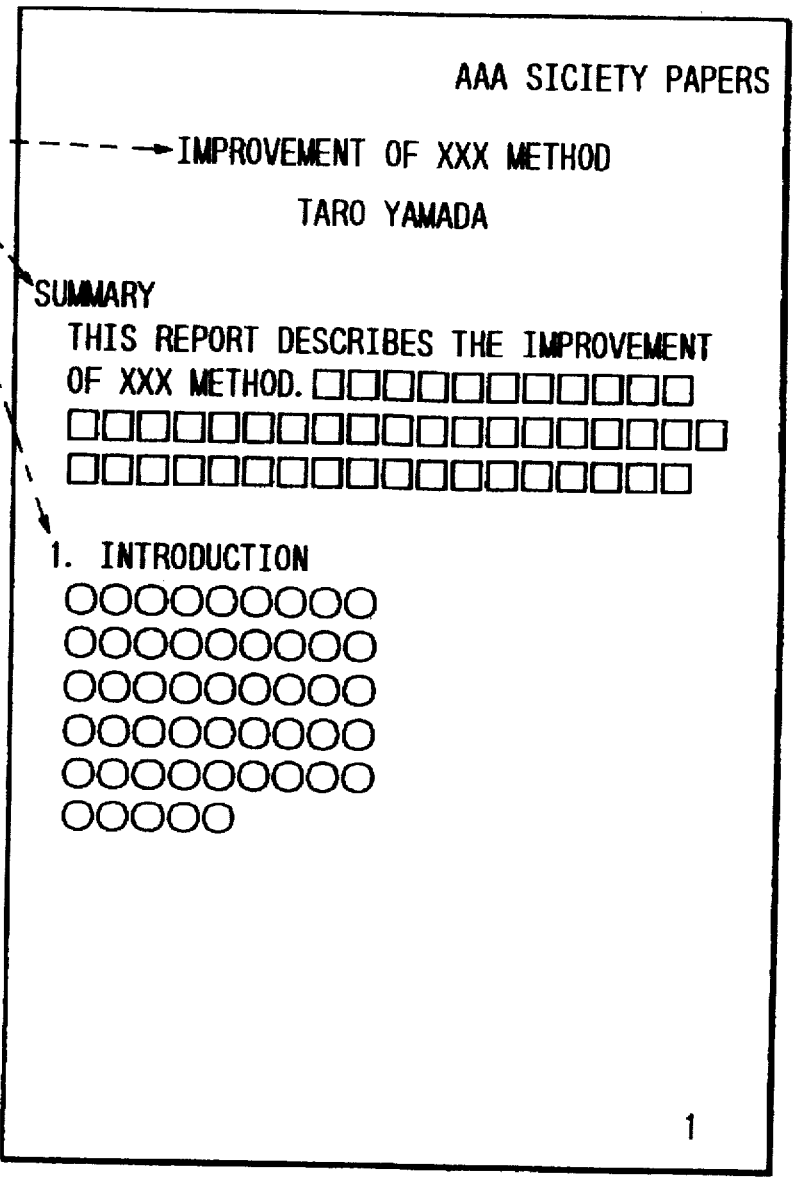
FIG. 28 is a diagram showing an example of the electronic image when the image generation process is not yet completed in the output image generator module.

The "Main body 1" obtained by the character image generation process is laid out so that its TOP-LEFT is positioned at a point 2 mm below the "Subtitle 1" and 20 mm distanced from the left side of the page. When the logic elements from "Magazine name" to "Main body 1" have been laid out, the electronic image stored in the output image memory is as shown in FIG. 28.

After the "Subtitle 2" is laid out as in the previous manner, the image generation process for the "Main body 2" is carried out. In this instance of the embodiment, the "Main body 2" cannot be laid out in one column. Accordingly, it is laid out in two columns. The process to handle the "Main body 2" will be described. A position having the limit of the lower side of the print face designated by the layout parameter is previously calculated. The character-confining process is carried out using the calculated position. The character-confining process is continued till the character lines are laid out up to such an extent as not to exceed the scope of the print face. Then, the enlargement/reduction process and the character attribution process are called up. The converted image is laid out at the specified location in the output image memory. The "Main body 2", as specified by the design parameter is laid out at the location 2 mm under the "Subtitle 2" and 20 mm from the left side of the page. At this time, a flag "not yet completed" is set so as to prohibit control from going to the image generation process for the next element. In this state, the remaining characters are poured into the image area of the same width. The image thus obtained is returned after having undergone the enlargement/reduction process and the character attribution process. To lay out this, the location specified by the design parameter cannot be used, since it is a relative position. The layout position is determined using the following conditions:

1) The x-coordinate is set to a position as the sum of the distance of the right side of the "Main body 2" already laid out and 10 mm of the column-to-column margin.

2) The successive elements having the same number of columns and the same maximum widths in the parameter table are sequentially searched to find the first element of those elements. The y-coordinate is set to the position of the upper side of the rectangle in which the first element is laid out.

The condition 2) above means that the elements laid out in the same conditions are deemed to be the first element of those elements set in the same column. In this instance, the "Subtitle 1" is the first element of those elements to be laid out under the conditions that the number of columns is 2 and the maximum width is 160 mm. The layout position is set on the y-coordinate as the upper side of the rectangle of the "Subtitle 1", and the remaining part of the "Main body 2" is laid out.

Two types of output images formed by carrying out the processes as described above are illustrated in FIG. 29. The title, and the subtitles 1 and 2 are located in the +1 color image. The black image and the +1 color image are read out line by line, and printed out in the related colors on a normal paper by the laser printing technique. The resultant output image is as shown in FIG. 30a. The document of FIG. 24b is also processed in a similar manner, and is output in the form as shown in FIG. 30b. As seen from these figures, the ruled-line attribution applied as the logic identifier of the input document does not appear on the images. The ruled line is valid for identifying the type of document. When output, only the ruled lines common to a plural number of documents are specified by the design parameter.

Let us consider a case where a plural number of elements, not one element, which correspond to one logic parameter being specified by the design parameter, exist. In this instance, a document shown in FIG. 24c is used for the input document. A structure model that matches this document is as shown in FIG. 26c. Also in this instance, the area of the "Main body 1" consists of two logic identifiers, "Main body 1a" and "Main body 1b". The process for this follows. The output image generation process is a process for converting the logic identifiers specified by the design parameter tables into partial images in the logic structure. When the logic structure of the input document does not contain the element matching with any of the logic identifiers in the design parameter table, the following process is carried out. Of the logic identifiers in the table for the elements in the logic structure of the input document, those identifiers attached with a character series are read out. In this instance, for the "Main body 1", the "Main body 1a" and "Main body 1b" are read out. When a plural number of elements are read out, the logic identifiers are sorted and ordered. Accordingly, the character following the "Main body 1" is not limited to alphabetical letter, such as "a", and "b", but any character may be used if it is able to indicate the order distinctly. Afterward, the layout structure is converted in the determined order so that it can be handled as one character block.

Figure 30C:
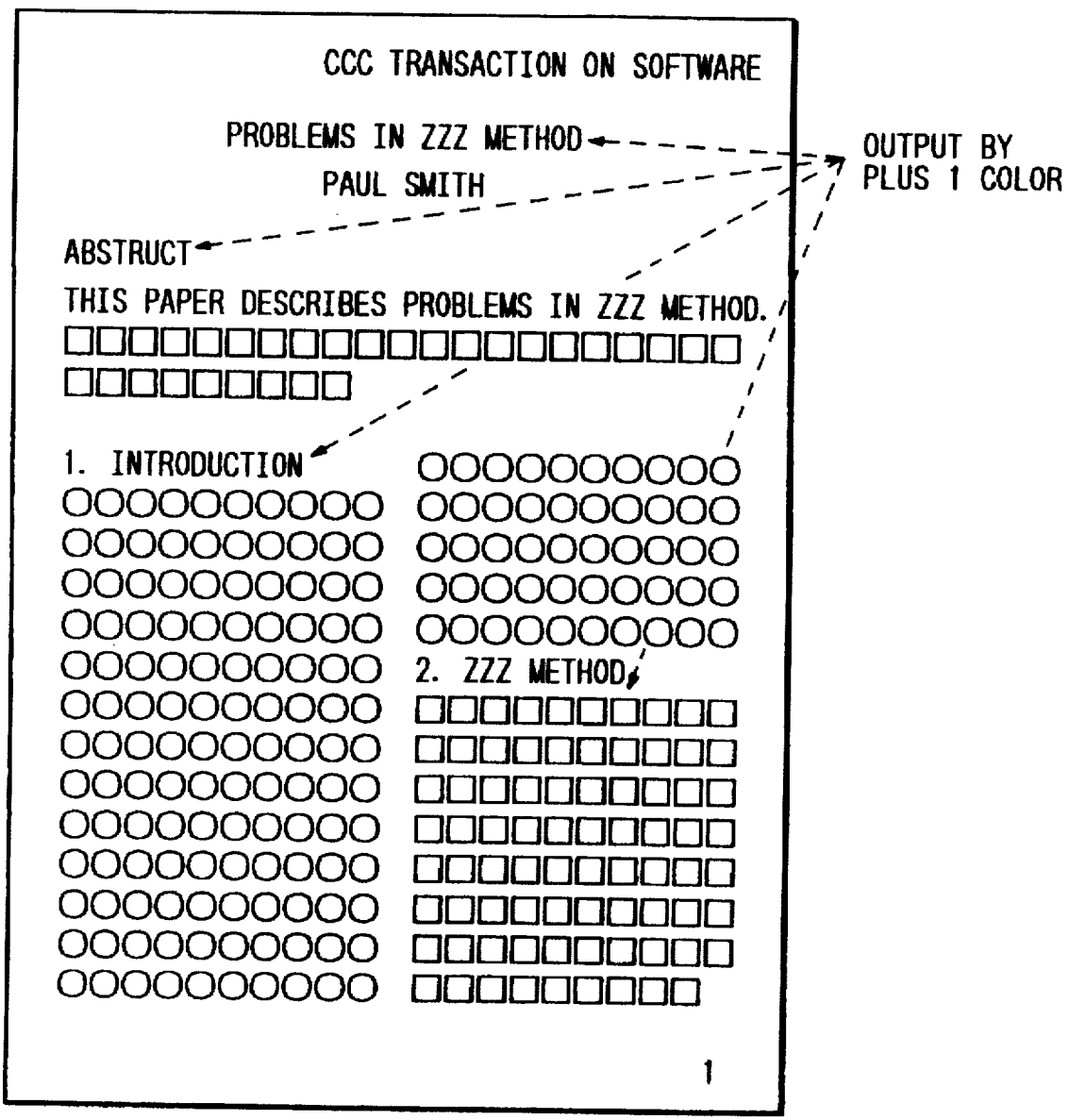
FIG. 30c is a diagram showing yet another example of the document output in the print-out module.

Merely making common the nodes of the character blocks, which correspond to the root of a tree structure, suffices for the conversion. The thus formed document is shown in FIG. 30c. In this instance, the "Main body 1", which is handled as one character block, is laid out in two columns again. In this way, the elements, which is handled as a plural number of blocks in the document, can be handled like one element.

Figure 32:
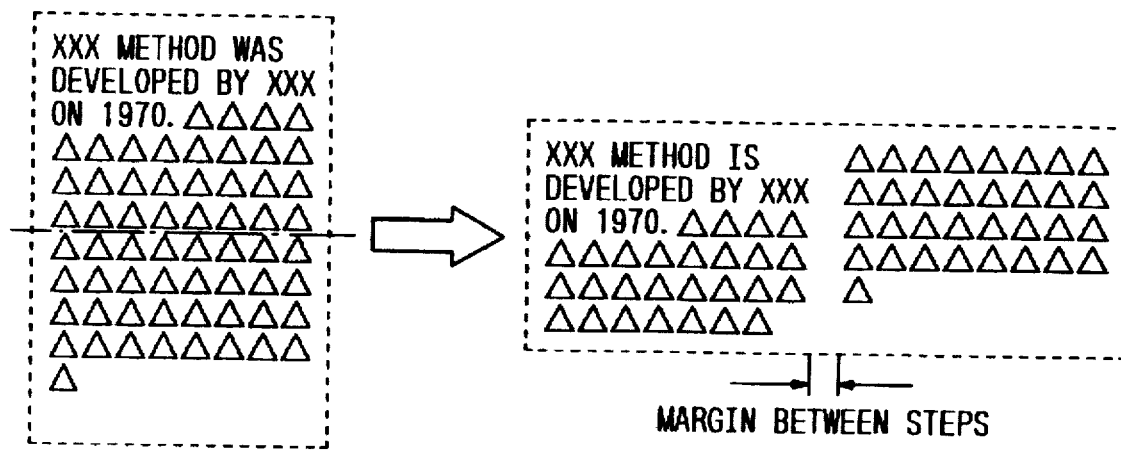
FIG. 32 is a diagram showing a column conversion when the "Balance" is designated.
Figure 33:
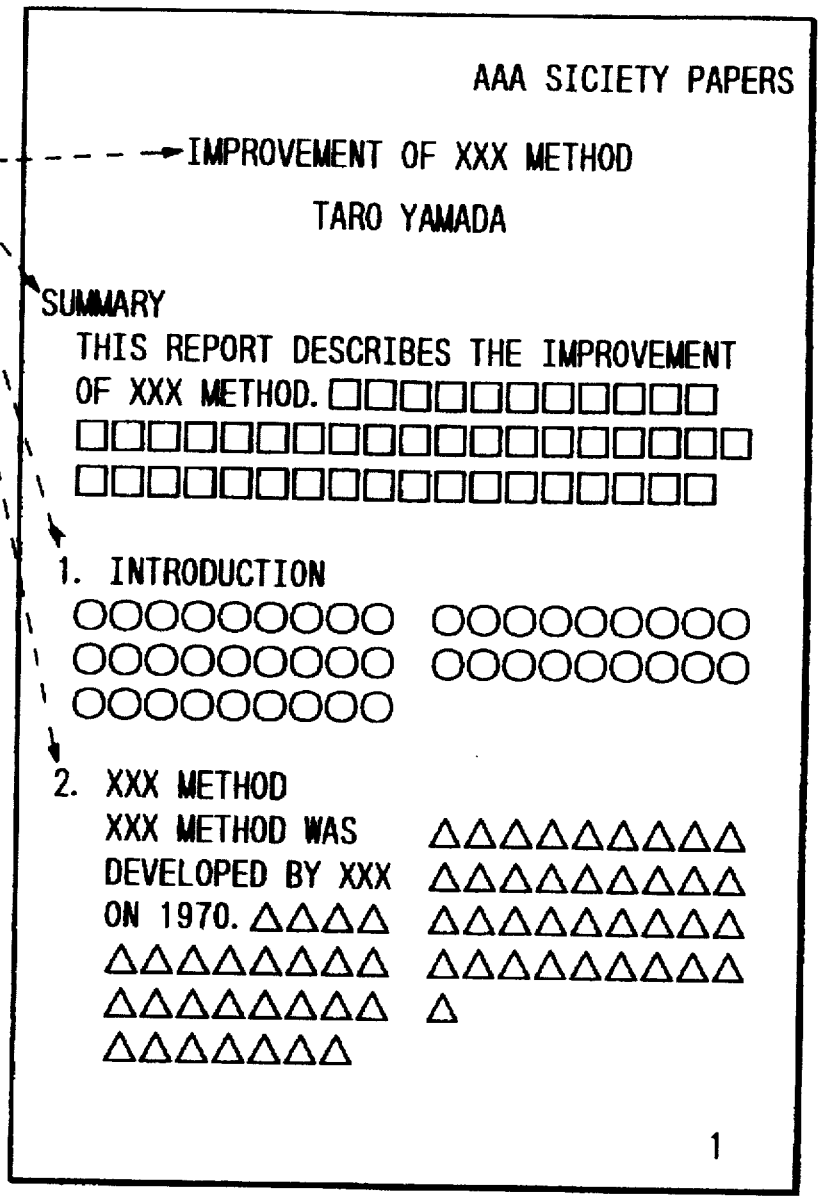
FIG. 33 is a diagram showing another example 2 of the document that is output in the print-out module.

The process for a case where "Balance" is designated for the column. The "Balance" functions to uniformly lay out the lines for the columns. This corresponds to the "Descriptive style" in the image finish. The layout parameters as shown in FIG. 31 are used. As seen from the parameter table, the subtitles are laid out in one column, and the main bodies are laid out in two columns and in a balanced state. Multiplication of the column width by the number of columns provides the maximum number of lines. After this is calculated, the column width is calculated as in the previous case. The character image is poured into the area of that width. At this time, the rectangles of the individual lines are stored while at the same time are counted. The character pouring operation is continued till the character image reaches the maximum number of lines. The number of lines of the poured character image is divided by the number of columns, thereby to obtain the number of lines that can be laid out within the columns. The formed partial images are cut out of the stored rectangles of the lines, and are successively arranged side by side in a state that the adjacent partial images horizontally arranged are spaced from each other by the column-to-column margin, and the upper sides of them are on the same level with each other. This process, when it is applied to the "Main body 2" of the input document of FIG. 24a, is as illustrated in FIG. 32. When the number of lines is divided by the number of columns and the remainder is produced, adjustment is made so that the number of lines in the left column is larger than that in the right column. In a case where 13 lines are poured into two columns, the first to eighth lines are placed in the left column, and the remaining lines are placed in the right column. The converted image thus formed is stored in the designated location in the output image memory. The image laid out according to the layout parameters shown in FIG. 31 is illustrated in FIG. 33.

Figure 35A:
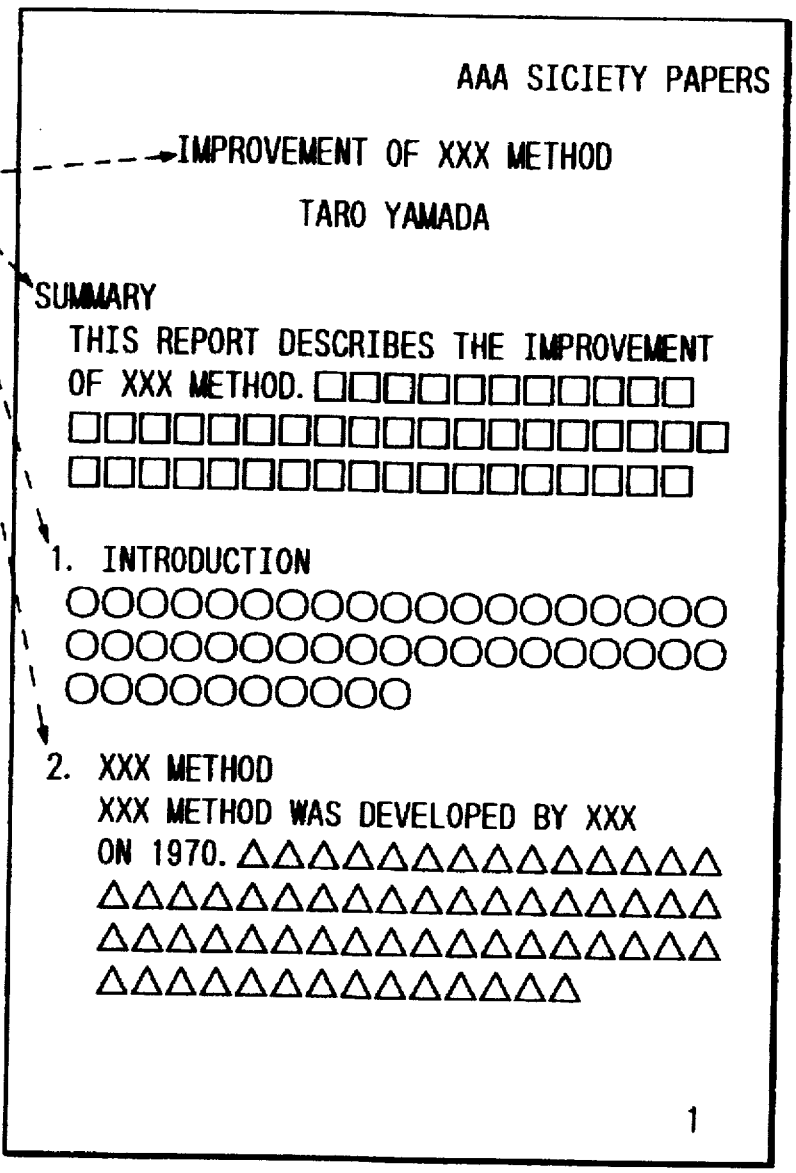
FIG. 35a is a diagram showing an example of the document that is output in the print-out module.
Figure 35B:
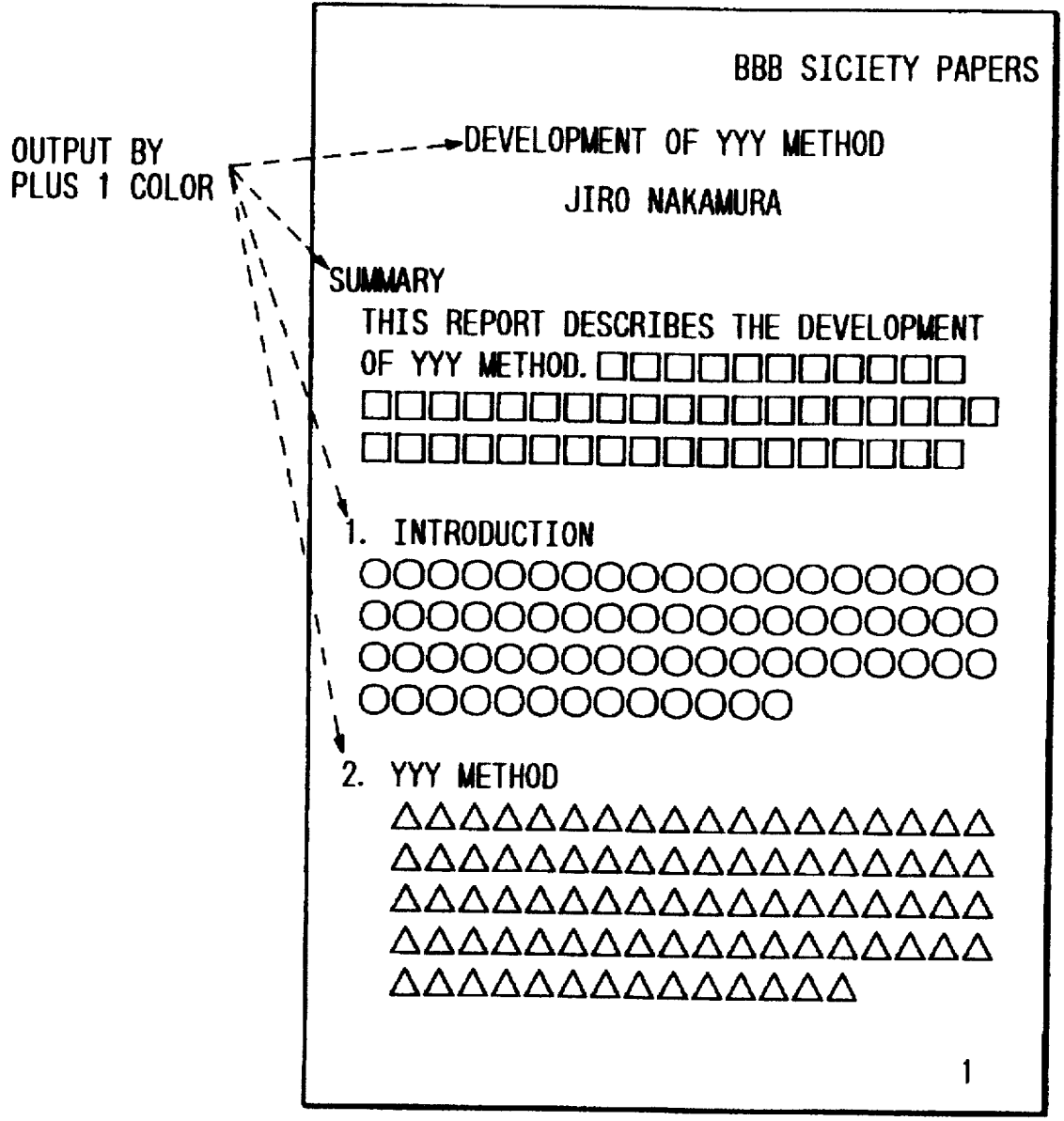
FIG. 35b is a diagram showing another example of the document output in the print-out module.
Figure 35C:
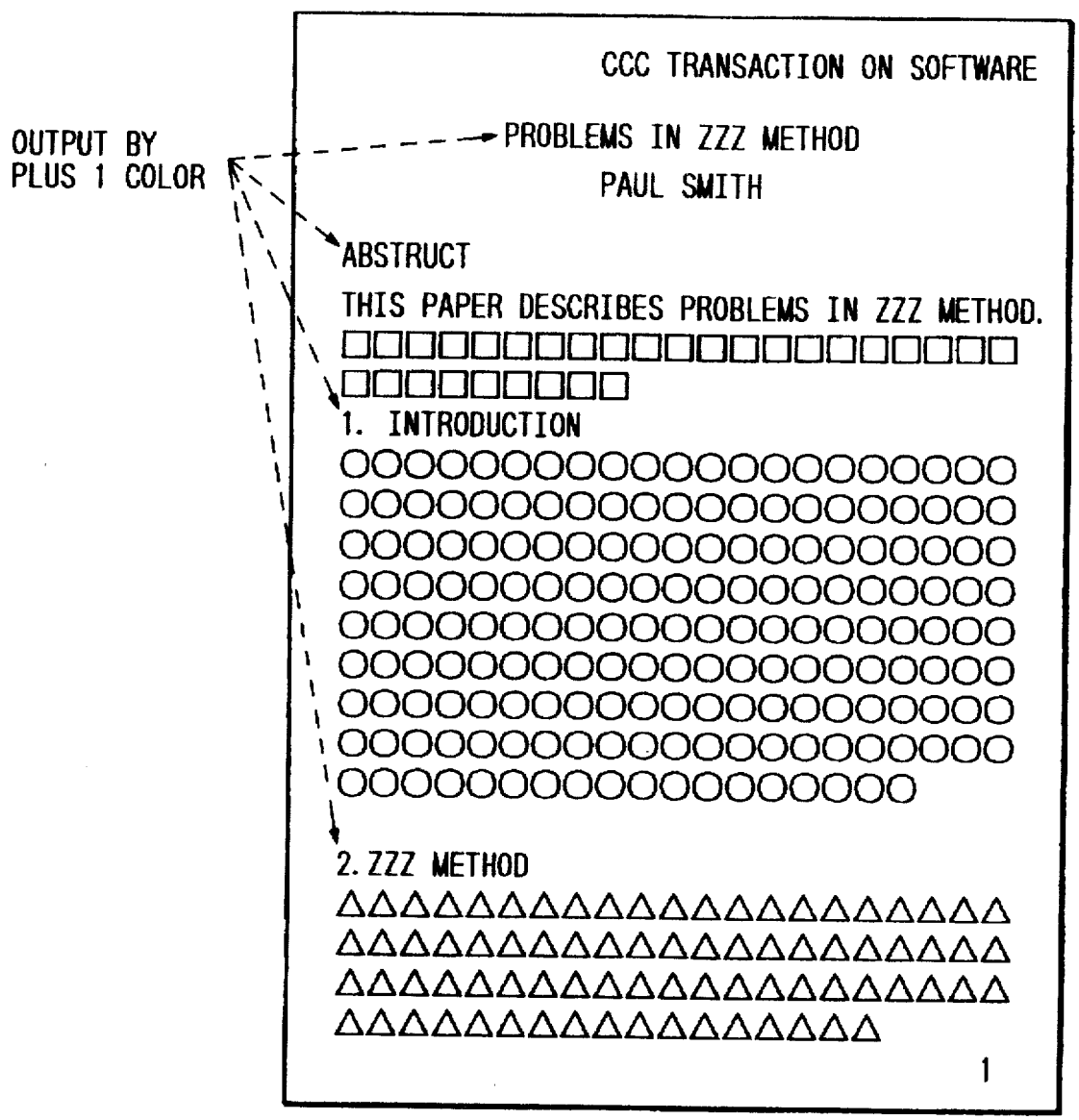
FIG. 35c is a diagram showing yet another example of the document output in the print-out module.

While the layout conversion of the image from one column to two columns has been described, it is evident that the layout conversion from two columns into one column can be carried out in a similar way. This corresponds to the case where the "Orthodox" is designated. In this case, a layout parameter table shown in FIG. 34 is used. The document elements are laid out insensible of the form, viz., in the called wait-and-see form. The documents of FIGS. 24a to 24c, when design change processed, become those shown in FIGS. 35a to 35c.

The document processor of the fourth embodiment thus far described can easily produce column-designated documents having a common design from the documents of different designs hand written on papers, by simple instructions given by the user.

(Fifth embodiment)

The document processor according to the fifth embodiment of the present invention is arranged such that when a location to which a graphic element in a document image is to be moved is designated, the remaining document elements are automatically relocated in the document image. Accordingly, the document processor enables the user to change a document design by a simple operation.

Figure 36:
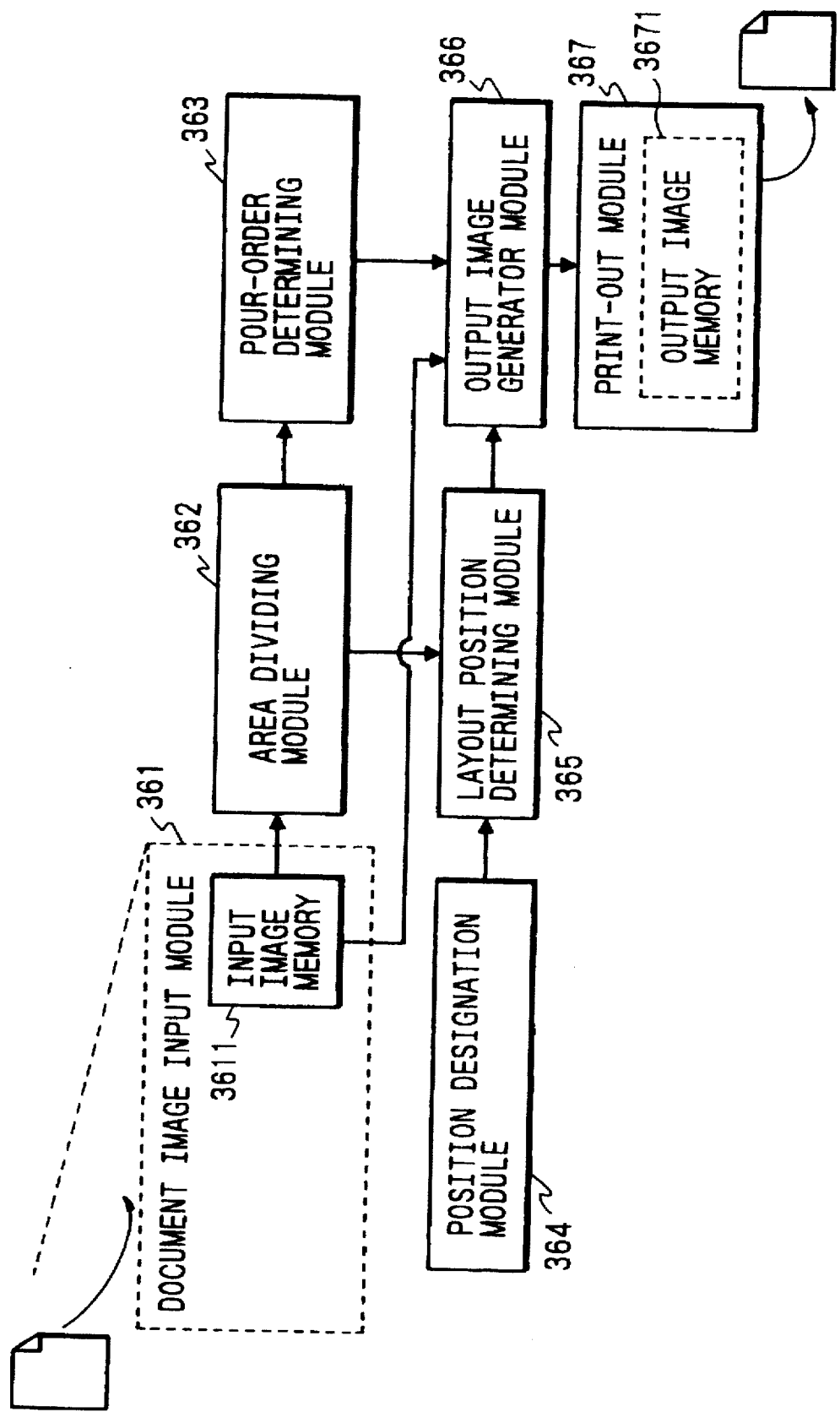
FIG. 36 is a block diagram showing an arrangement of a document processor according to a fifth embodiment of the present invention.

The document processor, as shown in FIG. 36, is comprised of an document image input module 361, an area dividing module 362, a pour-order determining module 363, a position designation module 364, a layout position determining module 365, a output image generator module 366, and a print-out module 367.

The document image input module 361 is used for inputting a document original in the form of a digital image to the document processor, and stores the digital image data in an input image memory 3611. The area dividing module 362 divides a cluster of pixels in the document image, which are stored in the input image memory 3611, into area blocks having meanings as document elements. The pour-order determining module 363 determines the order of arraying sentences in the areas in the document image that are determined to be character elements by the area dividing module 362. The position designation module 364 is used for designating positions of the graphic elements in the document image. The layout position determining module 365 determines the positions of the graphic elements to locate the elements at the positions (designated by the position designation module 364) in the document image. The output image generator module 366 picks up partial images from the document image stored in the input image memory 3611, and processes those partial images in accordance with the sentence order, which was determined by the pour-order determining module 363, and the data of the element positions in the document image, which were determined by the layout position determining module 365, thereby to generate an output image. The print-out module 367 is a visualizing module for visualizing the document image generated by the output image generator module 366 on a visualizing media.

The document image input module 361, the area dividing module 362, and the print-out module 367 have the same functions as those in the first embodiment.

Figure 37:
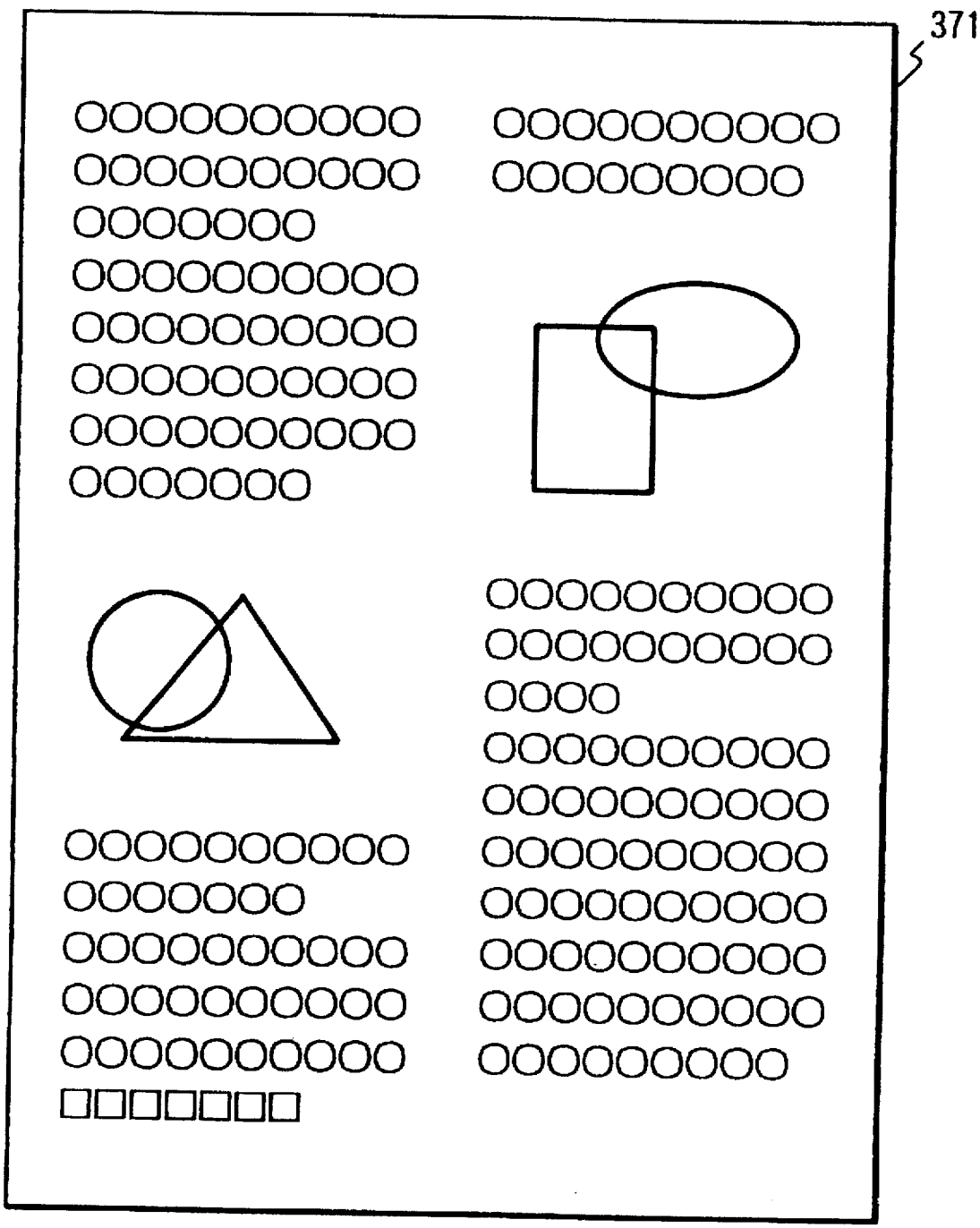
FIG. 37 is a diagram showing an example of an input document.
Figure 38:
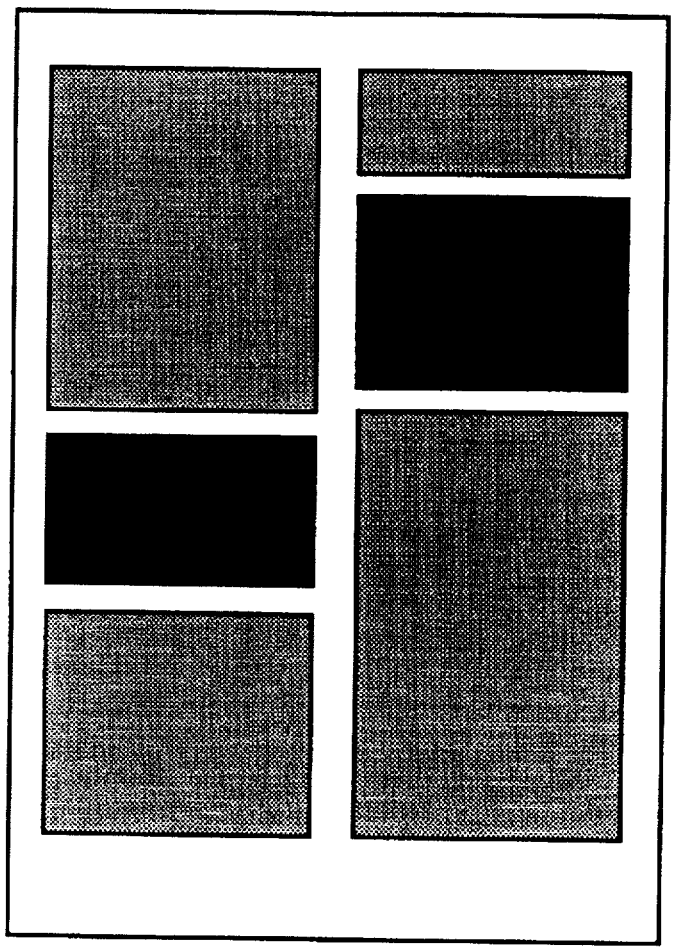
FIG. 38 is a diagram showing the results of the area division process carried out by an area dividing module in the document processor of FIG. 36.

A document to be used in the description of the fifth embodiment contains character elements and graphic elements in the form of two columns. FIG. 37 is a diagram showing an example of the document or input document. FIG. 38 is a diagram showing the results of the area division process carried out by an area dividing module 362 in the document processor.

Figure 39:
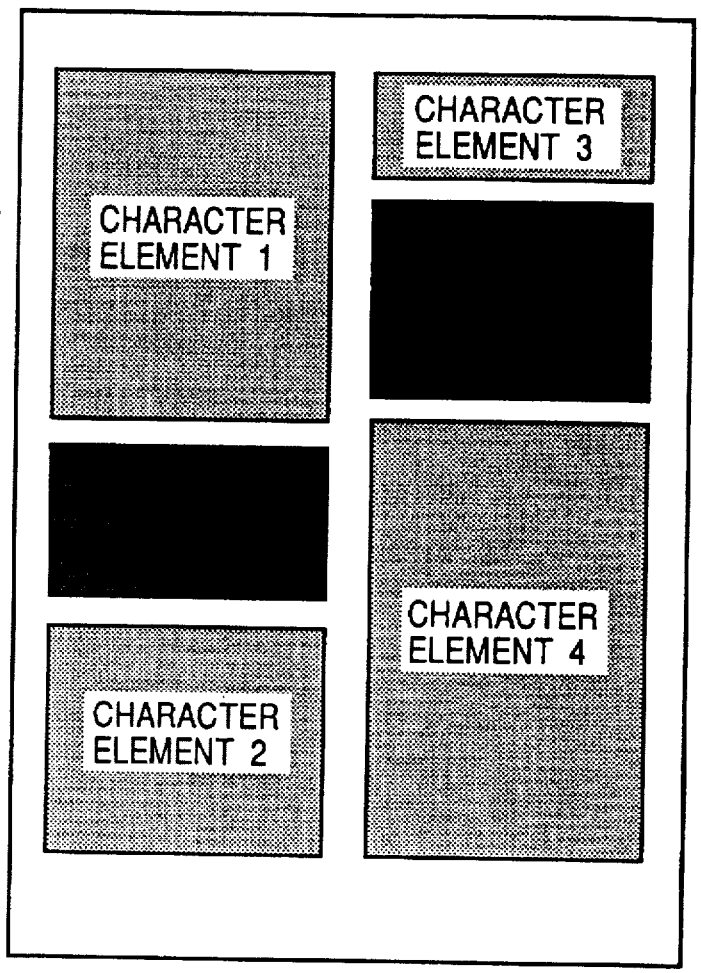
FIG. 39 is a diagram showing the results of the process carried out by a character pour-order determining module, the process being applied to the character elements shown in FIG. 38.

The pour-order determining module 363 assigns numbers to character elements according to the document writing rules, on the basis of the document layout produced by the area dividing module 362. Examples of the rules are: In writing a document of the two-column form, the left column should be first written. In case where a plural number of character elements are contained in one column, the character elements should be written in a descending order of positional levels. The pour-order determining module 363 determines the order of writing sentences according to such rules by comparing the coordinates of the areas of character elements. The results of the process are shown in FIG. 39.

Figure 41:
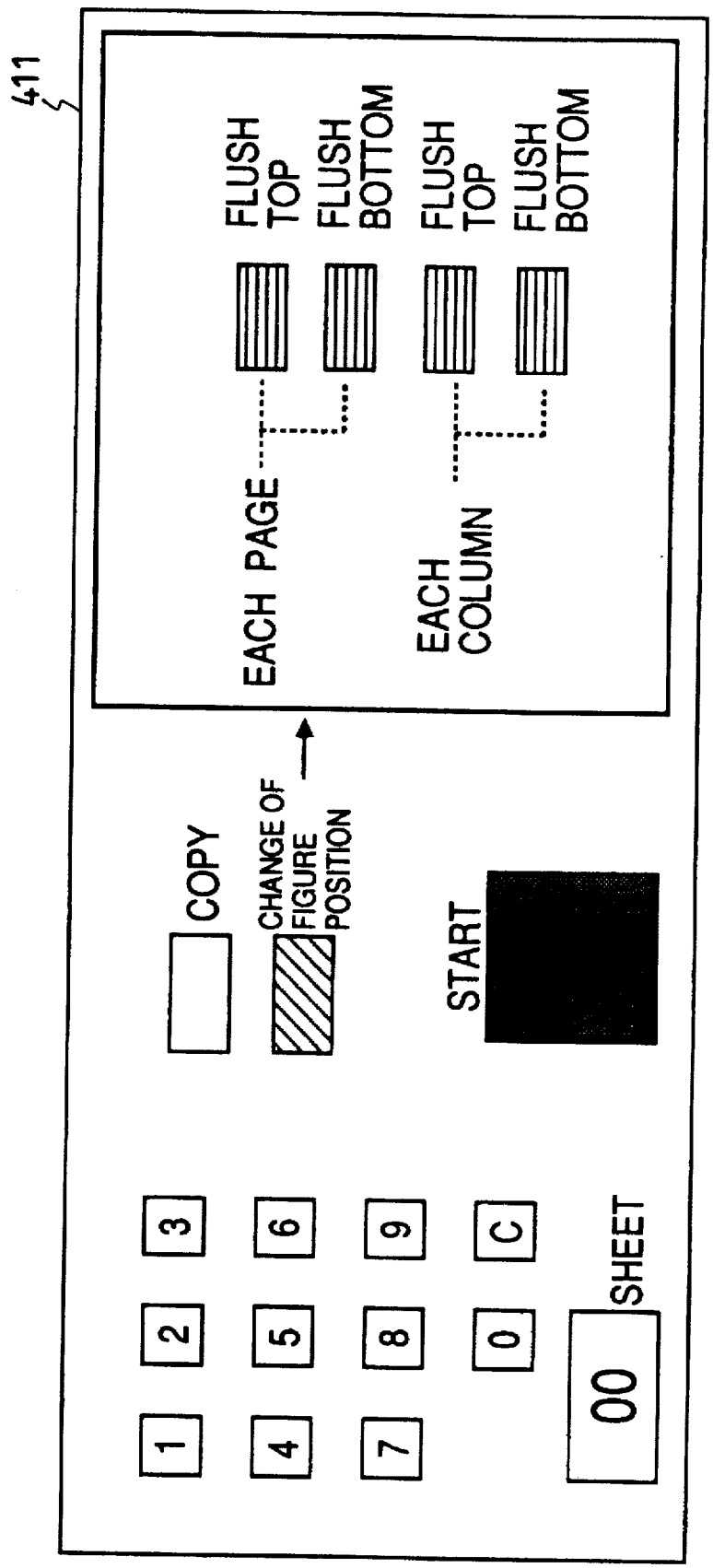
FIG. 41 is a diagram showing an example of a position designation input module of the document processor.

The user manually designates his desired position of the graphic element in the document image by using the position designation module 364. The position designation module 364 may be realized by groups of buttons on an operation panel 411 of the machine as shown in FIG. 41. When a button is pushed, the data associated with the pushed button is generated, and transferred to the layout position determining module 365. Upon receipt of the data, the layout position determining module 365 calculates the positions at which the respective elements are to be located if the graphic element is located at the designated position. The calculation is based on the positions and the sizes of the areas of the document elements received from the area dividing module 362. In this embodiment, four buttons are provided for the select buttons for designating positions of the graphic element. The four select buttons, as shown in FIG. 41, are two buttons, "Flush top" and "Flush bottom" for each page, and two buttons, "Flush top" and "Flush bottom" for each column. Here, in the "for each page", when the graphic element position is moved, it is allowed to be moved to another column. In the "For each column", it is prohibited from being moved to another column. When the "For each column" is designated, the graphic element located in the right column is not moved to the left column. When the "for each page" is designated, the graphic element located in the right column may be moved to the left column. When one of those selections is operated, the numeral (1, 2, 3, 4) is transferred in the form of electrical signal to the layout position determining module 365.

Figure 40:
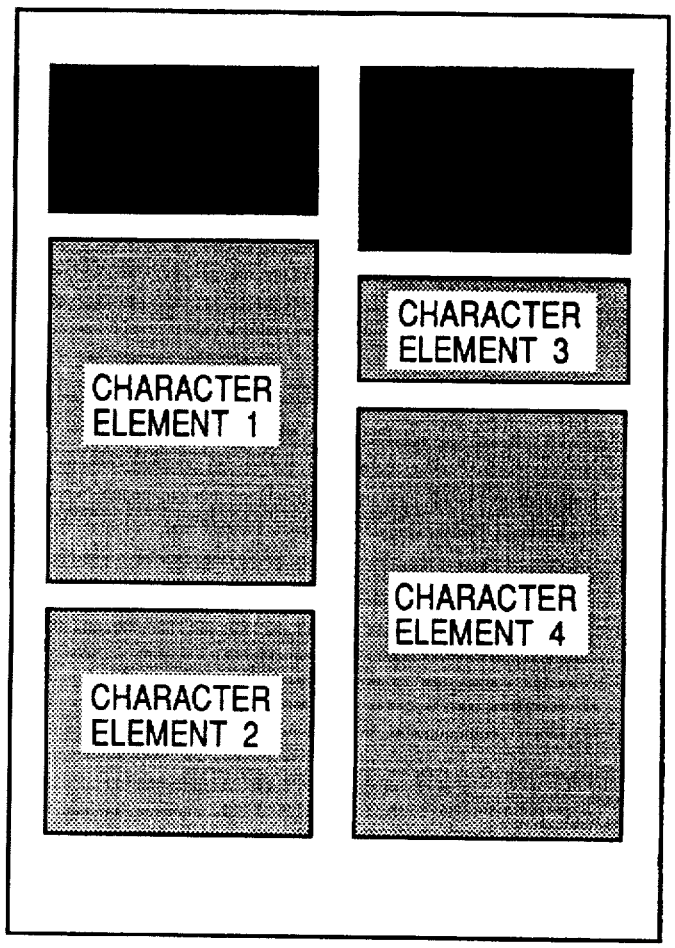
FIG. 40 is a diagram showing the layout of document elements after a layout position change process.
Figure 42:
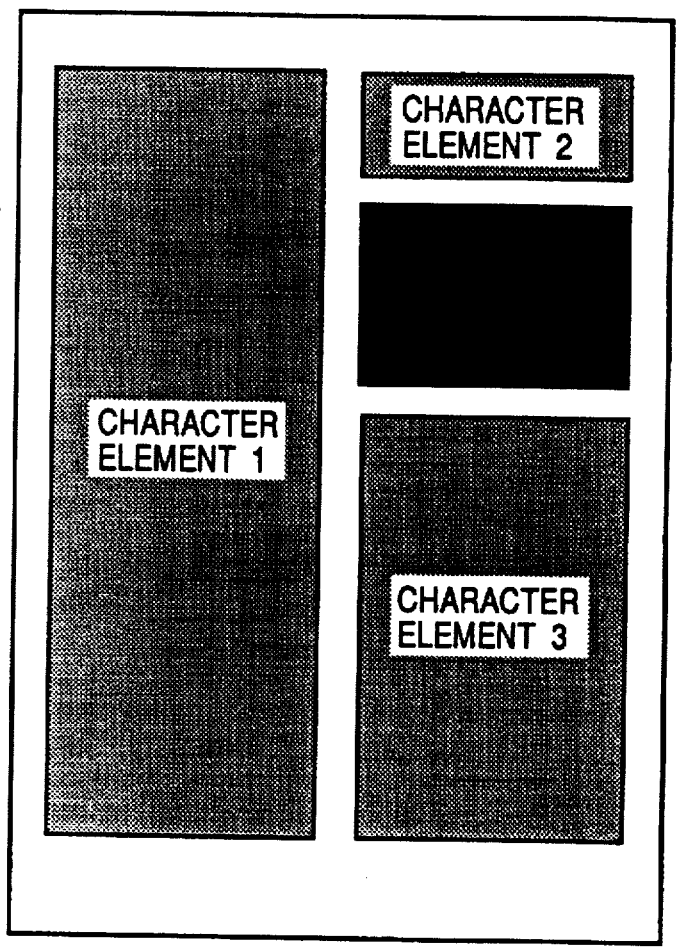
FIG. 42 is a diagram showing the results of the area division process carried out by the area dividing module.
Figure 43:
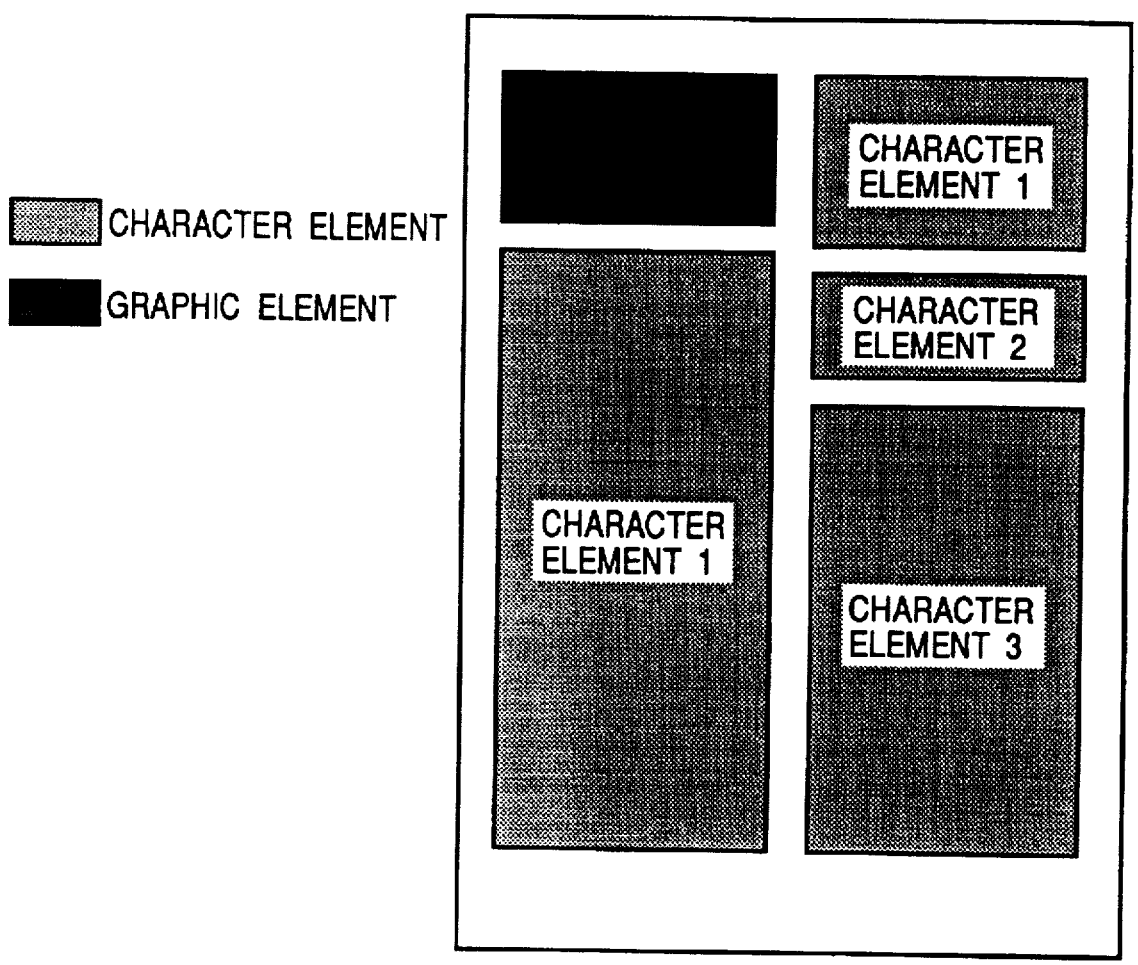
FIG. 43 is a diagram showing the result of the process when "Flush top" for each page is designated for the layout of document elements shown in FIG. 42.

The layout position determining module 365 determines the positions of the respective elements according to the position instruction entered from the operation panel 411. When the "Flush top" for each column is designated for the document image 371 (FIG. 37), the layout of the document elements in the document image is changed into that shown in FIG. 40. In this case, the document elements in each column are shifted vertically. When the "Flush top" for each page is designated for the document image as shown in FIG. 42, a part of the character element 1 must be shifted to the right column. In this case, the layout position determining module 365 cuts a part of the element area out of the element, and shifts it to another column, thereby obtaining the layout as shown in FIG. 43.

Figure 44:
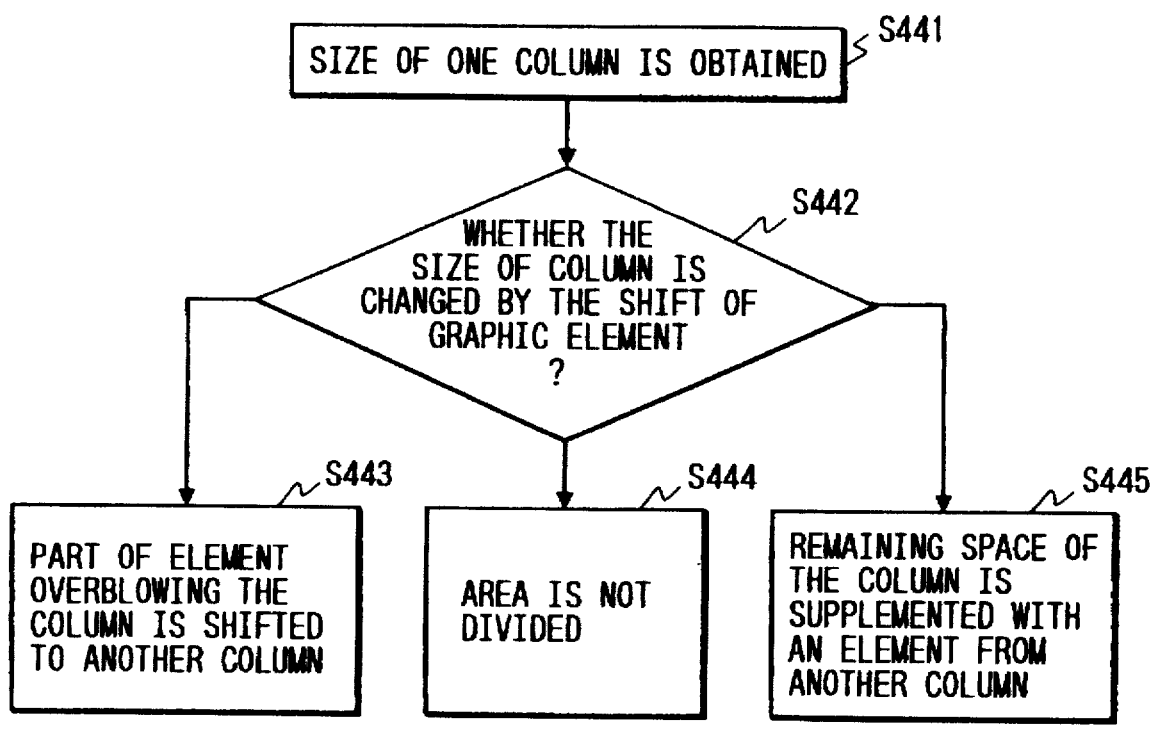
FIG. 44 is a flowchart showing the layout position determining process.

The procedure for this process will briefly be described with reference to FIG. 44.

The module obtains the size of one column in the document by calculating the height of each document element in one column (step S441). The module obtains the size of the column after the graphic element is moved, as in the manner of the step S441, and compares the column sizes before and after the shift of the graphic element (step S442). If both the column sizes are equal to each other, the module determines the positions of the document elements laid out (step S444). When the column size after the shift is larger than that before the shift, the module shifts a part of the element overflowing the column to another column, and determines the layout positions of the document elements (step S443). When the column size after the shift is smaller than that before the shift, the module fills the remaining space of the column with the element shifted from another column, and determines the layout positions of the document elements (step S445). The results of the process are transferred to the output image generator module 366, in the form of a table 451 describing the positions and the sizes of the respective elements as shown in FIG. 45.

The output image generator module 366 reproduces a document image according to the data contained in table 451 received from the layout position determining module 365. In the reproduction task, the module cuts the partial images, which corresponds to the graphic elements, out of the input image stored in the input image memory, and locates them at the positions specified by the table 451. As for the character elements, the module cuts partial images corresponding to the character elements out of the input image, and further divides them into partial images each representing a character. The module pours the partial image data into the areas at the positions specified by the table 451. The process to pour the partial image data may be realized by using the technique already described in connection with FIG. 14.

The image thus composed is visualized by the print-out module 367 and printed on normal papers. When the invention is applied to other machines than the copying machine, the output image is visualized by a laser beam printer or a display device.

As described above, in response to such a simple operation by the user as to designate a location to which a graphic element in a document image is to be moved, the document processor of the fifth embodiment automatically relocates the remaining document elements in the document image. Accordingly, the document processor enables the user to change a document design by a simple operation.

In the embodiment described above, for the layout change, only the graphic element is shifted by priority. In the document containing photographs, any other element than the character elements may be shifted by priority, for the layout change within the scope of the invention.

(Sixth embodiment)

Figure 46:
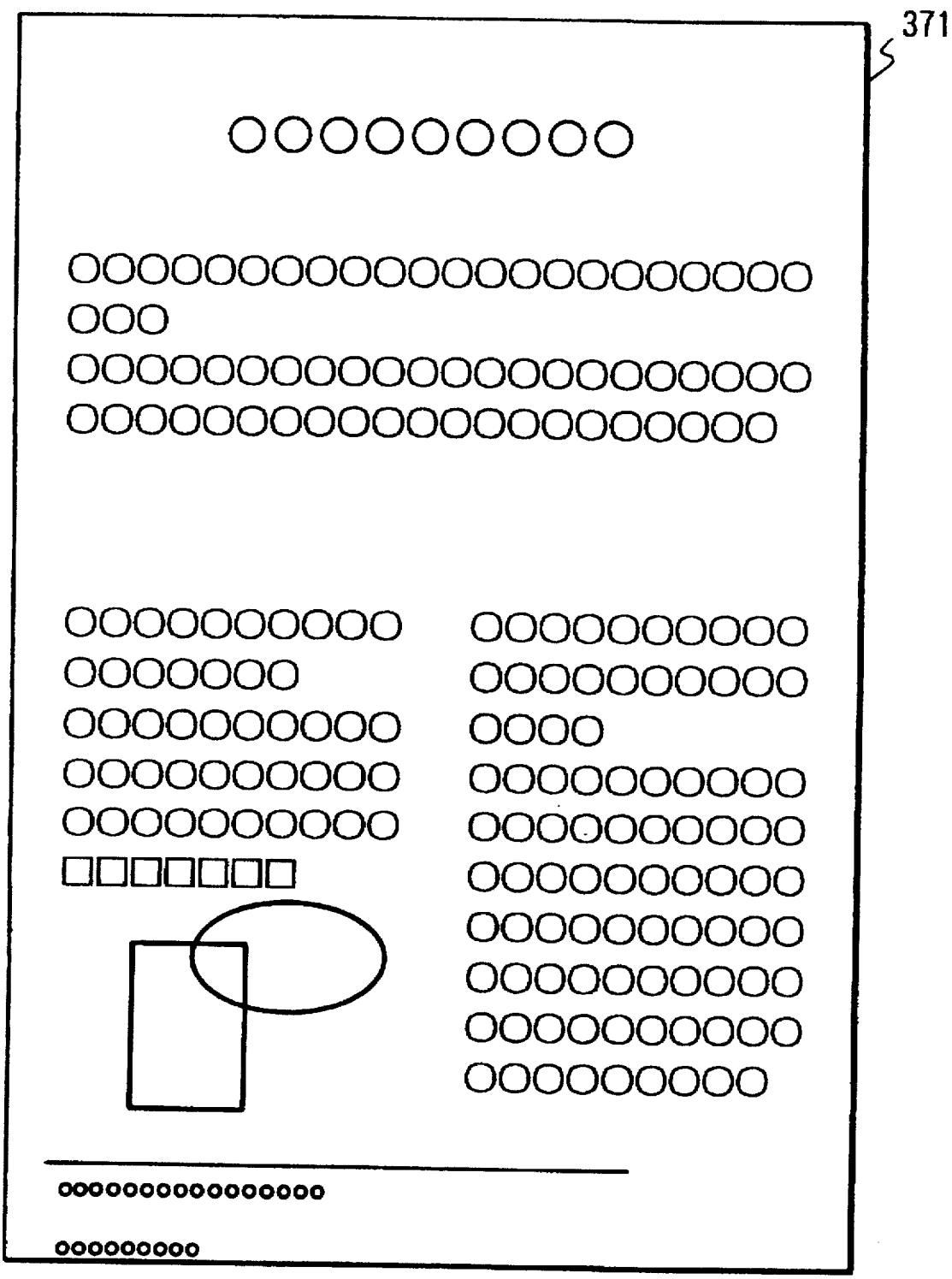
FIG. 46 is a diagram showing an example of an input document, which is for explaining a document processor according to the sixth embodiment of the invention.
Figure 47:
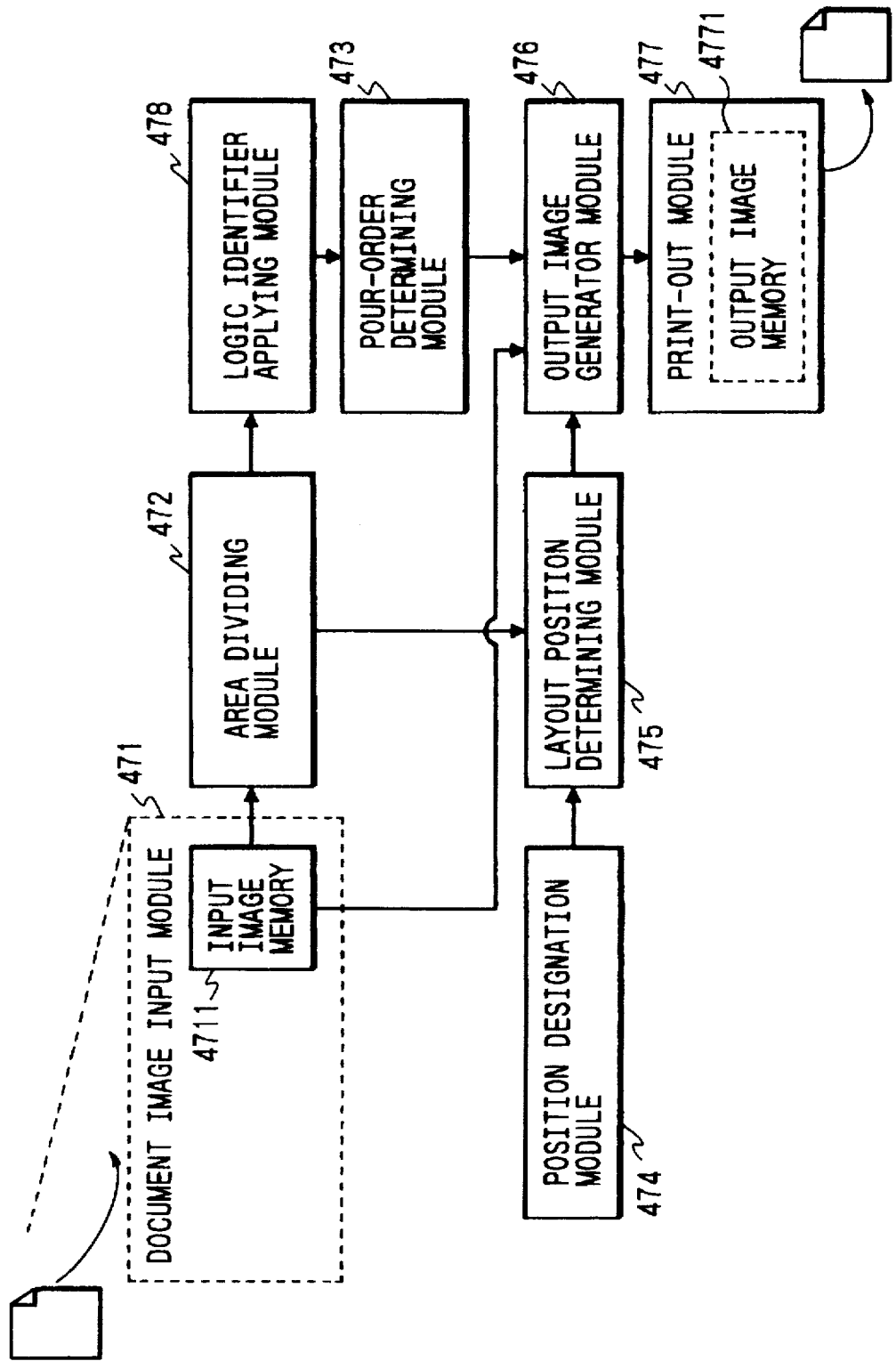
FIG. 47 is a block diagram showing an arrangement of a document processor according to a sixth embodiment of the present invention.

In FIG. 46, there is illustrated another document which contains document elements of "Title", "Abstract", "Footnote", and the like. When this document is processed by the document processor of the fifth embodiment, the graphic element is possibly moved to a position above the title or below the footnote. The resultant document does not, if so moved, look neat. To cope with this problem, the sixth embodiment is provided with a logic identifier applying module 478, as shown in FIG. 47. Using the logic identifier applying module 478, logic identifiers are applied to the document elements in the document image. Accordingly, the graphic element can be located under the abstract or above the footnote as by the designation in the fifth embodiment.

The sixth embodiment is equivalent to the fifth embodiment which additionally includes the logic identifier applying module 478. The logic identifier applying module 478 applies logic identifiers, such as "Title", "Abstract" and "Footnote", to the document elements produced by the area dividing module 472. The logic identifier applying module 478 operates as described in the first embodiment. The layout position determining module 475 prohibits the graphic element from being located above the character elements having logic identifiers, such as "Title" and "Abstract", and under the character element with the logic identifier, such as "Footnote". Accordingly, the resultant image looks neat.

(Seventh embodiment)

Figure 48:
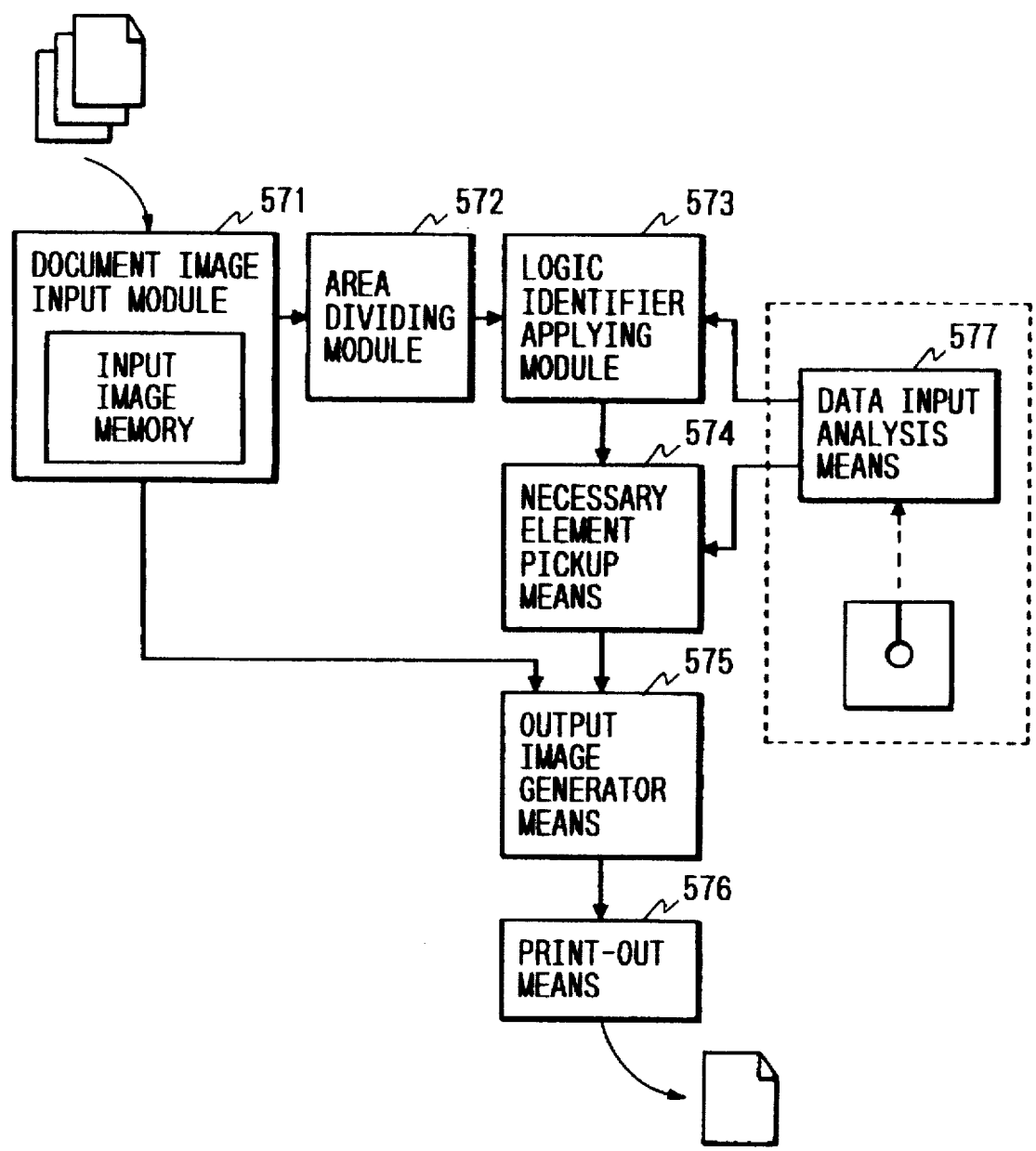
FIG. 48 is a block diagram showing a document processor according to the seventh embodiment of the invention.

A document processor according to the seventh embodiment of the present invention will be described with reference to FIG. 48. In this embodiment, the document processor operates as a summary forming device. The document processor of this embodiment is comprised of an document image input module 571, an area dividing module 572, a logic identifier (LI) applying module 573, a necessary-element pickup means 574, an output image generator means 575, and a print-out means 576. The document image input module 571 is used for inputting at least one document original in the form of digital images to the document processor. The area dividing module 572 divides a cluster of pixels in the document image into areal blocks having meanings as document elements. The LI applying module 573 applies identifiers each indicative of logic meaning respectively to the divided areas in the document image. The necessary-element pickup means 574 picks up the document elements with the identifiers necessary for summary preparation from the document areas having the identifiers, which were applied thereto by the logic identifier applying means. The output image generator means 575 generates an output image using the partial images corresponding to the document areas that were picked up by the necessary-element pickup means.

At least one document image, which was fetched by and stored in the document image input means, is divided into image areas or document elements having logical meanings by the area dividing means. The area-division results are output in the form of layout structure data containing area data, such as layout identifiers, types of the areas, area sizes, and area positions, and interarea data indicating the relationship among the areas. The logic identifier applying means applies identifiers respectively to those divided areas.

The logic identifier applying means stores at least one structure model describing the relative positions of document elements in a document to be processed. The logic identifier applying means progressively compares the structure models with the layout structure describing the area division results, which is output from the area dividing means. When a structure model coincident with the layout structure is found, the logic identifier applying means applies logic identifiers, which have logic meanings, such as title, author, and main body, to the areas, with high precision. The data input/analysis means 577 (FIG. 48) is preferably provided in order to alter the structure model registered in the logic identifier applying means and to register new structure models in the same.

The necessary-element pickup means picks up the document elements with the identifiers necessary for preparing the summary, such as title, author, and abstract. To be more specific, the necessary-element pickup means contains pickup instruction data as the defined logic identifiers for the necessary elements that are described in a simple language, and picks up the necessary document elements through the comparison process of them with the defined logic identifiers. Provision of the data input/analysis means 577 for inputting the pickup instruction data into the necessary-element pickup means, allows an easy alteration of the pickup instruction data.

The output image generator means 575 generates an output image using the partial images of the document areas that were picked up by the necessary-element pickup means.

The output image may be generated in any of the two methods: one is to directly lay out the partial images, and the other to lay out the partial images after processed.

In the second output-image generation method, viz., the method to lay out the processed partial images, design parameters are applied to the designation for the necessary elements by the necessary-element pickup means. The output image generator means converts and processes the partial images in the areas corresponding to the document elements picked up according to the design parameters, and relocates the document elements, thereby generating an output image. The output image thus formed looks neat and is easy to read. The design parameters may be prepared in the form of a table for design designation, which is described in a preset format. In this case, the data input/analysis means 577 is provided for inputting the design designation table to the necessary-element pickup means. Use of the data input/analysis means provides an easy change of the document design.

The output image generated by the output image generator means is printed or visually presented by a printer or a CRT display.

Figure 49:
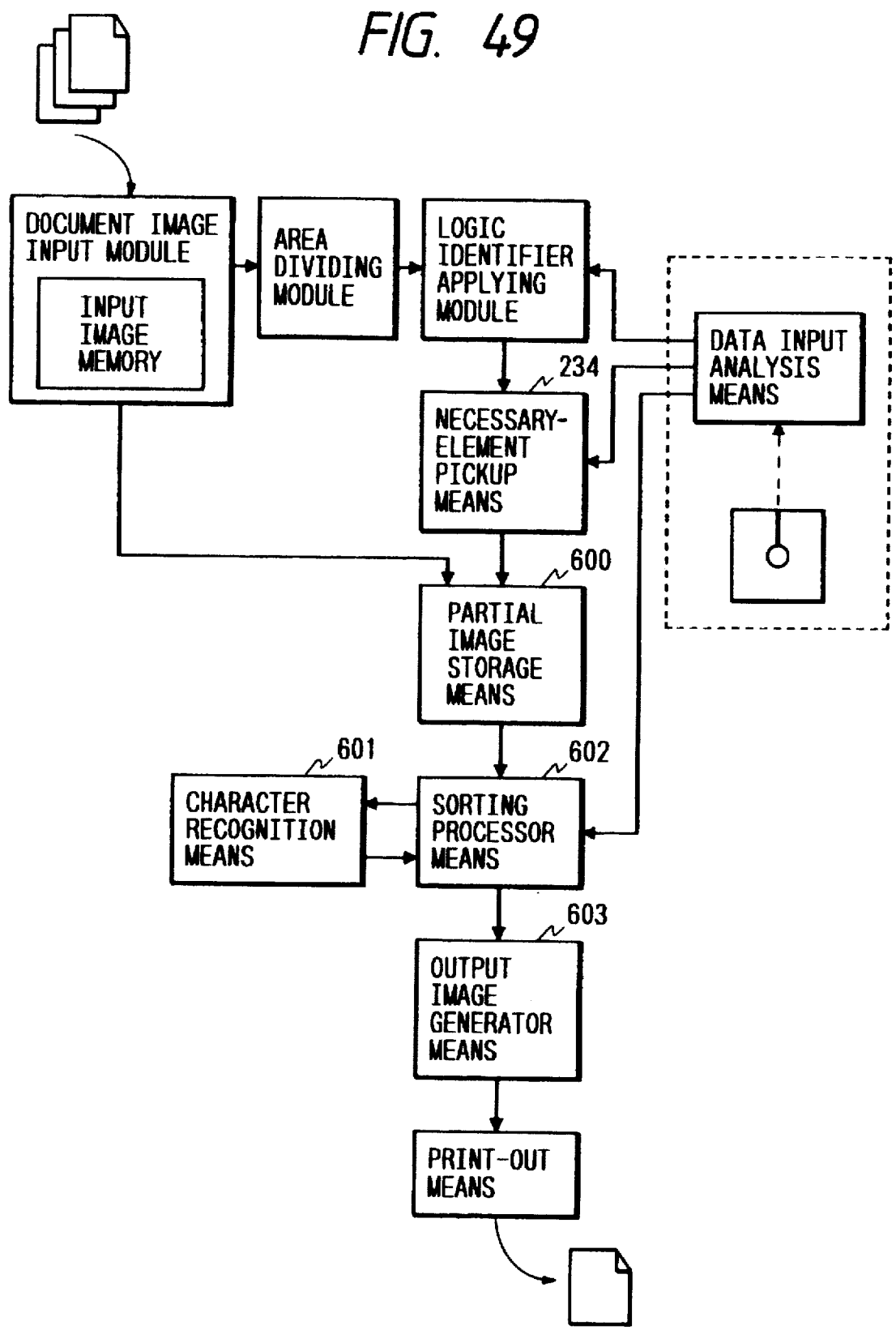
FIG. 49 is a block diagram showing a document processor as a modification of the seventh embodiment of the invention.

The document processor as the summary forming device may be modified as to have the construction shown in FIG. 49. As shown, the document processor additionally includes a partial image storage means 600, a character recognition means 601, and a sorting processor means 602. The partial image storage means 600 stores the partial images in the areas corresponding to the document elements selected by the document elements select means. In this case, the partial images are stored in association with related logic identifiers, for each document image. The character recognition means 601 reads the partial images of the elements having the logic identifiers acting as keys for sorting from the partial image storage means, and converts the partial images into streams of character codes. The sorting processor means 602 sorts the character codes streams received from the character recognition means, thereby to determine the order of outputting the document images. The output image generator means 603 generates an output image using the partial images in the areas, which correspond to the document elements selected by the necessary-element pickup means, in the output order of the document images received from the sorting means.

In operation, the character recognition means reads the partial images of the elements having the logic identifiers acting as keys for sorting from the partial image storage means, and recognizes and converts the partial images into streams of character codes. The sorting processor means sorts the character codes streams. The results of the sorting are used by the output image generator means in order to determine the order of outputting the document images. Date, for example, is used for the key. The types of characters for the key are limited. Then, the construction of the character recognition means may be extremely simple.

The document processor of this instance includes the function to recognize and sort the key elements. Accordingly, a plural number of summary documents can be orderly arranged using the sorting results. The user can make an easy access to his desired summary document.

Figure 50:
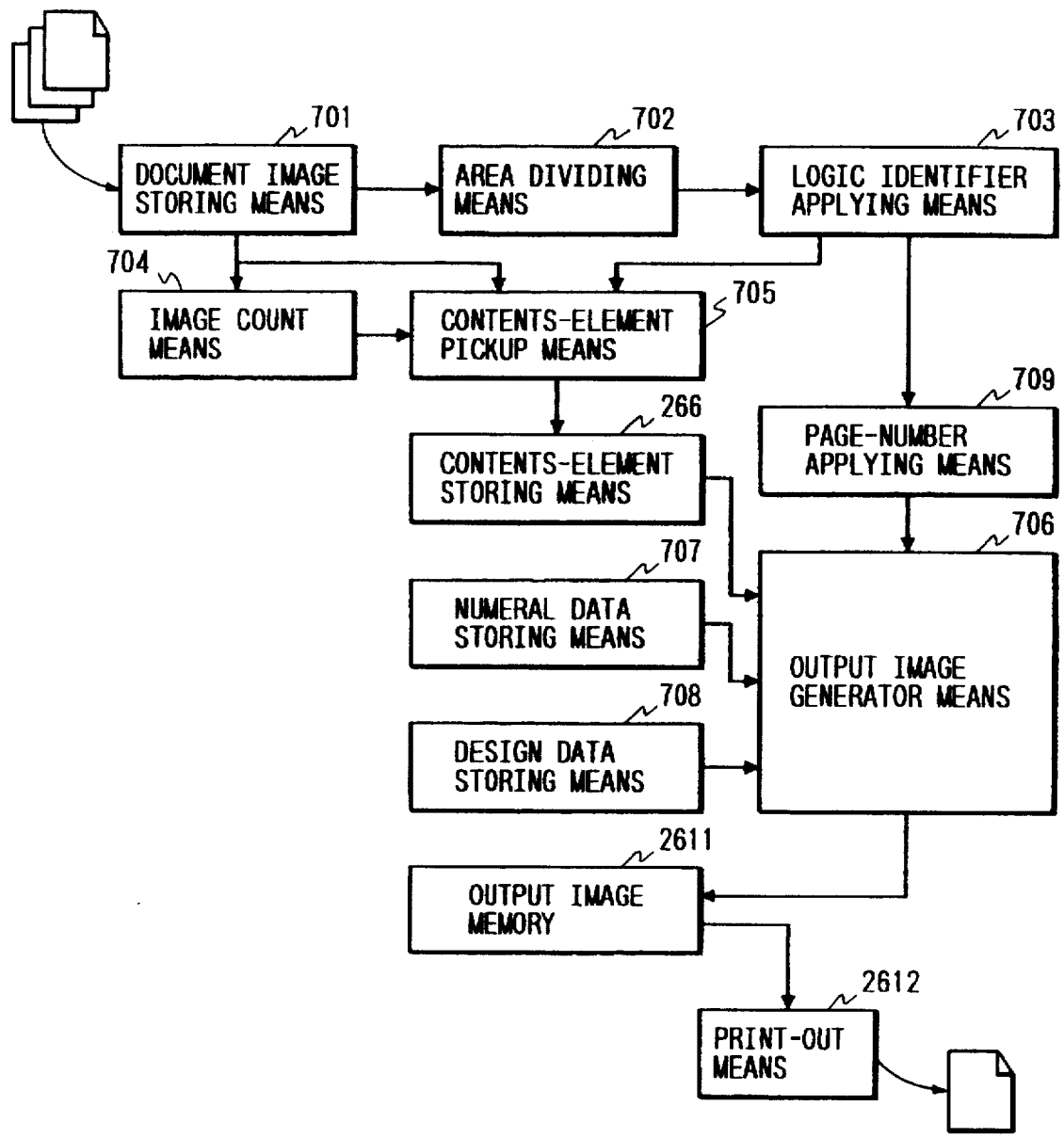
FIG. 50 is a block diagram showing a document processor operating as a contents forming device.

Referring now to FIG. 50, there is shown another document processor which operates as a contents-forming device. The document processor comprises a document image storing means 701, an area dividing means 702, a logic identifier applying means 703, contents-element pickup means 705, and an output image generator means 706. The document image storing means 701 stores a plural number of document images. The area dividing means 702 divides each document image received from the area dividing means into areal blocks or document elements having logical meanings. The logic identifier applying means 703 applies identifiers logical meanings to the document elements received from the area dividing means. The contents-element pickup means 705 picks up document elements necessary for forming the contents of the document by using the identifiers applied thereto by the logic identifier applying means. The output image generator means 706 generates a contents-image of a preset design using the document elements necessary for forming the contents of the document and corresponding page numbers.

In operation, the contents-element pickup means 705 picks up the document elements necessary for forming the contents of the document by using the logic identifiers, and determines page numbers of the pages containing the document elements. To determine the page numbers, an image count means 704 is provided which is for counting the number of document images to be processed. The contents-element pickup means determines the page numbers on the basis of the count of the count means and the order of processing the document images.

The output image generator means generates an output image of a preset design on the basis of the document elements 707 necessary for the contents formation and the corresponding page numbers 708.

The document processor thus described is capable of automatically generate the contents of a great number of documents. Accordingly, the user can search his desired documents of the great number of documents.

The document processor may have the function to apply page numbers to the document images, in addition to the function of forming the contents of the documents.

The contents-element pickup means picks up the document elements with the logic identifiers for the page numbers from the document images. In order to generate an output image containing the contents and page numbers, the output image generator means includes a page-number applying means 709 operating such that when the document elements with the logic identifiers for the page numbers are picked up, it removes the areas of the document elements and applies page numbers thereto, and when such document elements are not picked up, it applies page numbers to preset positions in the document images.

Thus, the document processor renumbers the pages of the document images. Accordingly, the document formed by the document processor contains the intelligible contents and page numbers.

In the embodiments thus far described, the document image input module, the DI (design instruction) input module, the print-out module, and the position designation module can be constructed by the known hardware technique. The area dividing module, the logic identifier applying means, the pour-order determining module, DP design parameter determining module, the layout position determining module, and the output image generator module may be all or partly constructed with software modules. In this case, these software modules are located in ROMs or other suitable memory devices, and are carried out by a central processing unit. Alternatively, those modules may be constructed with hardware modules using logic circuits as the combinations of logic elements.

As described above, the user, even if he has no document design knowledge, can prepare documents of good design as desired, from solid written documents.

In response to simple instructions on the document use and image finish, which are entered from the design instruction means by the user, the document processor determines design parameters by the design parameter means, and analyzes the processed document image by the area dividing means and the logic identifier applying means. The output image generator means processes the document image according to the results of determination and analysis, and automatically generates a preset output image. Accordingly, the user having no document design knowledge can prepare a document of good design by using the document processor.

Thus, the user can easily rewrite documents of different designs into the documents of a uniform design by using the document processor. In this case, the user merely enters simple instructions into the document processor.

The document processor of the invention is capable of picking up only desired document elements from the image of a document original, and automatically reproducing an image constructed with those selected document elements. With this feature, the document processor can automatically form the summary documents and lists. Easy management of a great number of documents is realized. Incidentally, the conventional document processor requires manual work for forming the summary documents and lists or the character recognition device for encoding the data of them.

In one arrangement of the document processor, the area dividing means extracts a layout structure of an input document. In the logic identifier applying means, the layout structure is compared with the structure models, for its verification, viz., recognizing the logic structure of the input document. Therefore, the logic identifiers are applied to the document elements with high precision. Therefore, an intended design of the output document can reliably be obtained, ensuring reproduction of output documents of good design.

In another arrangement of the document processor of the invention, when the design parameter determining means transfers design parameters data and the logic identifiers as well to the output image generator means, it receives information indicating the logic identifiers contained in the layout structure of the input document from the logic identifier applying means, and transfers only the necessary logic identifiers. In this respect, the process is effectively carried out.

In still another document processor, the knowledge data base of document design knowledge data is used. On the basis of the knowledge base, the inference process is carried out to determine design parameters. Various types of documents can be designed using the knowledge of experts.

In yet another document processor, the design parameter determining means may use the parameters to designate columns. Therefore, the column conversion, which is hard to handle by the prior techniques, can readily be done. Accordingly, the user can prepare uniformly designed documents with the designated column from documents of different columns by merely entering simple instructions to the document processor.

In a further document processor, when a document image contains graphic elements and character elements, the pour-order determining means determines the order of pouring the character elements. The layout position determining means changes the layout in the document image. In this layout change process, the graphic elements are handled prior to the character elements. The output image generator pours the character elements into the column or columns. Accordingly, the document design is changed, with a simple construction. Further, if the position of the graphic element in the document image is designated, the document processor automatically lays out the remaining elements. This also simplifies the document design operation.

What is claimed is:

1. A document processor comprising:

document image storing means for storing a raster image of a document;

area dividing means for dividing the entire document image received from said document image storing means into a plural number of image areas;

a memory for storing a document structure model;

comparing means for comparing the entire divided document image with the document structure model stored in the memory;

logic identifier applying means for applying, based on the comparison performed by the comparing means, logic identifiers having logic meanings of a document to each of the image areas of the document image received from said area dividing means;

design instruction input means for inputting design instructions based on acquired document design knowledge related to ease of reading and understanding document content;

design parameter determining means for determining, for each logic identifier, values of parameters on a document design of an output document according to instructions entered from said design instruction input means; and output image generator means for processing the document images in the image areas having the logic identifiers applied thereto by said logic identifier applying means according to the parameter values determined by said design parameter determining means, which respectively correspond to the logic identifiers, and for generating an output image.

2. The document processor according to claim 1, in which said area dividing means produce a layout structure which includes area data containing layout identifiers, type of image area, area size, area positions, and data representing the relationships among the image areas.

3. The document processor according to claim 1, in which said logic identifier applying means includes structure model storing means for storing a plural number of structure models describing the relationships between a layout structure and a logic structure, matching processor means for comparing the layout structure received from said area dividing means with the structure models, and logic structure determining means for applying logic identifiers to the image areas or documents elements on the basis of the structure model matching the layout structure.

4. The document processor according to claim 1, in which said design instruction input means includes means for selecting one of types of documents including "Report", "Planning", and "OHP material", and a plurality of design instruction items including "Orthodox", "Fresh", and "Functional".

5. The document processor according to claim 1, in which said design parameter determining means includes table means for retrieving the parameter values on document designs in accordance with said design instruction input means.

6. The document processor according to claim 5, in which said design parameter determining means includes a table containing a multi-color arrangement pattern based on the document design and the identifiers.

7. The document processor according to claim 5, in which said table means includes a first table containing design instructions and table numbers associated therewith, and a second table containing the position and the maximum width of the document elements with logic identifiers, and the size and character attribution of the character elements.

8. The document processor according to claim 1, in which said design parameter determining means determines the parameter values on the design of an output document on the basis of the instructions entered from said design instruction input means and the output from said logic identifier applying means.

9. The document processor according to claim 8, in which said design parameter determining means includes a knowledge data base storing knowledge data on the document design, and inference processing means for determining the parameter values on the design of an output document by carrying out an inference process on the basis of the instruction received from said design instruction input means, and the output of said logic identifier applying means by using the data on the document design stored in said knowledge data base.

10. The document processor according to claim 8, in which said design parameter determining means contains parameters to designate the column as the parameters that can be determined, and when design parameters provided respectively for logic identifiers determined by said design parameter determining means contain the parameters designating the column, said output image generator means converts the layout of the image data in the corresponding image areas into the designated column.

11. The document processor according to claim 10, in which, when a plural number of elements corresponding to logic identifiers of the design parameters determined by said design parameter determining means are present, said output image generator means determines the order of those elements and converts the layout of the image data of the elements into the designated column.

12. A document processor comprising:
document image storing means for storing a raster image of a document;

area dividing means for dividing a cluster of pixels in the document image received from said document image storing means into a plural number of image areas of document elements, including character elements and graphic elements, having logic meanings;

position designation means for designating positions of graphic elements in the document image;

pattern data storing means for storing subcharacter pattern data;

layout rule storing means for storing rules on the layout of the subcharacter pattern data;

layout determining means for determining whether the beginning and end of a line of characters is correct according to the subcharacter pattern data stored in the pattern data storing means; and layout processing means for picking up subcharacter pattern data from the document image stored in the image storing means on the basis of the determination made by said layout determining means, the subcharacter pattern data stored in said pattern data storing means and the graphic element positions, and for laying out the subcharacter patterns within a desired area.

13. The document processor according to claim 12, in which said position designation means designates the positions of the graphic elements as the specific elements.

14. The document processor according to claim 13, in which said position designation means includes means for selectively designating a "Flush top" to locate the graphic element at the top of a document and a "Flush bottom" to locate the graphic element at the bottom.

15. The document processor according to claim 12, in which said output image generator means includes
a layout rule storing means for storing the rules on the layout of the subcharacter patterns in the lowest layer of the layer structure of character areas;

layout determining means for determining whether or not the beginning and end of a line of characters are proper or not according to the subcharacter pattern data of subcharacter pattern data storing means and the rules of said layout rule storing means; and layout processing means for picking up the subcharacter patterns from the document image stored in the input image memory on the basis of the results of the determination by said layout determining means and the subcharacter pattern data, which is stored in said subcharacter pattern data storing means, and for laying out the subcharacter patterns within a desired area.

16. The document processor according to claim 12, further comprising logic identifier applying means applying logic identifiers to said document elements produced by the area dividing means, said output image generation means for carrying out a prohibit process on the layout of the document elements on the basis of the logic identifiers applied by said logic identifier applying means.

17. A document processor comprising:
document image storing means for storing a raster range of a document;

area dividing means for dividing the entire document image received from said document image storing means into a plural number of elements;

a memory for storing a document structure model;

comparing means for comparing the entire divided document image with the document structure model stored in the memory;

logic identifier applying means for applying, based on the comparison performed by the comparing means, logic identifiers to each of the elements received from said area dividing means;

necessary-element pickup means for picking up elements with desired identifiers from the elements having the identifiers applied thereto by said logic identifier applying means; and output image generator means for generating an output image using the partial images corresponding to the picked up elements.

18. A document processor comprising:

document image input means for storing at least one raster image of a document;

area dividing means for dividing a cluster of pixels on a document image, that is entered by said document image input means, into meaningful areas as document elements, wherein the entire document image is divided into elements;

a memory for storing a document structure model;

comparing means for comparing the entire divided document image with the document structure model stored in the memory;

logic identifier applying means for applying, based on the comparison performed by the comparing means, logic identifiers having logical meanings to each of the elements received from said area dividing means;

necessary-element pickup means for picking up elements necessary for summary preparation from the elements having the identifiers applied thereto by said logic identifier applying means; and output image generator means for generating an output image using the partial images corresponding to the picked up elements.

19. The document processor according to claim 18, in which said logic identifier applying means stores in advance at least one structure model describing the relative positions of document elements in a document to be processed, selects a structure model coincident with a result obtained from said area dividing means, and applies the logic identifier.

20. The document processor according to claim 19, further comprising logic data input means for altering the structure model registered in said logic identifier applying means and for storing new structure models in the same.

21. The document processor according to claim 18, further comprising input means for inputting the logic identifiers for the necessary elements that are described in a prescribed simple language, as pickup instruction data for said necessary-element pickup means.

22. The document processor according to claim 18, in which said output image generator means generates an output image by directly laying out the partial images corresponding to the document elements picked up by said necessary-element pickup means.

23. The document processor according to claim 18, in which said output image generator means generates an output image by converting and processing the partial images in the areas corresponding to the document elements picked up according to the design parameters which is applied for identification of the necessary-element of said necessary-element pickup means, and relocating the document elements.

24. The document processor according to claim 23, in which said output image generator means carries out a character-confining process for confining the partial images cut out for each character within the width of the area specified by the design parameter, and an enlargement/reduction process for enlarging/reducing the image resulting from said character-confining process.

25. The document processor according to claim 23, in which said necessary-element pickup means includes input means for inputting a design designation table described in preset format.

26. The document processor according to claim 18, further comprising visualizing means for visualizing the output document image output from said output image generation means on a visualizing media.

27. The document processor according to claim 18, further comprising partial image storage means for storing the partial images in the areas corresponding to the document elements selected by said document elements select means in a manner that the partial images are stored in association with related logic identifiers, for each document image;

character recognition means for converting the partial images of the elements having the logic identifiers acting as keys for sorting, from the image stored in said partial image storage means, into streams of character codes; and sorting processor means for sorting the character codes streams received from said character recognition means, thereby to determine the order of outputting the document images;

wherein said output image generator means generating an output image using the partial images in the areas, which correspond to the document elements selected by said necessary-element pickup means, in the output order of the document images received from sorting means.

28. The document processor according to claim 27, further comprising input means for inputting data for character recognition and sorting, said data including logic identifiers for the document elements serving as sort keys, character patterns for character recognition, and attribute quantity data.

29. A document processor comprising:

document image storing means for storing a plural number of raster images of respective documents;

area dividing means for dividing the entire document image of each document image that is entered by said document image storing means into meaningful areas as document elements;

logic identifier applying means for applying logic identifiers having logical meanings to each of the document elements received from said area dividing means, wherein the logic identifiers include logic identifiers for page numbers;

contents-element pickup means for determining the page numbers of document images and for picking up document elements necessary for forming the contents of the document by using the identifiers applied thereto by the logic identifier applying means;

page-number applying means for removing the area of a document element with the logic identifiers for a page number and applying the page number determined by the contents-element pickup means to the area of the document element; and output image generator means for generating a contents-image of a preset design using the document elements, picked up by said contents-element pickup means and necessary for forming the contents of the document, and corresponding page numbers.

30. The document processor according to claim 29, further comprising image count means for counting the number of document images to be processed, and in which said contents-element pickup means determines the page numbers on the basis of the count of the count means and the order of processing the document images.

31. The document processor according to claim 29, in which said contents-element pickup means picks up the document elements with the logic identifiers for the page numbers from the document images, and in order to generate an output image containing the contents and page numbers, said output image generator means includes a page-number applying means operating such that when the document elements with the logic identifiers for the page numbers are picked up, it removes the areas of the document elements and applies page numbers thereto, and when such document elements are not picked up, it applies page numbers to preset positions in the document images.

* * * * *

UNITED STATES PATENT AND TRADEMARK OFFICE
CERTIFICATE OF CORRECTION

PATENT NO. : 5,701,500
DATED : December 23, 1997
INVENTOR(S) : Joji IKEO et al.

It is certified that error appears in the above-indentified patent and that said Letters Patent is hereby corrected as shown below:

Claim 3, column 31, line 18, "documents" should read --document--.

Signed and Sealed this

Twenty-first Day of July, 1998

Attest:

BRUCE LEHMAN

Attesting Officer

Commissioner of Patents and Trademarks